United States Patent
Deac

(10) Patent No.: US 11,184,303 B2
(45) Date of Patent: *Nov. 23, 2021

(54) BREVITY-CODIFIED MESSAGING SYSTEM AND PROCESS WITH PRE-COMPOSED MESSAGES MADE OF PREFABRICATED ICONS, AND METHODS OF USE

(71) Applicant: Titus Deac, Vancouver (CA)

(72) Inventor: Titus Deac, Vancouver (CA)

(*) Notice: Subject to any disclaimer, the term of this patent is extended or adjusted under 35 U.S.C. 154(b) by 131 days.

This patent is subject to a terminal disclaimer.

(21) Appl. No.: 16/414,670

(22) Filed: May 16, 2019

(65) Prior Publication Data

US 2019/0273707 A1  Sep. 5, 2019

Related U.S. Application Data

(63) Continuation-in-part of application No. 16/232,819, filed on Dec. 26, 2018.
(Continued)

(51) Int. Cl.
*H04L 12/58* (2006.01)
*G06Q 30/06* (2012.01)

(52) U.S. Cl.
CPC ......... *H04L 51/10* (2013.01); *G06Q 30/0621* (2013.01); *H04L 51/12* (2013.01); *H04L 51/32* (2013.01)

(58) Field of Classification Search
None
See application file for complete search history.

(56) References Cited

U.S. PATENT DOCUMENTS 7,643,819 B2  1/2010  Krutik
7,653,690 B2  1/2010  Block
(Continued)

FOREIGN PATENT DOCUMENTS

EP  0647057 A1  4/1995
WO  0178334 A2  10/2001
(Continued)

OTHER PUBLICATIONS

Apple Inc., "Use iMessage apps on your iPhone, iPad, and iPod touch", published Sep. 17, 2018.
(Continued)

*Primary Examiner* — Kevin T Bates
*Assistant Examiner* — Emad Siddiqi

(57) ABSTRACT

Described herein is a codified social media messaging system, method and process based on pre-composed messages made of prefabricated icons that may be directed primarily at festive occasions and events. The prefabricated icons may comprise gender-specific prefabricated icons. The festive nature of these events may be incompatible with harmful messages, hence one function—that of a filter—imprinted in the design of positive prefabricated icons. Another function may aim to make messages as festive as the festive occasions they address. These functions may stem from the use of prefabricated icons, including animated icons, which act as guardians and catalysts of the positive character of the message. Within this codified messaging system, method and process, pre-composed messages made of prefabricated icons may perform the role of multi-use "connectors" between users. In some embodiments the system provides a system of memorabilia exchanges based on prefabricated icons.

20 Claims, 24 Drawing Sheets

Related U.S. Application Data

(60) Provisional application No. 62/708,908, filed on Dec. 29, 2017, provisional application No. 62/919,552, filed on Mar. 19, 2019.

(56) References Cited

U.S. PATENT DOCUMENTS

| | | | |
|---|---|---|---|
| 7,734,719 | B2 | 6/2010 | Friedman et al. |
| RE44,742 | E | 2/2014 | Makela |
| 8,811,794 | B2 | 8/2014 | Traina et al. |
| 8,862,679 | B1 | 10/2014 | Byttow et al. |
| 8,918,339 | B2 | 12/2014 | Rubinstein et al. |
| 9,087,320 | B2 | 7/2015 | Goldman et al. |
| 9,720,585 | B2 | 8/2017 | Fadell et al. |
| 2003/0154446 | A1* | 8/2003 | Constant ............... H04L 51/38 715/256 |
| 2006/0245555 | A1 | 11/2006 | Makela |
| 2006/0282770 | A1 | 12/2006 | Lee |
| 2007/0208751 | A1* | 9/2007 | Cowan ................. G06Q 10/10 |
| 2007/0298818 | A1 | 12/2007 | Krutik |
| 2008/0249657 | A1 | 10/2008 | Wendland et al. |
| 2008/0294977 | A1 | 11/2008 | Friedman et al. |
| 2010/0179991 | A1* | 7/2010 | Lorch .................. H04L 51/063 709/206 |
| 2013/0159445 | A1 | 6/2013 | Zonka et al. |
| 2013/0259216 | A1 | 10/2013 | Adzhamyan |
| 2013/0275525 | A1* | 10/2013 | Molina .................. H04L 51/12 709/206 |
| 2015/0172246 | A1 | 6/2015 | Velummylum et al. |
| 2015/0268818 | A1 | 9/2015 | Zewail |
| 2016/0035123 | A1* | 2/2016 | Bonansea ............... G06T 13/80 345/473 |
| 2016/0078659 | A1 | 3/2016 | Bartkiewicz et al. |
| 2017/0220578 | A1 | 8/2017 | Kazi et al. |
| 2018/0255009 | A1 | 9/2018 | Chen et al. |

FOREIGN PATENT DOCUMENTS

| | | |
|---|---|---|
| WO | 0203630 A1 | 1/2002 |
| WO | 2006023738 A2 | 3/2006 |
| WO | 2016186325 A1 | 11/2016 |

OTHER PUBLICATIONS

Apple Inc., "Use message effects with iMessage on your iPhone, iPad, and iPod touch", published Sep. 17, 2018.
Apple Inc., "Use stickers with iMessage on your iPhone, iPad, and iPod touch", published Oct. 1, 2018.

* cited by examiner

11B/12 ASSOCIATIONS

11D/12

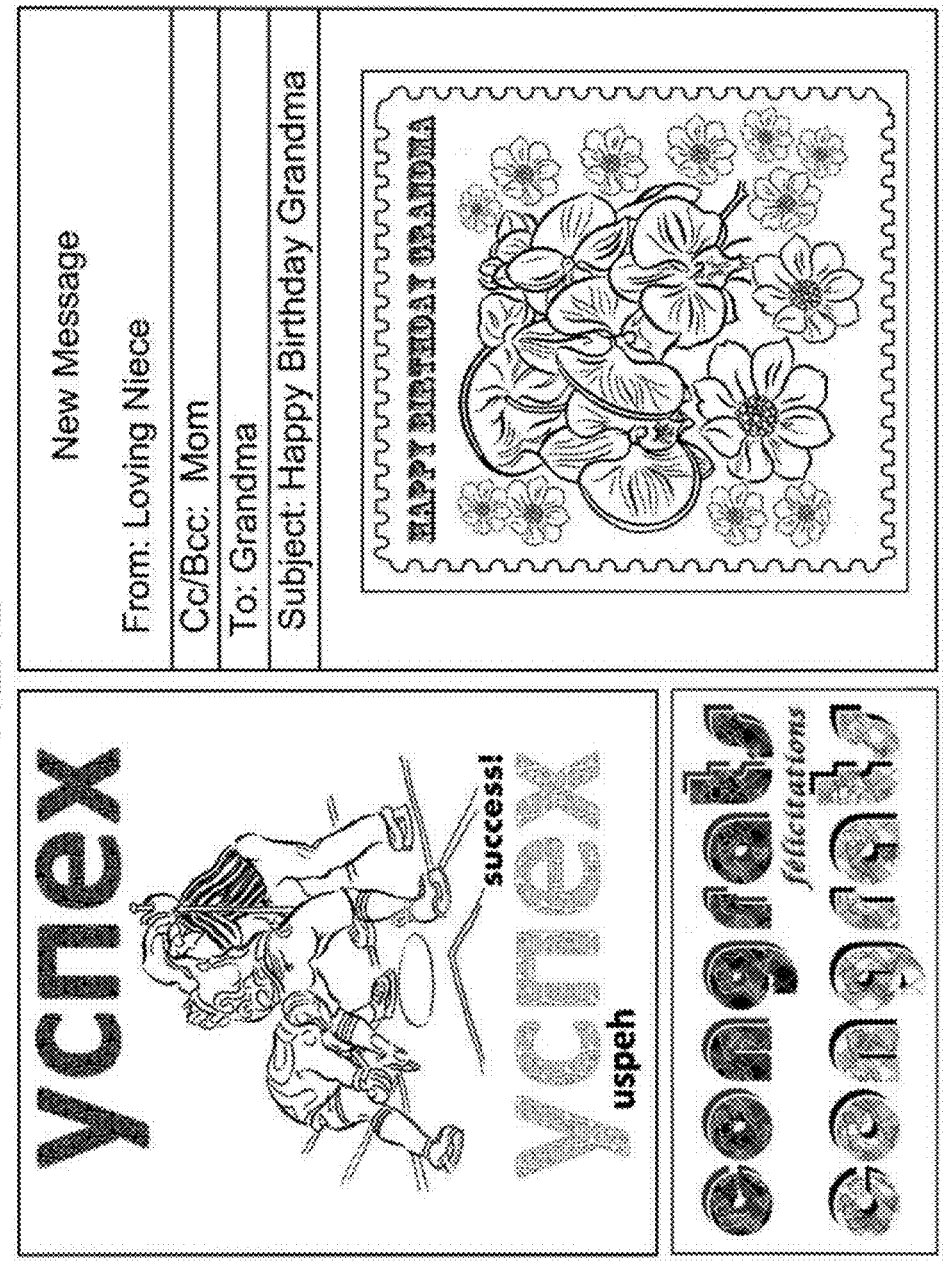

11F/12 FLIPPY MAIL

FACE SIDE

A STANDARD

B CUSTOMIZED

BACK SIDE

C STANDARD & CUSTOMIZED

D PERSONALIZED

BREVITY-CODIFIED MESSAGING SYSTEM AND PROCESS WITH PRE-COMPOSED MESSAGES MADE OF PREFABRICATED ICONS, AND METHODS OF USE

CROSS-REFERENCE TO RELATED APPLICATIONS

This application is a continuation-in-part of U.S. application Ser. No. 16/232,819 filed 26 Dec. 2018 entitled MESSAGING SYSTEM WITH PREFABRICATED ICONS AND METHODS OF USE, which claims the benefit under 35 U.S.C. § 119 of U.S. Application No. 62/708,908 filed 29 Dec. 2017 entitled "BILLION CLUB—GLOBAL NETWORK OF ATHLETES AND SPORTS FANS", both of which are hereby incorporated herein by reference for all purposes. This application also claims the benefit under 35 U.S.C. § 119 of U.S. Application No. 62/919,552 filed 19 Mar. 2019 and entitled MESSAGING SYSTEM WITH PREFABRICATED ICONS, which is incorporated herein by reference for all purposes.

FIELD

The technology disclosed herein generally relates to electronic messaging. Example embodiments provide methods and systems that can be applied for generating messages which each include at least one prefabricated icon.

BACKGROUND

Social media platforms use electronic messaging as a way for members of the social media platforms to stay in touch. Members (users) may send text messages to one another, post messages onto forums and go back and forth between email services with text messages.

The use of electronic messaging is ubiquitous in modern society. Most adults with a cell phone, tablet or other portable wireless device, are able to keep tabs on their "friends" or other contacts in social media at any time. The pervasive use of electronic messaging has produced many benefits and a few problems.

Some popular text messaging and social media platforms today include Facebook™ and LinkedIn™. These platforms require new users to log in and create a user account. The user account may be screened by the administrator and persons may be denied accounts, or admitted to use the social medial platforms. However, once a person has an account, they may only communicate with people who either have the same privacy settings (e.g. all public so any user may see anything another user posts), or with people who they request to communicate with, and accept (they become "friends" on the social media platform). After a person becomes friends, or is admitted into a circle of a user, that person may communicate with the user using text messages, emails, or posts on their home page. Generally, messages are friendly or informative and most users do not abuse these platforms for malicious communication. However malicious communication does occur, and it has created a new problem often referred to as "cyber bullying."

Electronic messaging primarily is made up of text messages. These messages may be augmented with icons such as Emojis. Individual users may customize their messages by using any combination of texts, Emojis, photographs and videos (either in the form of pictures taken from their handsets, or shared links to internet based material) or other information they may send through the messaging format, such as sharing contacts, calendars, email addresses, etc. An example of an electronic messaging system used particularly for sports enthusiasts is U.S. Pat. No. 9,087,320 describing a system and method where subscribers to the system may coordinate with each other various sports related activities. The messaging system is primarily designed to help local persons coordinate activities of parents, athletes, coaches and logistic elements for games and practices.

The use of Emojis as icons is particularly useful. Emojis may reflect a wide range of emotions from love to hate, fear and loathing to joy and happiness. Examples of emoji usage include U.S. Pat. No. 8,918,339 describing a method for users to view a library of Emojis and purchase them for use with their messaging program. US 2018/0255009 describes a method for detecting the occurrence of an Emoji usage by a user, so as to provide a recommendation to the user of additional Emojis that may be desired for the user to use in their messages. Emojis tend to be small and simplistic in design, thus they have a limited range of expression for each Emoji.

A general characteristic of today's society is that almost everything in our day-to-day life tends to be focused on increasing speed. From the old business slogan "time is money", to today's fast Internet, fast planes and trains, fast food, fast online shopping followed by fast delivery (including fast delivery of the fast food), it is fast or faster almost everything. In this context, it is probably appropriate to consider that even computer-enabled messaging needs to get faster. On another hand, younger and younger demographics enter the messaging world every year.

With respect to online communications and, social media in particular, one of the issues facing social media today is cyber bullying. The lack of physical interaction between users in social media has emboldened many users to say or message material that they would not use in the course of actual face-to-face conversations. The ability to be anonymous allows an individual to post messages without fear of being personally identified. The anonymous nature may embolden individuals to engage in cyber bullying since they do not fear any consequence of their actions, such as identification, reprisal, or counter attack. Cyber bullying is a major problem in social media, and many platforms are adopting policies and developing programs to stop or curtail cyber bullying after such events are reported to the services. An example of a developing technology to promote positive messaging is US 2015/0268818 which provides a method to provide positive feedback to users via a voting or popularity system, and encourages users to use more positive elements and less negative elements. The system does not prohibit the use of negative messages.

Unfortunately, these practices respond to a problem after the issue has already been seen by a recipient. It is the nature of reporting an issue that the one doing the reporting has already been the victim of the bullying. Bullying may be mean statements, harassing or embarrassing videos/pictures, threats or any message intended to intimidate, produce fear or make a recipient feel bad. Solutions which encourage positive feedback but do not remove negative feedback do not solve the cyber bullying issue.

Thus, there remains a need for an electronic messaging system that may accept users and allow messaging without cyber bullying.

There also remains a need for a messaging service that may be used to foster positive feedback for its members, and not rely on detailed and invasive filters in an attempt to weed out people who may have negative intent.

There also remains a need for some of the electronic messaging systems to adapt faster to the economics of demographics, to send/receive messages faster and become easier to use.

SUMMARY

Further aspects and example embodiments are illustrated in the accompanying drawings and/or described in the following description.

These and other objectives may be achieved through the implementation and use of an electronic messaging system based on libraries of pre-composed messages made of prefabricated, pre-wrapped, ready-to-go, codified messages (e.g. prefabricated icons). The use of such a system and method promotes a more practical and more positive form of electronic communication. The system and method may restrict communication to a set of pre-composed messages made of prefabricated icons, that are faster and easier to use and that may only be altered by an administrator, thus there is no capability of a user to create text messages, and this should reduce the incidence of cyber bullying.

In the description that follows, and throughout the present application, the term "pre-composed" refers to messages and the term "prefabricated" or "prefabricated icon" refers to the content or elements of the pre-composed messages. Where the only content of a particular message is a single prefabricated icon, the terms pre-composed and prefabricated are used interchangeably.

The computer-implemented method for communicating a message over a network using a secure messaging protocol between two or more computing devices in the network involves storing one or more pre-composed messages made of prefabricated icons in a message support library of an electronic message system, each prefabricated message providing at least one of a celebratory, positive or festive message. Presenting to a member computing device at least one prefabricated icon configured for placement into the message for communication over the electronic messaging system. Selecting at the member-computing device of one or more prefabricated messages for insertion into a message field of the message, the message field being associated with a header field to complete an electronic message. Receiving at a network computing device of the electronic message system the message selected at and transmitted by the member computing device and broadcasting a transmitted message to the member computing devices subscribing to membership in a communication group service associated with the member computing device sending the message. The message field includes no content other than the one or more prefabricated icons.

There is also a system for communicating a message over a network using a secure messaging protocol between a plurality of computing devices in the network, the system having a network computing device comprising a member registration platform, the member registration platform configured for enabling a plurality of member computing devices to register to be in a communication group with other member computing devices that have registered to be a part of the communication group. A member services library, the member services library configured to store one or more of a services application that are available to computing devices of the communication group. A membership register, the membership register configured to store data on each computing device within the communication group. A message support definition library, the message support library configured to store a message permitted for communication over the system. A communication platform configured for connecting a plurality of member computing devices, the connection of the plurality of member computing devices enabling real time communication between member computing devices subscribing to the communication group. The network-computing device is configured to receive the message from a member computing device that has registered to be a part of the communication group. The message received from the member computing device that has registered to be part of the communication group have a header field and a message field, and the system is configured to enable the message field to include no content other than one or more of a prefabricated icons.

Non-limiting example aspects of the technology described herein include:

1. A messaging system comprising:
    a database containing particulars of individuals, the particulars including, for each of a plurality of individuals:
      an address for routing messages to the individual by the messaging system; and
      a sport with which the individual is associated;
      one or more libraries containing a plurality of prefabricated icons configured for inclusion in messages sent by the messaging system, the one or more libraries associating at least some of the prefabricated icons with one or more corresponding sports; and
    an application executable on a user device, the application providing a user interface operative to send messages to individuals, the user interface providing:
      a first control operative to select an intended recipient of a message from among the individuals in the database; and
      a second control operative to select a prefabricated icon for inclusion in the message from the one or more libraries;
    wherein the application includes a filter that filters the prefabricated icons in the one or more libraries based on the sport associated with a currently selected intended recipient of a message such that the prefabricated icons available for selection exclude those of the prefabricated icons in the one or more libraries that correspond to a sport but do not correspond to the same sport as is associated with the intended recipient of the message.

2. The messaging system of aspect 1 wherein the prefabricated icons comprise one or both of:
    a) a prefabricated image; and
    b) predefined text in one or more languages.

4. The messaging system of aspect 1 wherein the prefabricated icons available for selection further comprise stylized characters, the stylized characters comprising plural sets of stylized characters, each of the sets of stylized characters associated with a sport, wherein the user interface comprises a control that allows the user to select one of the sets of stylized characters that corresponds to the same sport that is associated with the intended recipient and to compose all or part of the message using the stylized characters.

5. The messaging system of aspect 2 wherein the application prevents the user of the messaging system from inserting content other than prefabricated icons from the one or more libraries of prefabricated icons.

6. The messaging system of aspect 2 wherein the user interface provides a title field for containing a title of the message, the prefabricated icons comprise names and the application automatically inserts the name of a selected prefabricated icon into the title field in response to selection of the selected prefabricated icon.

9. The messaging system of aspect 6 wherein the user interface prevents a user of the messaging system from editing the title field of the message.

14. The messaging system of aspect 2 wherein the application automatically inserts an un-editable mark into the message, the mark identifying an artist of a selected prefabricated icon.

15. The messaging system of aspect 2 wherein at least one of the one or more prefabricated images comprises a colored drawing.

16. The messaging system of aspect 15 wherein the application provides a third control operative to select at least one color scheme for the colored drawing from among a plurality of color schemes.

17. The messaging system of aspect 15 wherein the colored drawing comprises a line drawing superimposed over a color background.

18. The messaging system of aspect 17 wherein the application provides a third control operative to select the color background from one or more libraries comprising a plurality of color backgrounds.

These and other features and advantages of this description will become more readily apparent from the following Detailed Description, which proceeds with reference to the drawings, in which:

BRIEF DESCRIPTION OF THE DRAWINGS

The accompanying drawings illustrate non-limiting example embodiments of the invention.

FIGS. 11A-H illustrate several examples of pre-composed, prefabricated messages, including the management of the subject line in an email platform, a double-sided platform, a brevisMail and a Stampiade type of message platforms.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

In the various embodiment described herein, elements that are the same may be identified with the same part number. Elements that are similar may be identified with a different part number even if they may perform a similar function. In the various embodiments, a subscript letter is used to describe one or more instances of an element, feature or step. The subscript "n" signifies there may be any number of that element, feature or step.

The prefabricated icons may be as described elsewhere herein. In some embodiments the prefabricated icons comprise one or both of one or more prefabricated images and text in one or more languages One or more of the prefabricated images may, for example, comprise a colored drawing. Additionally, one or more of the colored drawings may, comprise a line drawing superimposed over a color background. In some embodiments the color background may be selected from one or more libraries comprising a plurality of color backgrounds In some embodiments text is stylized. For example, characters of the text may comprise images (e.g. images of a sport). As another example words (or individual characters) may be shaped to represent a person (e.g. an athlete), an object (e.g. a piece of sports equipment, a scene (a basketball game), a sports venue (e.g. a soccer field, a tennis court, a hockey arena), etc.

Also described herein are a variety of prefabricated icons. In the various embodiments, messages of the present system may use images and words in prefabricated icons. The word or words may represent generally positive, cheerful ("Cheer"), celebratory and happy feelings and intent. As described herein, the "word" element of an icon, or an icon of a word, refers to a prefabricated assembly of alpha-numeric symbols that form a word. In some embodiments where the language is not suited to alpha-numeric symbols (like Chinese), the prefabricate word icon may represent a word character of the appropriate language (e.g. 爱, meaning "love"). As with all the prefabricated icons of the present disclosure, the word icons do not represent editable content that a user may modify. Reference herein to a user(s) or member(s) are to be treated as equivalent or interchangeable. Users are distinguished from administrators, who maintain and service the messaging system.

Figure 1:
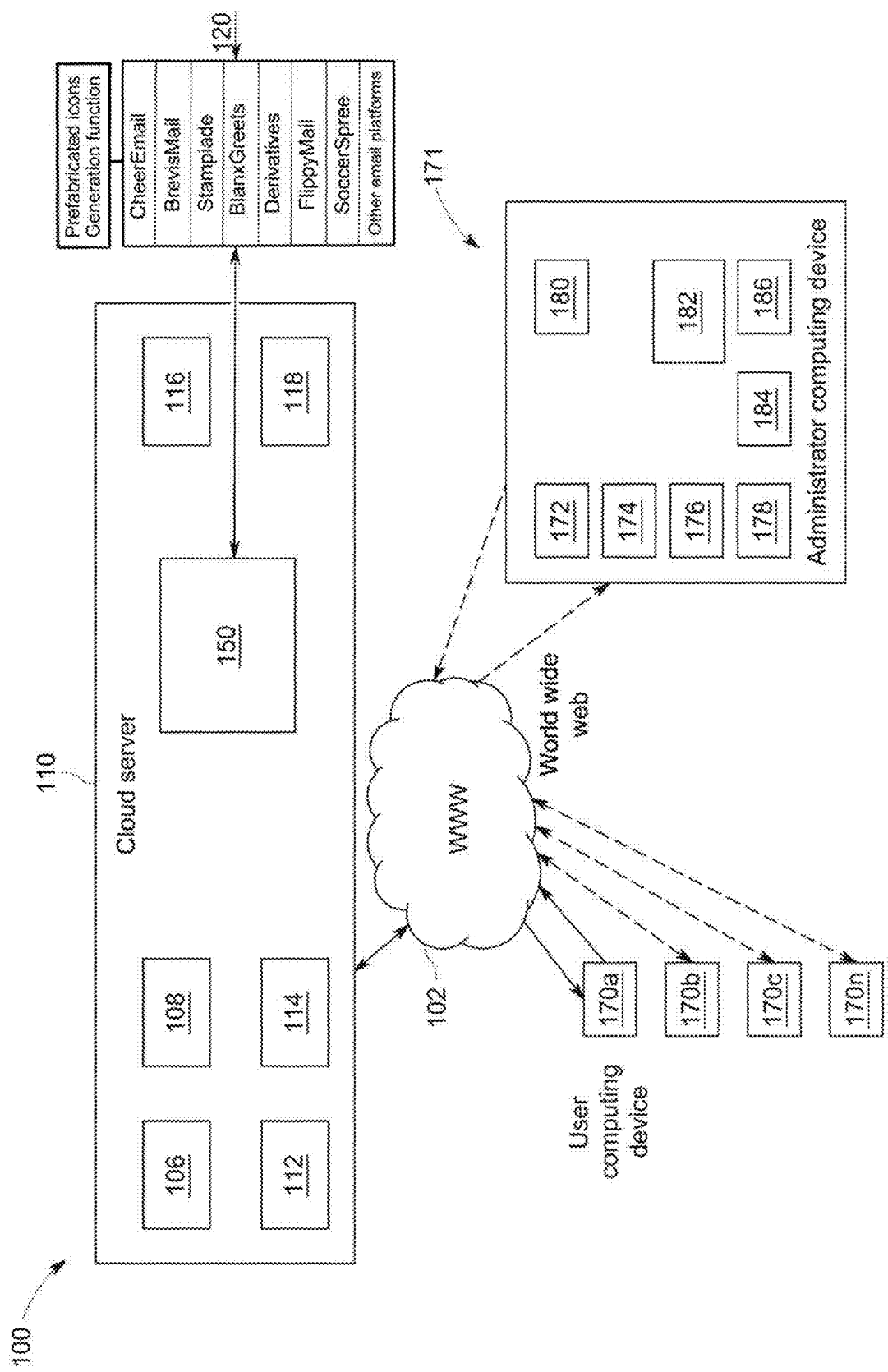
FIG. 1 illustrates a sample system architecture according to an embodiment.

A sample system architecture 100 is shown in FIG. 1. The system may have a cloud server 110 connecting one or more user devices $170_{a-n}$ through a web portal, 102 and may include an industry standard email platform or a customized, dedicated email platform 120. An administrator device 171 is also shown. While an administrator device 171 is shown, it will be appreciated that the functions performed by the administrator device 171 may be functions performed by the cloud server 110.

The cloud server 110 may have a member services platform 106, a registration platform 112, a member list 108 and a real time peer to peer connect 114 of all members. The cloud server 110 may also have a message support definition library 150, and administrator editor interface 116, and a device management library 118.

The real time peer-to-peer connect 114 may communicate to or through the cloud/web 102, an email platform 120, an administrator device 171, and reach one or more individual member devices $170_{a-n}$.

Each administrator device 171 and member device 170$_{a-n}$ may have a processor 172, a memory 174, a wired or wireless communication module 176, a user interface 178, an output device 180. Each device 171, 170$_{a-n}$ may also have a deployment manager 184 and a message support definition generator 186. The message support definition editor module 182 is not part of the user devices 170$_{a-n}$.

The processor 172 may be implemented in any number of ways. Such ways include, by way of example and not of limitation, digital and/or analog processors such as microprocessors and digital-signal processors (DSPs); controllers such as microcontrollers; software running in a machine; programmable circuits such as Field Programmable Gate Arrays (FPGAs), Field Programmable Analog Arrays (FPAAs), Programmable Logic Devices (PLDs), Application Specific Integrated Circuits (ASICs), any combination of one or more of these, and so on.

The memory 174 are computer readable storage media that may be encoded with computer executable instructions (e.g. software) that implement or enable the system. Memory may be any form of data storage. It may be at least one random access memory (RAM), and/or read only memory (ROM). Information may be stored permanently until over written and/or stored temporarily for use while the unit is active. One or more storage devices (not shown) may also be used to store information in the illustrative computer system. The storage devices may illustratively include disk drives or other non-volatile storage media.

The communication module 176 is hardware and software configured to provide for communicating with other devices. Such communication may be performed wirelessly, or via wire, or an email platform 120, or by infrared communication, and so on. In this way, data structures and message structures may be transmitted via a data transmission medium, such as a signal on a communication link from the cloud server 110 to user devices 170 (and vice versa) on the network.

In an illustrative embodiment, the communication module may comprise a wireless module for establishing a wireless communication link with a network. The wireless module may illustratively be a Wi-Fi module. Alternatively, the wireless module maybe be a Bluetooth module, a CDMA module or any other communication module that enables a wireless communication link for the bidirectional flow of data between devices wirelessly. In alternative embodiments, the communication module establishes a wired communication link with a network via a USB connector, and RS232 connector, or other hardware connectors well known in the art.

The communication module may use various communication links, such as the internet, a local area network, a wide area network, a point-to-point dial-up connection, a cell phone network, an email platform, and so on.

The user interface 178 may be implemented in any number of ways. For example, interface 178 may include a screen to display data. Interface 178 may also include a microphone and/or speaker (not shown), to issue voice prompts, play back audio media, etc. Interface 178 may be a touch screen keypad that is rendered on the display and which allows a user to enter data or to read data that is rendered on the display. Interface 178 may additionally include various controls, such as push buttons, keyboards, an email platform, and so on. The interface 178 may be a single integrated device such as the touch screen of a mobile phone, or it may involve many devices such as those often associated with a desktop computer (one or more of: keyboards, monitors, mouse/tablet, speaker, microphone, email platform, etc.).

The output device 180 may be output devices such as a visual display capable of displaying data. Displays for use with this disclosure may include a LED/LCD/OLED screen, an e-paper display, or other bi-stable display, a CRT display, a touch screen responsive display, or any other type of visual display. The display may be integrated into computing device 170 or it may be external to and in communication with computing device 170. Illustrative external devices may be a computer selected from the group consisting of a server, a personal computer, a tablet, a mobile computing device, a video device, a console gaming device, a set-top TV device, an internet connected automobile device, and so on.

The computing device may be implemented in various operating environments that include personal computers, server computers, hand held and laptop devices, multiprocessor-based systems, programmable consumer electronics, networks PCs, microcomputers, mainframe computers, distributed computing environments that include any of the above systems or devices and so on. The computing device may be cell phones, personal digital assistants, smart phones, personal computers, programmable consumer electronics, and so on.

Device 171 of the administrator also includes a message support definition editor module 182 that includes an application that runs on a personal computer (PC), tablet computer, or mobile computing platform that allows an administrator to select, edit and implement message support tools across a distributed set of user devices 170. This application may be native to the operating system it is running on, or implemented through a .net/HTML5 implementation. Illustratively, the editor is a native application running on an operating system platform such as Windows™ iOS™, Android™, macOS™, linux or the like. The functionality and operation of the Editor 182 is described in greater detail herein.

The message support definitions library 150 comprises a database of prefabricated icons to be used in messaging between the computers and computer systems of this disclosure, including email platforms 120. The prefabricated icons may be arranged by topics, such as for particular sports, or by messages in an alpha-numeric order, or related to particular events (such as for Mother's Day).

The device management library 118 is an application that along with service support tools (not shown) determines and manages what possible outputs may be created. For example, the device management library and supporting tools set maintain the latest device and software sets for all consumer owned devices. The device manager library and support tools may work alone or in conjunction to maintain consistent configuration across all customer owned devices. In addition, the device management library may also have the ability to determine how often the message support definitions are used and what specific user inputs have been captured from each use.

The device management library manages downloads of data and applications to the user devices 170. Software downloads may be delivered to customers devices virtually through the web 102, which may be a cloud based communication system. Alternatively, the downloads may be delivered manually through service support tools.

The network 102 illustratively comprises a wide area network such as the internet, however the network 102 may also comprise local area networks. Further, the network 102 may not be a land based network, but instead may comprise a wireless network and/or a hybrid of a land-based network and a wireless network for enhanced communication flexibility.

The one or more user devices $174_{a-n}$ is illustrative of one or more computers, tablets, smart phones and other devices for accessing social media.

The registration platform 112 serves as an open gateway for any user to access the messaging system described herein. The registration platform may take down sufficient information to identify a user to the system, so the system may track and identify a user's commands, message output and messages received. A user may create an account, and provide information to the system so a user's interests may be identified and correlated with other users with similar interests. The registration platform may also allow users to identify specific friends or known associates in order to form a message group of those individuals.

Once a user is registered, the information about the user may go to a member's database 108. The member database allows the system to correlate users and specific interests, such as sports fans, event fans, or people sharing a particular individual in a group they wish to communicate with regularly in a positive fashion. The members database may parse data, search, sort and report the data contents to an administrator. The system may sort and search the data to find matches of a user request to other users matching the particular request.

The member database 108 may contain information about individual users that acts as a screen to what kind of messages may be appropriate for a particular user to receive. In an embodiment, a user may be an athlete that participates in a gender specific field, such as men's or women's gymnastics, ladies figure skating, and so on. A user with a specific athletic profile may provide that data to the member database 108. The system may use that data to ensure the recipient receives messages from the community that are appropriate to that person. In one non-limiting example, it could ensure that an athlete that participates in women's gymnastics does not receive messages related to the men's field, or from other sports. In some embodiments, there may be limitations based on athletic activities that are winter sports, or summer sports, indoor sports or outdoor sports. These user inputs may assist the message system in providing only relevant, and positive messages to each user.

A member services platform 106 may contain a library of applications (apps), programs and/or tools for use on a user device in conjunction with the system. The member services platform may contain apps that may operate on a wider variety of user devices. The members service platform 106 may coordinate with the device management library 118 to determine for each user if the system may support the user's device. If the proper app for the corresponding device and operating system is within the parameters of supported devices, the system may upload the appropriate apps to the user device. Alternatively, the app may be web based or cloud based, with a web interface the user may reach using a web browser. In this embodiment the member services platform may be accessed by users with active internet connections. While a client side app may allow a user to draft and store messages while offline, and send them later when the user device regains Internet connectivity.

The real time peer-to-peer connect 114 for message system members may connect users online to the cloud server. Users may use their local device apps or use the browser based service to connect from their device to the client server, select prefabricated icons from the message library, and send those messages to other users. In one embodiment, the messages are limited to the library of prefabricated icons, and no texting or creating user original messages separate from the prefabricated icons is permitted by the system. The messages selected by the user follow the guidelines of the message support definition generator 186. Sending of messages may be handled by the deployment manager 184.

In one embodiment, FIG. 1 also depicts an example of the generation function of the messaging system of the present disclosure.

In a separate embodiment, the architecture of FIG. 1 also includes a system of email platforms, which may be an industry standard type of email platform or a specialized, dedicated email platform of the type: CheerEmail, BrevisMail, Stampiade, BlanxGreets, Last Score, flippyMail, Derivatives, Single Sport Programs, and other dedicated email platforms.

Figure 2:
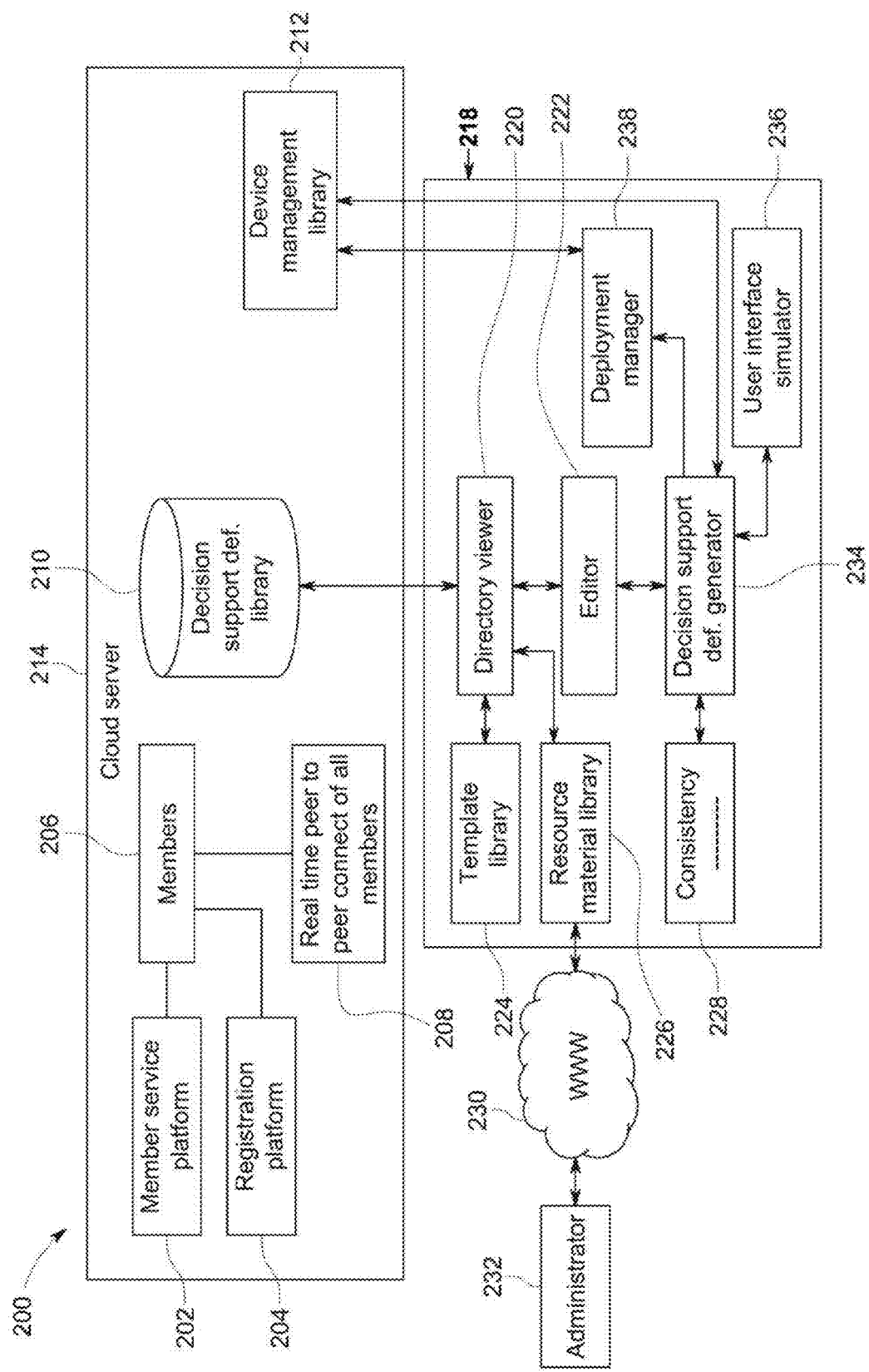
FIG. 2 illustrates an administrator editor according to an embodiment.

FIG. 2 illustrates a message support definition editor module 182 shown in FIG. 1 for creation and distribution of messages by an administrator according to this disclosure. The message support definition editor module 218 comprises a message support definition editor 222, a directory viewer 220, a message support definition generator 234, and a deployment manager 238. The message support definition editor module further includes a template library 224, a resource material library 226, a consistency checker 228, and a user interface simulator 236.

The editor 222 is the application included in the decision support definition editor module 218 that runs on an administrator user device, such as a personal computer, tablet or smart phone. The editor allows an administrator to select, edit and implement decision support tools across a distributed set of user devices. As previously explained, this application may be native to the operating system it is running on, or implemented through a .net/HTML5 implementation. Illustratively, the editor is a native application running on an operating system platform such as Windows, iOS, android, macOS, linux or the like. The functionality and operation of the editor 222 is described in greater detail later.

The directory viewer 220 is an instance software configured in a computing device that interfaces with the message support definition library 210 to download previous examples of messages and to save updated versions for use by other user devices. This allows the system to track the various prefabricated messages and ready them for use on request by users. The system may also store messages created by users in a user history portion of the library (not shown).

The message support definition generator 234 is an application that creates the message support definition sets that are loaded onto the user computer devices. In other words, the message support definition generator 234 generates the intelligent agents that are loaded into each of the selected user computer devices. This download is managed through the device manager library and supporting tool sets as previously explained that maintain the latest device configuration and software sets for all customer devices. As previously explained, software downloads may be delivered to customer's computer devices virtually through network 230, which may be a cloud based communication system. Alternatively, the downloads may be delivered manually though the service support tools.

The deployment manager 238 is an application that loads the message support definition sets into each of the allocated user computer devices. The deployment manager acquires appropriate approvals required before deployment and works in conjunction with the device management library and supporting tool sets to authorize and track implementation on allocated user computer devices. As previously explained, the device management library has the ability to determine how often the message support definitions are used and what specific user inputs have been captured from each use. The deployment manager may use this data to provide usage metrics to the administrator on the various message support definitions that exist within the system and user devices.

The template library 224 is a library of components that provide a ready-set of common algorithms, containers, functional and iterators that may be used with the computer system 200 according to this disclosure.

While the message support definition editor module 218 is shown and described in some detail here with connection to the device management library 212 and the web 230, those connections still occur through the architecture of the member computing device (phone, tablet, laptop, desktop, etc.). The administrator 232 may use the message support definition editor module for the creation, editing and/or deletion of prefabricated icons used for messages.

Figure 3:
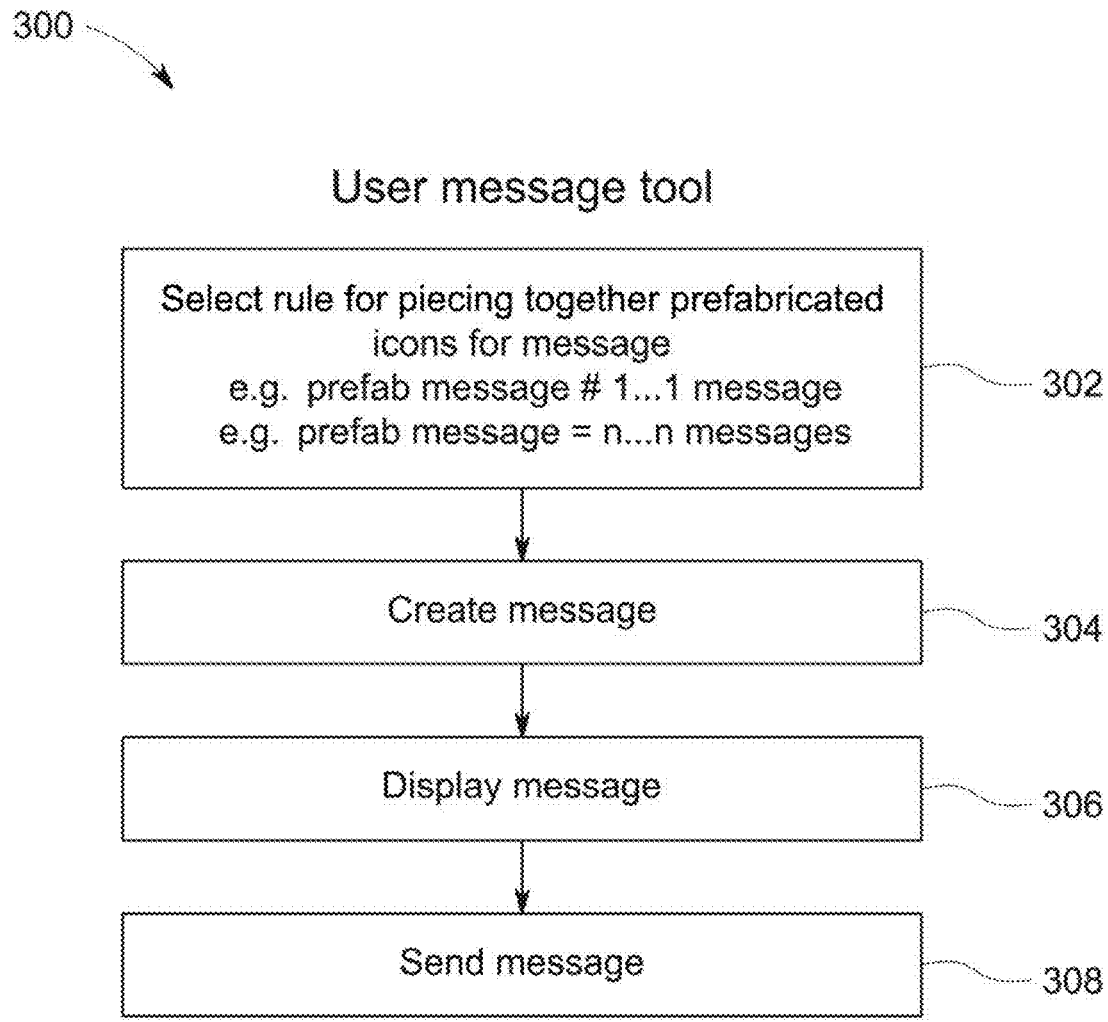
FIG. 3 illustrates a flow chart of a user operation to create a message according to an embodiment.

With reference to FIG. 3, a user tool 300 is now shown that allows a user to create a message, through an app or a web portal, or an email platform, in accordance with the present disclosure. In an embodiment, there is a user message tool 300 that operates on a user computing device. The message tool allows a user to select one or more rules 302 for piecing together a message containing at least one prefabricated icon. The message tool allows users to select parameters for the prefabricated icons stored in the message library. The search tool may provide for searches based on frequently used icons, icons related to a particular sport (like baseball, field hockey, figure skating, etc.), sporting events (i.e. World Series, Super Bowl, Stanley cup, World Cup, etc.). The search tool may also allow searches for particular holidays (Kwanza, Christmas, Ramadan, etc.), as well as days of observation (Mother's Day, Father's Day, International Children's Day, etc.). For any of these categories and many more, one or more prefabricated icons may reside on the message library. Users may select these icons to create a message 304 for use in a message as described herein.

In one embodiment, once the user has selected the icon(s) for the message s/he wants to send, the user may display a message 306. The message display occurs by the user selecting a template for the presentation of the icon(s) and creating a message by choosing which icons go into the template. Once the icons are chosen for the template, the message is displayed 306 to the user. If the user approves of the presentation of the message, the user may send the message 308 to another user or group of users.

Figure 4:
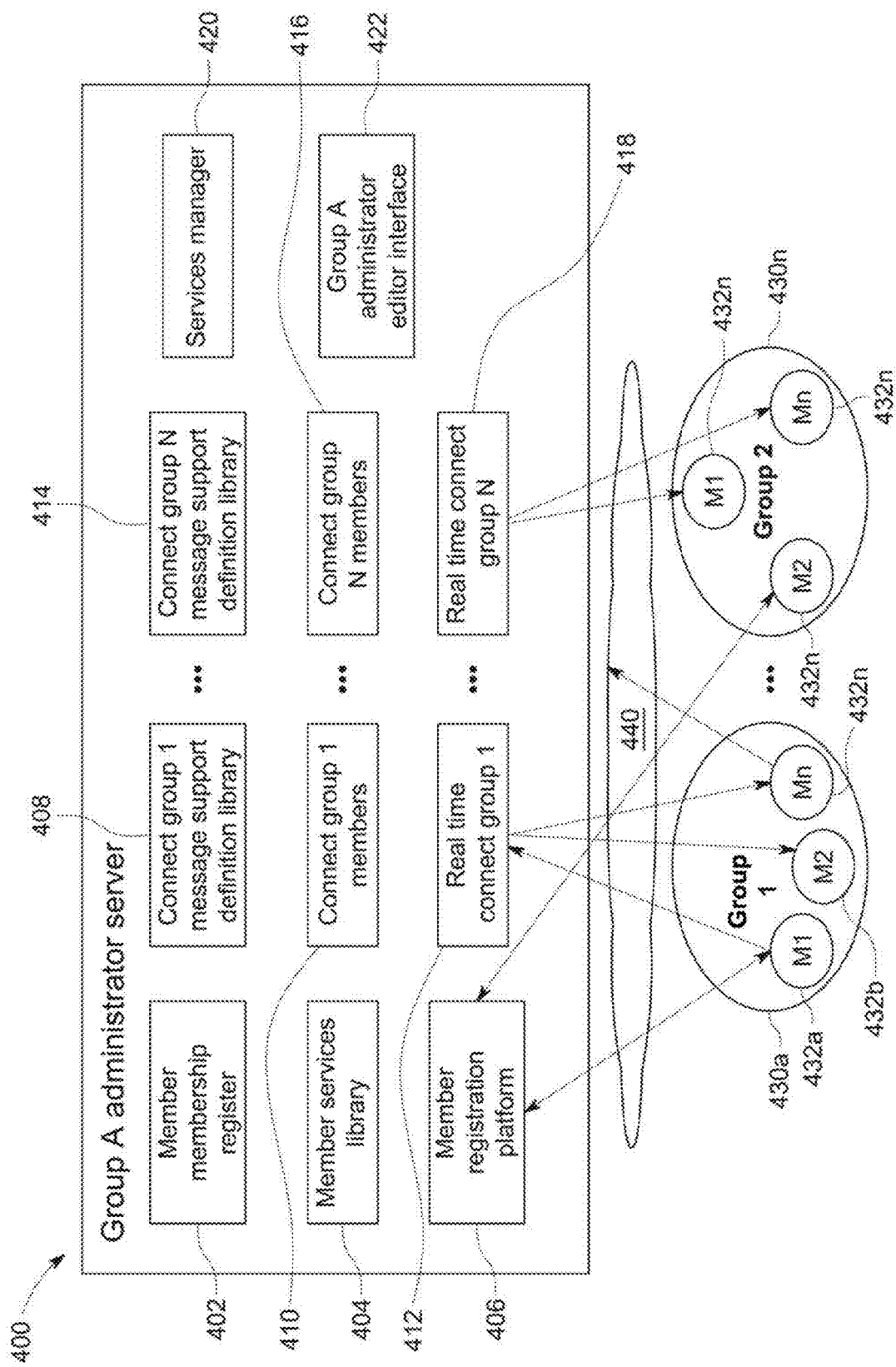
FIG. 4 illustrates a group administrator server according to an embodiment.

In various embodiments, there is a computer-implemented system for communicating a message over a network using a secure messaging protocol between two computing devices in a group. As shown in FIG. 4, the system utilizes a first group administrator server 400 comprising a membership register 402, a member service library 404, a member registration platform 406, a service manager 420, at least one message support definition library 408, 414, and a first group administrator editor interface 422.

As depicted in FIG. 4, Group 1 includes members M1 432a, M2 432b through Mn 432n. Each of members M1 $432_a$, M2 $432_b$ through Mn $432_n$ registered to be a member of Group 1 through member registration platform 406 and the registration information of each of members M1 $432_a$, M2 $432_b$ are stored in a connect Group 1 members register 410. Members M1 $432_a$, M2 $432_b$ through Mn $432_n$ communicate with each other through real time connect group 1 412 in the Group A Administrator server. The messages that Group 1 members may use to communicate with each other are defined by the contents of the Connect Group 1 Message Support Definition Library 408.

Similarly, Group N includes members M1 $432_a$, M2 $432_b$ through Mn $432_n$. Each of Group N members M1 $432_a$, M2 $432_b$ through Mn $432_n$ registered to be a member of Group N through member registration platform 406 and the registration information of each of members Group N members M1 $432_a$, M2 $432_b$ through Mn $432_n$ are stored in a connect Group N members register 416. Members M1 $432_a$, M2 $432_b$ through Mn $432_n$ communicate with each other through real time connect group 1 412 in the Group A Administrator server. Members M1 $432_a$, M2 $432_b$ through Mn $432_n$ communicate with each other through real time connect group N in the Group A Administrator server. The messages that Group N members may use to communicate with each other are defined by the contents of the Connect Group N Message Support Definition Library 414.

The message support definition library 408, 414 contains one or more digital prefabricated icons. In one embodiment, the prefabricated icons provide the only message content allowed by the message system of this disclosure. Thus, in various embodiments, there is a storing of one or more of a prefabricated icon in a message support library of an electronic message system. Each prefabricated icon provides at least one of a celebratory, positive or festive message. Advantageously, the prefabricated icons are created by or for the administrator and may not be altered by the user. In one embodiment, a prefabricated icon may include alpha numeric symbols (individual numbers and letters) but the alpha numeric symbols (individual numbers and letters) included in a prefabricated icon may not be modified by a user. According to that embodiment, the user may only freely assemble the prefabricated icons that are in the message support library to send messages. For instance, a user may not type the letters H-E-L-L-O. Rather, by this disclosure, in the said embodiment, the user may only locate and use one of the prefabricated icons bearing the letters H-E-L-L-O to convey that communication. As another example, a user may not type C-O-N-G-R-A-T-U-L-A-T-I-O-N-S. Rather, by this disclosure, the user may only locate a prefabricated icon with these words to convey that communication. Additionally, only prefabricated messages may be inserted into messages as explained below. In that particular embodiment, a user may not type any text characters to form words, acronyms or composite structures to simulate actual words (e.g. "H3ll"). Nor may a user use text characters to form emoticons.

It is seen from the above description that the first administrator server provides service to at least a first group of users $430_a$, having individual members $432_{a-n}$. The first group administrator server provides services of connecting the first group to a first message support definition library 408, connecting the members of the first group 410 and providing real time connect for the first group 412.

In an embodiment, individual users 432 may register with the member registration platform 406. A user may provide such information as the system may require to register, however the registration only needs sufficient information so as to identify the user, so a user may log in to the app to send and receive messages. The system may require other information, however for the basic operation of the messaging system, no personal data is required. Once a user registers with the membership registration platform 406, the user membership data is recorded in the member membership register 402. With the user identified to the system, the system may download the appropriate programs (apps) to run on the user's computing device. The programs come from the member services library 404, and may be adapted to fit to the particular operating system of the user device, as well as other parameters to provide the best performance of the user.

In some embodiments, the member registration platform 406 acts as an open gate, but not as a gate keeper. The member registration platform takes user information, such as a log in ID and password, but otherwise does not restrict any user to access the system. Individual users may send messages within the system by only using the prefabricated positive message icons. Thus, in some embodiments, a gate-keeper function is not needed to prevent bullying or undesirable content since such undesirable content may not be generated within the system.

Once the user is registered and has access to the appropriate software, the user may engage in messaging other members of the messaging service. In an embodiment, a user $432_a$ of Group 1 may have presented to his member computing device at least one prefabricated icon configured for placement into a message for communication over the electronic messaging system. The user $432_a$ may connect to a first group 408 and generate messages using that message support library. When the user has created a message, s/he may send it to other members of the group 410 via the real time connect to the group 412. In an alternative embodiment, the connect may not be in real time, but have some amount of delay before either transmission or receipt of each message. Rules for connections may be found in the member services library 404.

The transmission and receipt of messages, and the communication between the user device of user $432_a$ and the group A administrator server may be through the cloud/web 440. The number of users that may access the administrator server is only limited by the capacity of the server and the bandwidth of the communication through the cloud/web 440. Other members $432_n$ may join a first user $432_a$ to form a group of users $430_a$. As the service gains more users, and the users form different groups of interests or topics, the number of users $432_n$ and groups $430_n$ expands. In some embodiments, the message support definition library $408_{a-n}$ of each group may be the same, or different from the other message support definition libraries. Each group may have a specialized message support definition library associated with their particular group. In still other embodiments there may be a large percentage of common icons in the various message support definition libraries with only small variations. In yet other embodiments, the libraries may all be the same. In some embodiments there may be a single main library, where each message support definition library has a limited access to the material of the main library.

In an embodiment, there is a services manager 420 that oversees the icon message support definition library, where libraries are organized according to a plurality of criteria, including languages and countries, alphabetical order of the prefabricated icons' titles, sports and groups of sports (summer, winter), gender, age, editions, year of issue, type of electronic file, etc. The services manager may add, remove or modify the pre-fabricated icons in any message support definition library. Changes to the library may involve the addition, removal or modification of any prefabricated icon stored in the library, or a change in the association of an icon to any tag, search term, title or alphanumeric code, or other parameter by which the icon may possess. In some embodiments the service manager may be a software or operation tool that has rules and parameters defined for the server operation. The services manager may perform automatic updates, or be used to provide manual updates to the message support definition library.

In some embodiments, the administrator editor interface 422 may be an administrator interface as previously described. The administrator interface may be for a person with administrator access to interact with the administrator server 400. The administrator may have access to the member services library 404 to make changes in the various programs stored there. Updates and changes to software programs are required to keep pace with changes associated with user platforms. In some embodiments the administrator may make changes to the membership register, by adding, deleting or altering group associations of different users.

In an embodiment, there is a computer-implemented method for communicating a message over a network using a secure messaging protocol between two computing devices in the network. The method comprises storing one or more of a prefabricated icon in a message support library on an electronic messaging system. Each prefabricated icon providing at least one of a celebratory, positive or festive image. The method also presenting to a member computing device at least one prefabricated icon configured for placement into the message for communication over the electronic messaging system. The method also comprising selecting at the member computing device of one or more prefabricated messages for insertion into a message field of the message, the message field being associated with a header field to complete an electronic message. The method also receiving at a network computing device of the electronic message system the message selected at and transmitted by the member computing device. The method broadcasting a transmitted message to the member computing devices subscribing to membership in a communication group service associated with the member computing device sending the message. The message sent by the method does not contain content other than the one or more prefabricated icons.

The group A administrator server may provide the services described to additional groups $420_{b-n}$ as desired. Each group may have a corresponding connect group N message support definition library $408_n$, a connection for the N group members, and a real time connect for group N members.

Figure 5:
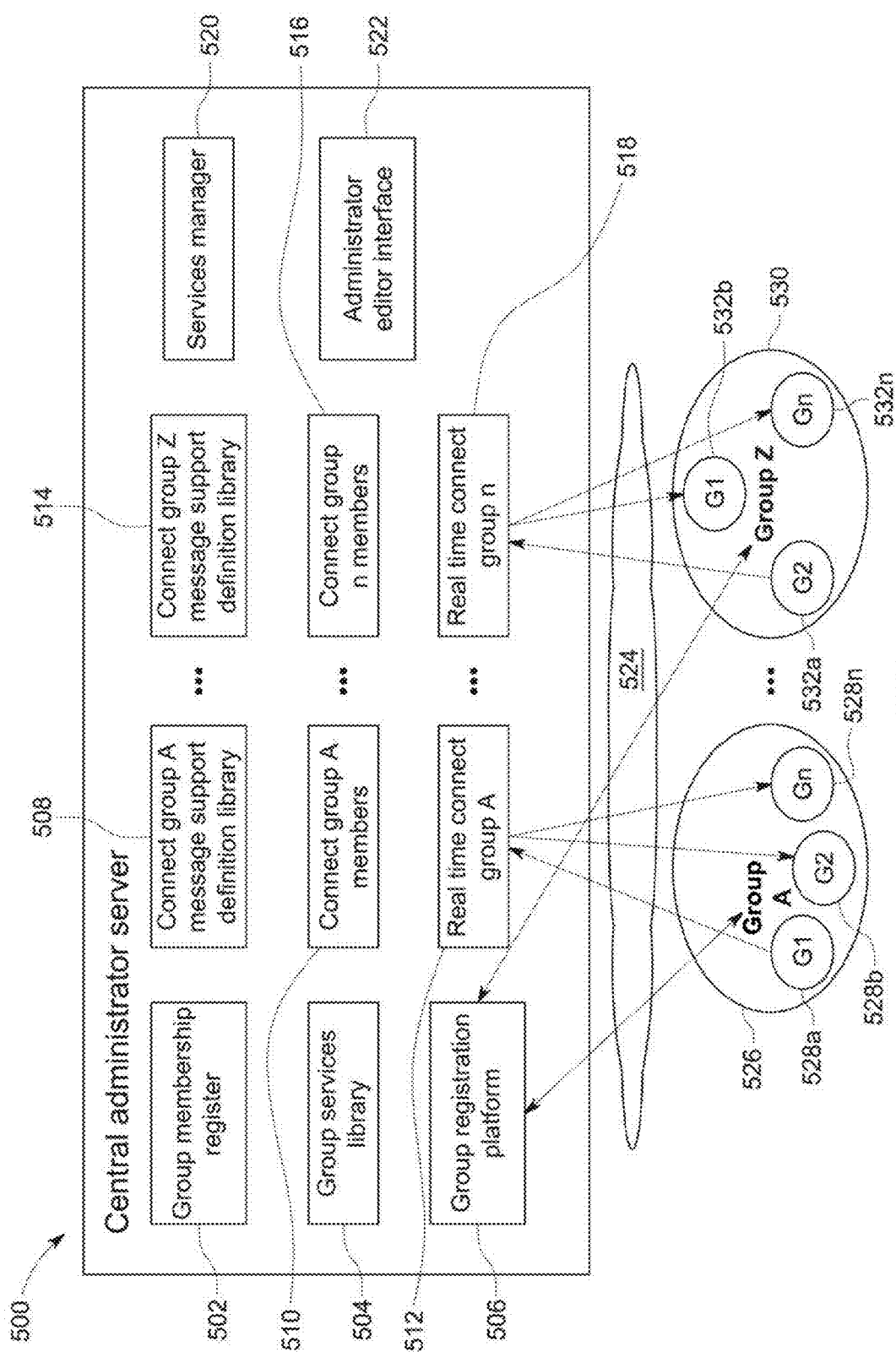
FIG. 5 illustrates a central administrator server according to an embodiment.

In other embodiments, there may be a central administrator server 500 for use with groups using the messaging system instead of individual users (FIG. 5). Operationally, the structure for managing groups is similar to the structure used for creating the messaging system for individuals. Individual groups G1, G2, Gn (528a, 528b, 528n) may combine to form a sort of "super group A" 526. The supergroup 526 may register using the group registration platform 506. The registration may pass through the cloud/web 524. Once the super group 526 is registered, their data goes to the group membership registration 502. The group may receive application data to their individual user devices from the group services library 504. When the super group 526 is connected to the system and has the system applications installed, the super group may engage in sending messages using the system of the present disclosure.

In some embodiments, the super group 526 has member groups $528_{a-n}$, that may communicate in real time with the connect operation of the central administrator server 512. Through this portal, the supergroup 526 members may communicate with each other, or other subgroups, or other supergroups $530_{a-n}$ by creating messages from the message support definition library $508_{a-n}$ and through the connections to members $510_{a-n}$. The group server also has a services manager 520 to manage the message support definition library, and an administrator editor interface 522.

FIG. 4 depicts one embodiment of this disclosure where members $432_a$, M2 $432_b$ through Mn $432_n$ in Group $G_1$ communicate with each other through real time connect group 1 412 in the Group A Administrator server and the messages that Group 1 members may use to communicate with each other are defined by the contents of the Connect Group 1 Message Support Definition Library 408.

FIG. 5 shows a different embodiment wherein members $432_a$, M2 $432_b$ through Mn $432_n$ in Group 1 may communicate not only with each other through real time connect group 1 412. But members $432_a$, M2 $432_b$ through Mn $432_n$ in Group $G_1$ may also communicate with members in Group $G_2$ through Group G. For example, Group $G_1$ may be a group of members who are avid followers of European soccer. Group A may be a group of members who are avid followers of World Cup Soccer. While different rules may apply to when a communication from members $432_a$, M2 $432_b$ through Mn $432_n$ in Group $G_1$ go only to members of Group $G_1$ and when a communication from members $432_a$, M2 $432_b$ through Mn $432_n$ in Group $G_1$ also go to other members in Group A, the common soccer interest of both groups lend itself to supergroup as herein disclosed.

Figure 6:
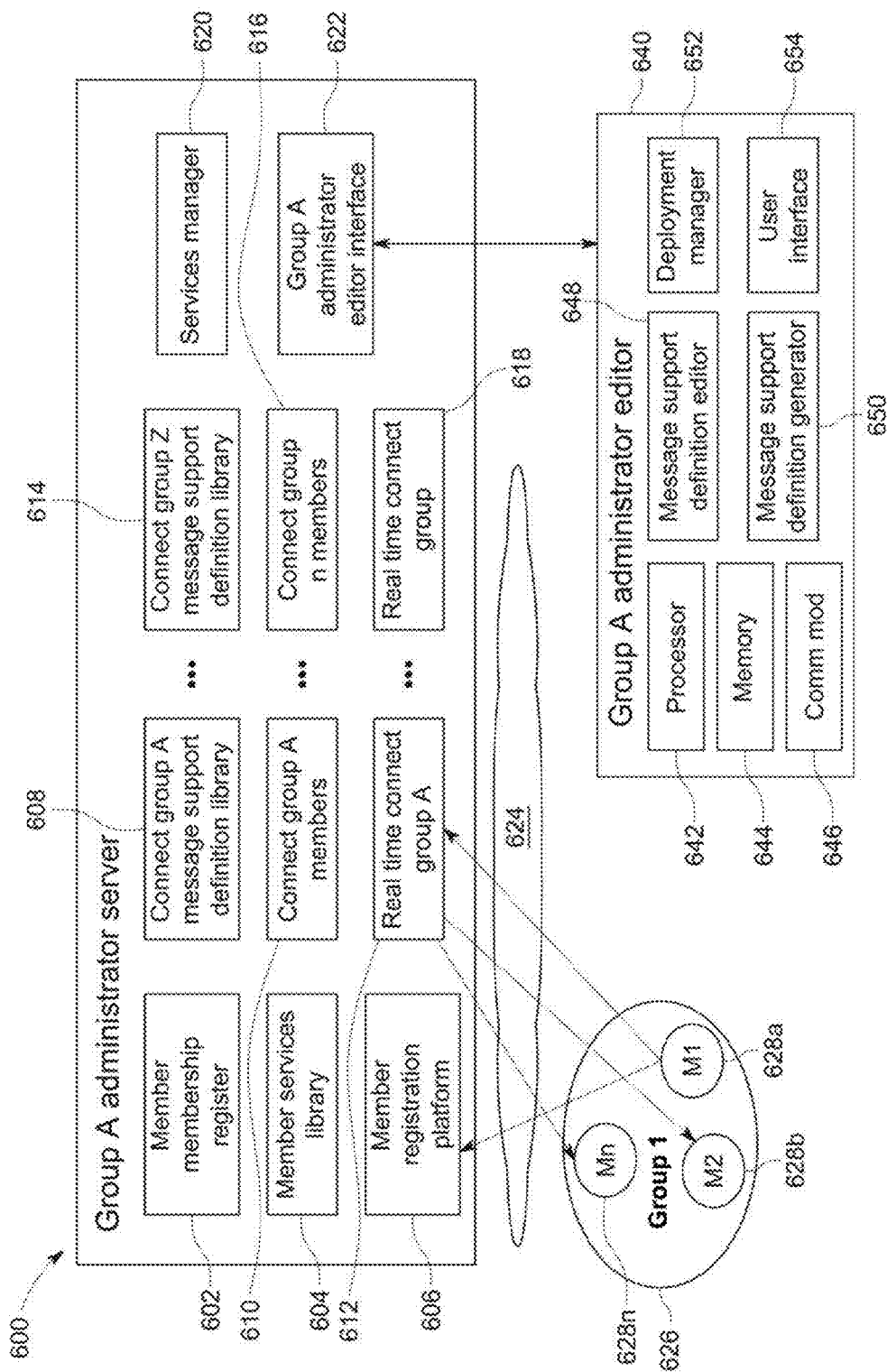
FIG. 6 illustrates an administrator editor and server according to an embodiment.

In some embodiments, there is an administrator editor 640, as shown in FIG. 6. Here the administrator editor for Group A is shown as a non-limiting example. The group A administrative server 600 has similar components and operations as previously described. There may be a member membership register 602, a member services library 604 and a member registration platform 606. A group of users 626, along with their individual users $628_{a-n}$ may connect through the cloud/web 624 to the member registration platform 606, and the real time connect group A $612_a$. The users may get the message icons from the connect group A message support definition library $608_a$, and connect to other members of group A $610_a$ via the real time connect 612. The server also has a services manager 620 and administrator interface 622.

The administrator editor 640 may contain a processor 642, a memory 644, and a communication module 646. There may be a message support definition editor 648, a message support definition generator 650, a deployment manager 652 and a user interface 654. The administrator editor may connect to the server through the administrator editor interface 622.

Advantageously, assigning a Group A Administrator Editor to Group A and other administrators to other groups lend itself to a focused evolution of prefabricated icons and rules for each group consistent with the common interest of the group. For example, if Group 1 is made up of members $432_a$, M2 $432_b$ through Mn $432_n$ interested in European soccer and Group 2 is a group made up of members interested in women's international ice skating, separate administrator assignments may allow for more meaningful prefabricated icons and messaging rules developed for each group.

Figure 7:
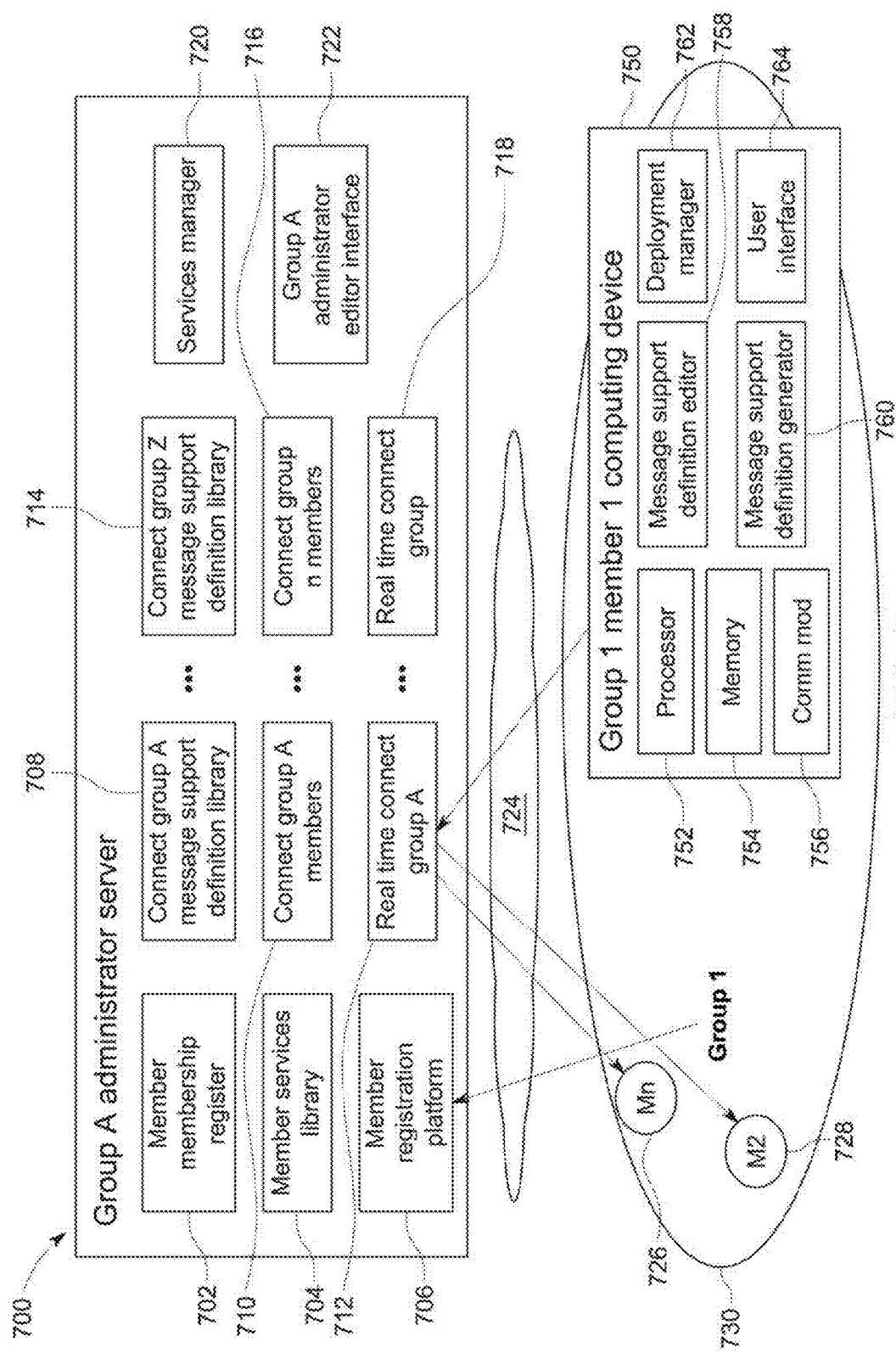
FIG. 7 illustrates a member computing device interaction with an administrator server according to an embodiment.

In an embodiment, there is an example member-computing device 750 for using the messaging system of the present disclosure as shown in FIG. 7. In an embodiment, the member computing device 750 comprises a processor 752, a memory device 754, a communication module 756 with a user interface 764 and a display (not shown). The member computing device has a message support definition editor 758 and a message support definition generator 760. The generator 760 may be used by the user to produce templates, or retrieve templates, of acceptable message formats. These formats include blanks or fields that may be populated by prefabricated icons from the message support definition library 708, or with icons already in the template itself. The message support definition editor 758 may be used to reposition or perhaps resize or reorient the various prefabricated icons from the library. The editor 758 and generator 760 are generally software tools, but may also be hardware components, or a mix of hardware and software. The member computing device 750 may also have a deployment manager 762 and be connected to the administrator server through the cloud/web 724. Each user computing device may have similar characteristics such that each user device functions in essentially the same manner with respect to the external administrator server 700.

Figure 8:
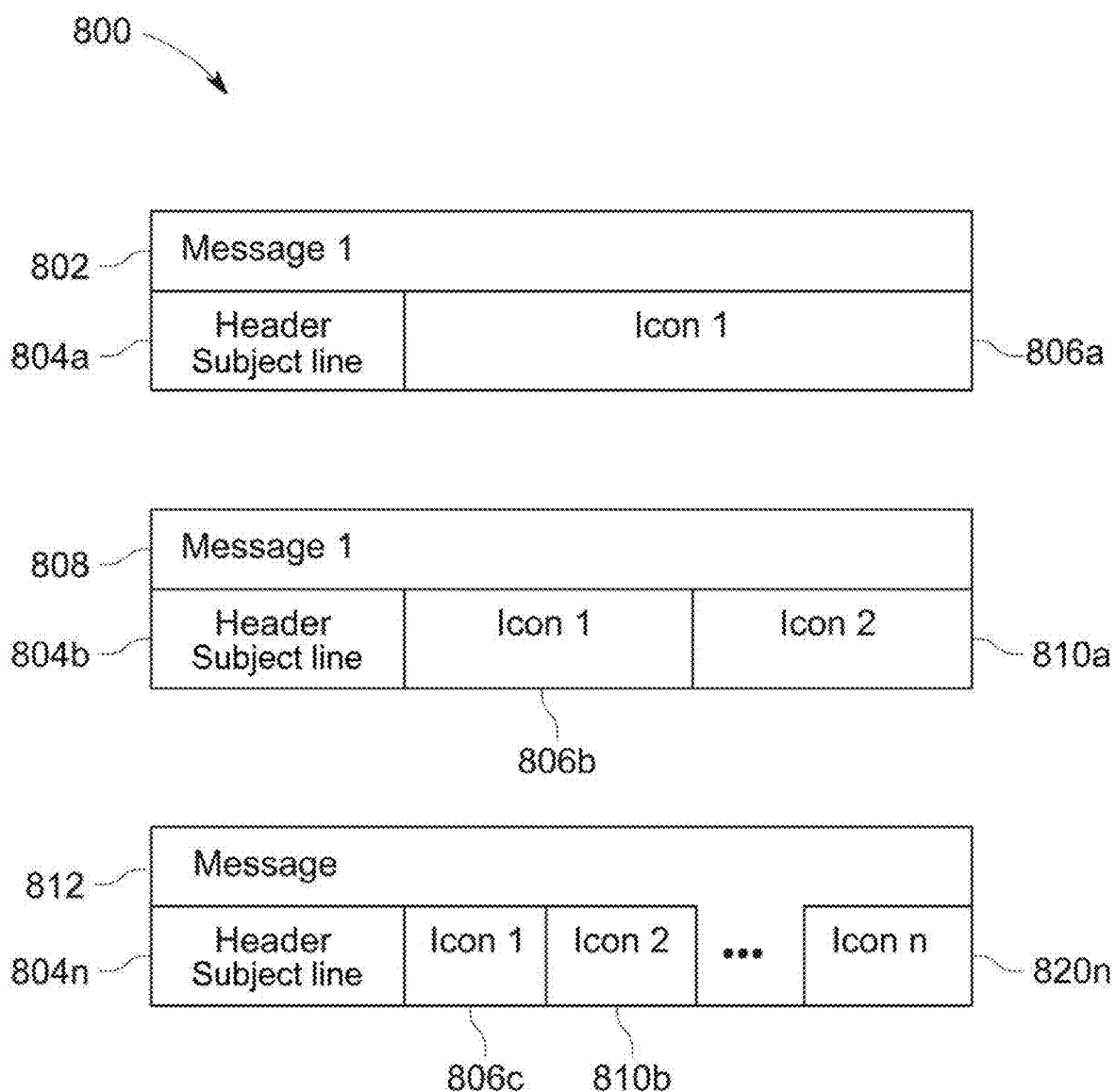
FIG. 8 illustrates samples of constructing messages according to the various embodiments.

Several non-limiting examples of a message templates 800 are now illustrated in FIG. 8. Each message for use with the present disclosure may have a header section 804, and a message section 806a. The message content field contains one or more prefabricated icons selected by the user for the message to be sent.

In an embodiment there may be a message 802 for the display of a single icon $806_a$. The message header field $804_a$ may provide the necessary information, including a subject line, to address the message to the proper recipient. In one embodiment, the message header field $804_a$, is programmed to be editable by the Administrator but un-editable by the user. It may include data regarding a user group, a super group or an individual, all of whom are identifiable by the system. In that embodiment, the message content field in message 802 contains only one prefabricated icon selected by the user for the message to be sent.

In another embodiment, a message 808 may have a message header field $804_b$, containing similar information regarding the recipients. The message 808 contains two message content $806_b$ and $810_a$ for inclusion of two prefabricated icons selected by the user for the message to be sent.

In the embodiment described above, upon inserting prefabricated icon(s) in the active field of the message, the title(s) of the particular icon(s) so inserted into the message field are automatically posted into the subject line of the header.

In another embodiment, there is a message 812 again having a single header field 804, of the message, along with multiple message content fields for the containing multiple prefabricated icons $806_c$, $810_b$ ... $820_n$ selected by the user for the message to be sent.

It should be appreciated that the arrangement of the icons may be in any fashion. Templates for use with the messaging system may arrange the prefabricated icons selected by the user according to the content layout provided by the template. The template may be displayed for the user to visualize how the prefabricated icons selected for the message to be sent will look to the recipient of the message. For example, a template may be configured to display one or more prefabricated icons in a symmetrical way on a display screen. For example, the template may show a single prefabricated icon in the center of the displayed message, two prefabricated icons spaced apart and side by side, three prefabricated icons at three corners of an imaginary triangle, four prefabricated icons at the four corners of an imaginary square, and so on. In other embodiments the icons may be arranged according to the configuration of the template in a linear fashion, either a row of icons up and down, or side to side. In some embodiments the row of icons may be in a diagonal, horizontal or vertical line. In some embodiments the icons may be arranged in a circular fashion, a geometric pattern or a random patter within the display field.

In one embodiment, the header information of the messages may be displayed in plain un-editable text (such as "Group A—Baseball fans") as represented to the system in a user account, group user account or user address (such as an IP address). According to this disclosure, a user may not edit the header field of a message while creating a message since that is part of the user configuration in the group(s) in which the user is a member. Further, the user may also not alter any of the prefabricated icons that a user may insert into a message. The messaging permitted a user by this disclosure is limited to the selection and presentation of prefabricated icons designed by or for the administrator on user selected templates designed by or for the administration.

This disclosure thus provides an electronic messaging system that may accept users and allow messaging without cyber bullying since only the messaging language of the administrator is permitted for messaging. That language is the language embodied in the prefabricated messages, templates, rules, and other features designed by or for the administrator. The communication language of this disclosure employing prefabricated positive messages serve as filters. Since these messages are positive messages only positive messaging communication is permitted by this disclosure. The messaging service of this disclosure may be used to foster positive feedback for its members. The prefabricated positive messages of this disclosure serve as filters on negative messaging and cyber bullying since the only communications permitted are the prefabricated positive messages of this disclosure. This disclosure does away with the reliance on detailed and invasive filters that are conventionally used to attempt to weed out people who may have negative intent in their communications.

Figure 9:
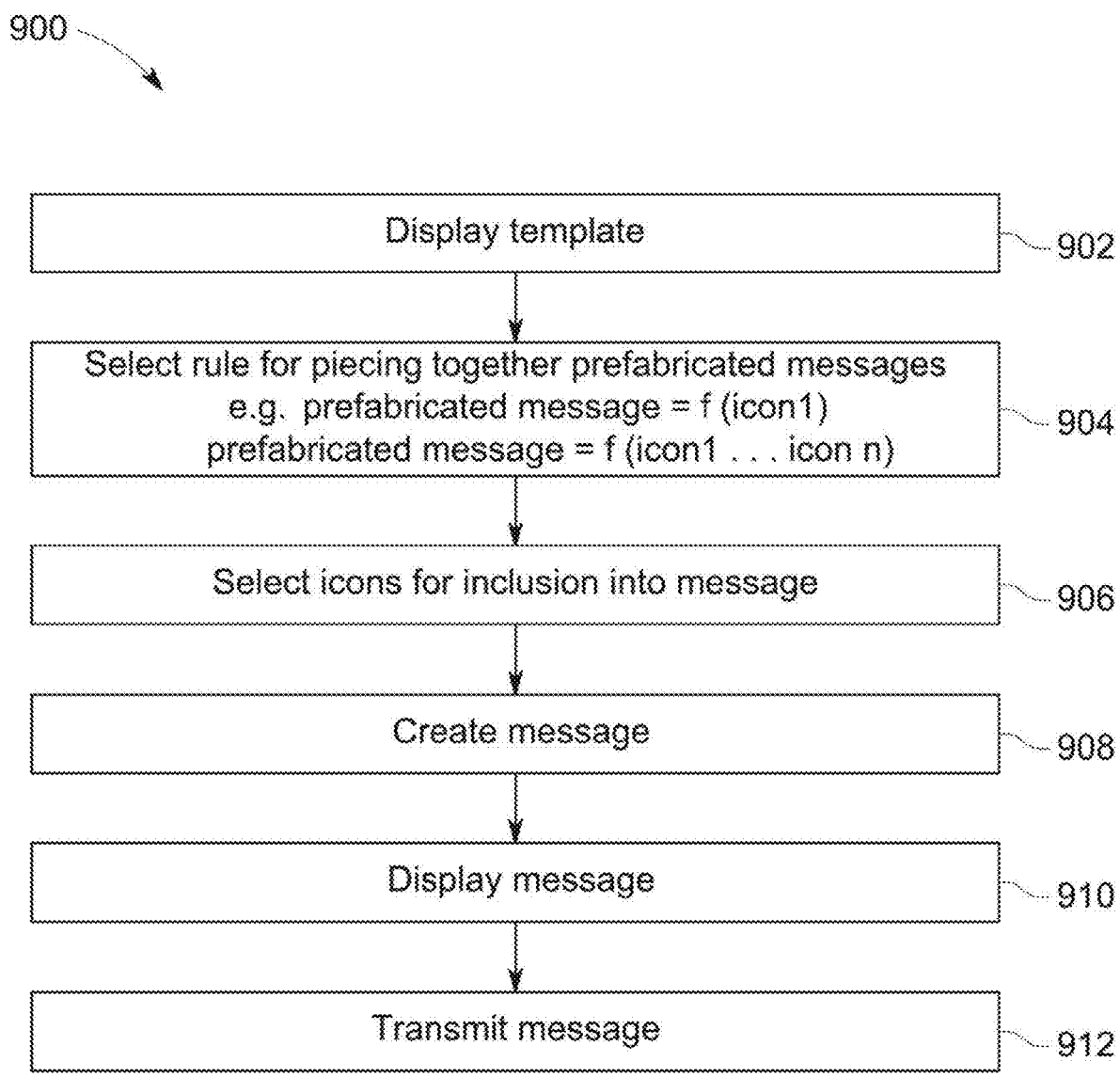
FIG. 9 illustrates a method for generating a user display template.

The creation of a message may follow a template 900, such as illustrated in FIG. 9. In a non-limiting example, a display template 902 may be called up by a user on the user's display. The user may navigate through a variety of templates having different visual appearances, but providing fields for the placement of prefabricated icons from the system. A user may select any available template, and then follow a straight forward procedure of populating the open fields of the template with icons from the system libraries. The user selects 906 as many icons as desired for the message, and then manually inserts them into the available message fields of the selected template. In an alternative embodiment, once the user has identified the icons s/he wants to use, the system may auto-populate the template with the selected icons. Once the fields are populated with icons, the user may opt to create the message 908, at which point the system will lock in the user's preferences for the message and display the message 910 for the user to see. The user may then opt to transmit the message 912 to the desired recipients.

Figure 10A:
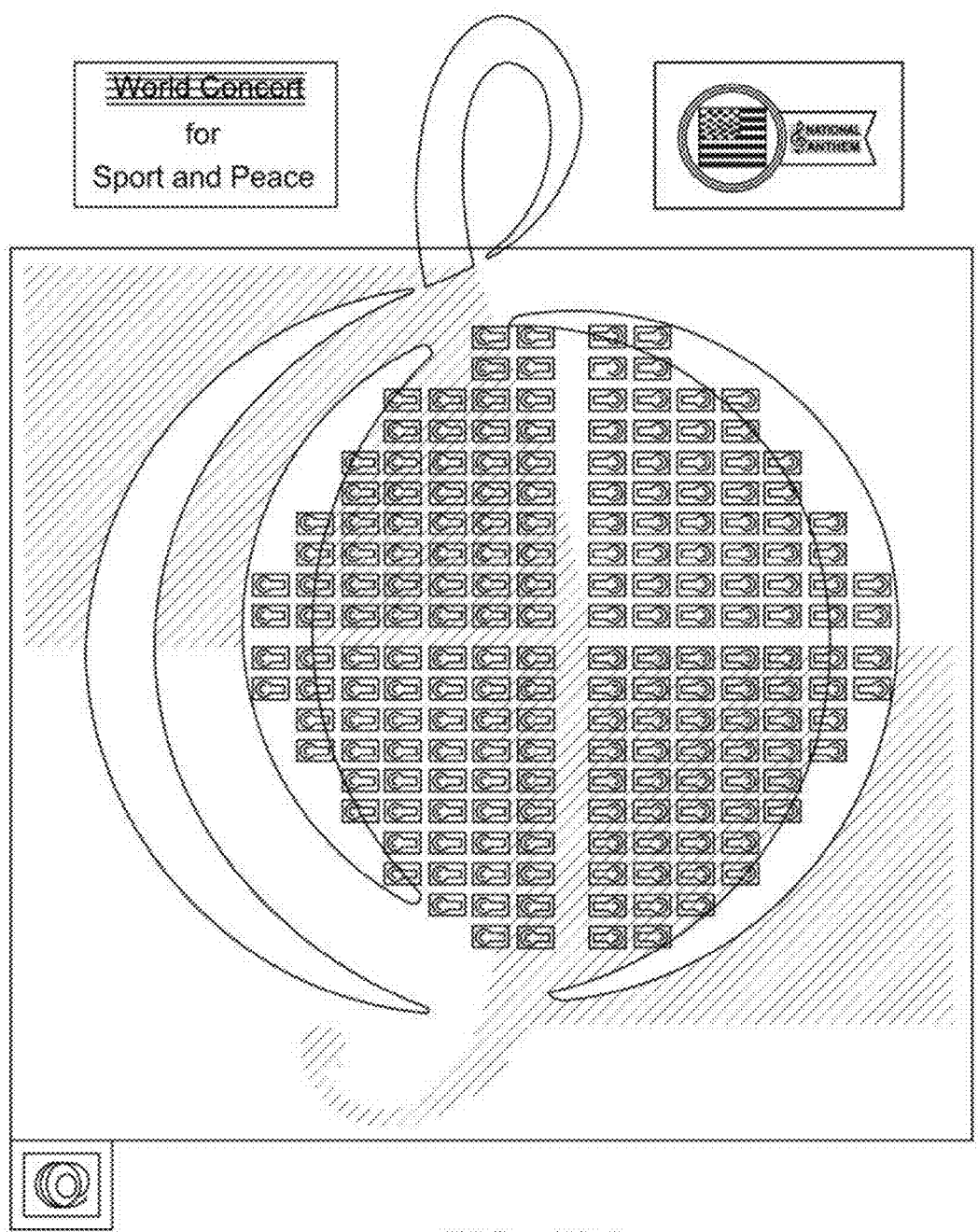
FIGS. 10A-C illustrate a template for a pre-composed message, a sample ID card and a schematic of memorabilia exchanges according to an embodiment.

An example template for use with the system of this disclosure in composing messages is shown in FIG. 10A. The sample template provides four prefabricated icon fields. In some embodiments, all the fields may be populated by a user. In other embodiments, one or more of the fields may be populated while other fields may be predetermined by the template.

In an embodiment where the fields are active, in the FIG. 10A example, a single large field appears in the center, with two smaller fields in the upper corners, and a single smaller field in the lower left. In one aspect, the size of the windows may all be defined by the selected template. In another aspect, the template may allow the fields to be enlarged or reduced in window size depending on how the user wants to present the message and what prefabricated icon the user may seek to dominate the message field. For example, a larger window may be used to convey the primary message, while smaller sized fields may be used to show icons representing messages the user wishes to convey at a lesser or secondary level.

In the non-limiting illustrated example, the principal field shows all the members of the user's messaging group presented in a musical clef note design. In this example, the prefabricated icon chosen by the composer of this message chose a clef note. However, the composer may choose other shapes in which to display the users of the messaging group.

A user may select a prefabricated icon that contains word icons. However, a user may not change the words or any other aspect of the prefabricated icon using his or her alphanumeric.

No user may use the messaging system of the present disclosure to compose messages that do not include at least one prefabricated icon selected from libraries, which icon conveys a positive message.

According to the design of the present messaging system, the message constructing template cannot be used without at least one prefabricated icon(s) selected from the library being inserted into its message field, which insertion causes the title(s) of the particular prefabricated icon(s) to be automatically inserted into the subject line field of the header of the message constructing template.

Each field may only contain a prefabricated icon. The prefabricated icon may be created by or for the administrator to contain alpha-numeric characters pre-arranged into a positive, celebratory or cheerful message. But no user may ever edit the prefabricated messages or creating their own message from alphanumeric symbols.

Figure 11A:
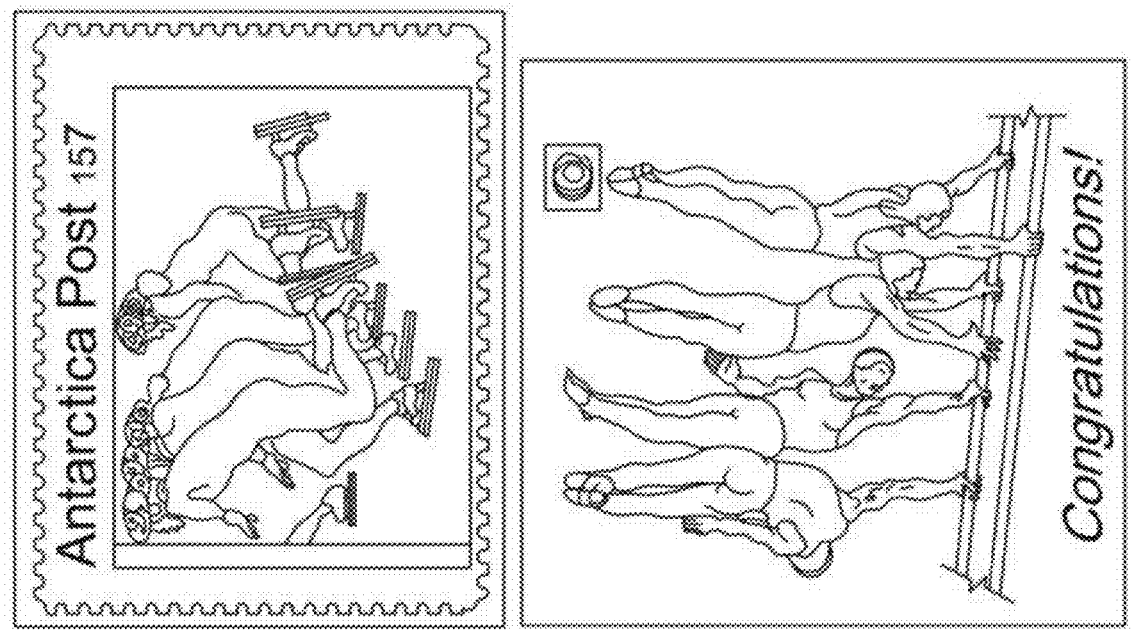
Figure 11A:

Examples of prefabricated icons are now presented in FIG. 11A. The prefabricated icons may be stylized in an artistic fashion, and may show art identifying a particular sport, event, hobby or other common interest among two or more users. Each icon may have a stylistic feature (such as a postage stamp, wine label, imitated artist style, and so on), combined with words and phrases to convey a particular idea. Some ideas may be "good luck!", "happy birthday!" and so on.

The prefabricated icons envisioned for use with the message system described herein are more complex than emojis and emoticons in that the prefabricated icons have individualized artistic elements. The icons may include words and symbols as part of the icons but do not use alpha-numeric symbols that allow individual users to generate natural language texts or even emoticons.

In some embodiments, where the prefabricated icon comprises an image with a word or words, the word may convey a positive, festive or congratulatory message as well as the art of the icon, which similarly conveys a positive, festive or congratulatory message on its own. These individual icons, or icons with text may provide an image of an event with a word that spells out the event, such as "victory" over an icon of a gold medal, or "diploma" over an icon of a graduation cap, and so on. In some embodiments, a user may be able to mix a prefabricated icon of a picture, with a prefabricated word icon and form an overlay of the two icons. In all cases, these prefabricated icons are created by or for the administrator. A user may never alter a prefabricated icon according to this disclosure.

Figure 11B:
Figure 11B:
Figure 11C:
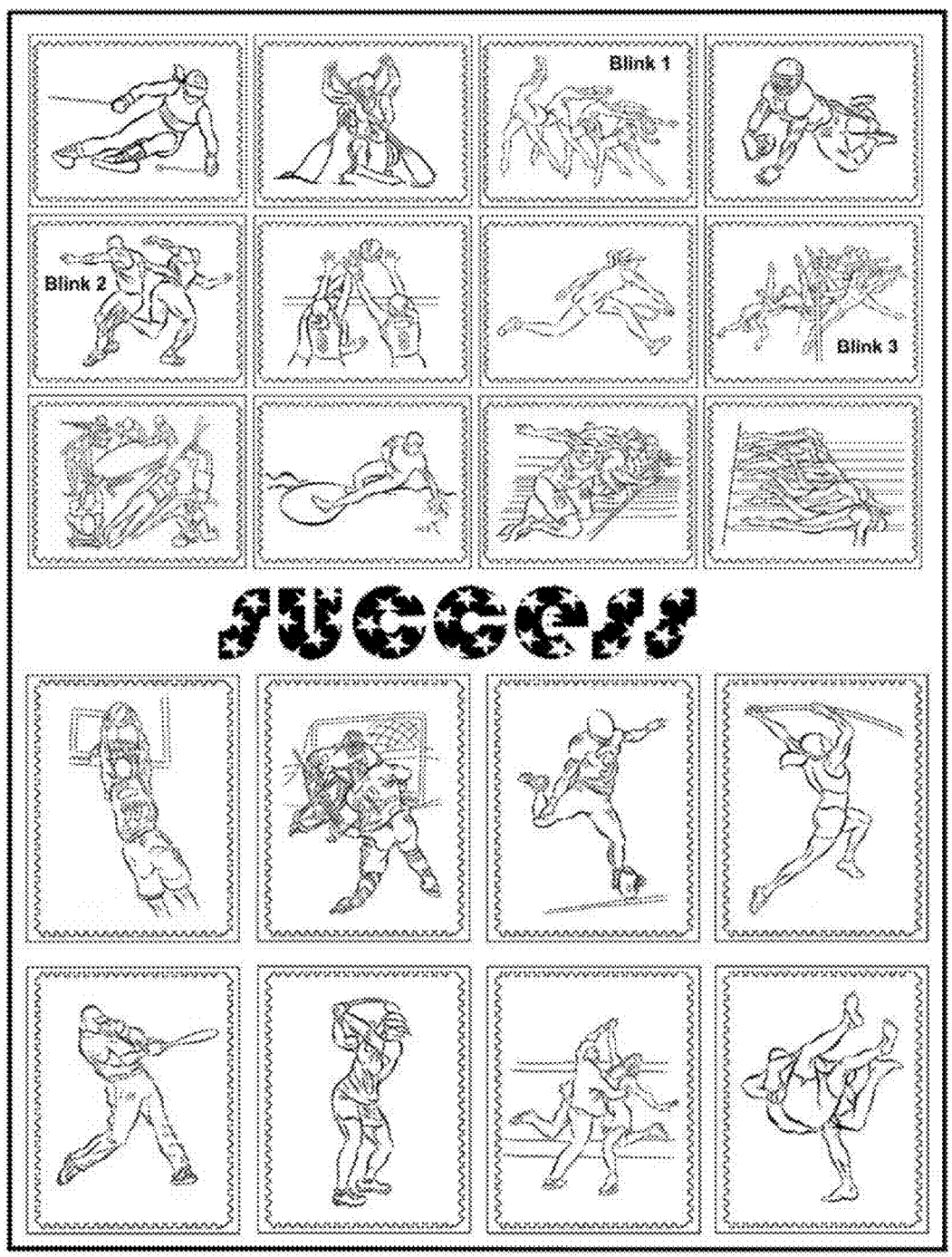
Figure 11D:
Figure 11D:
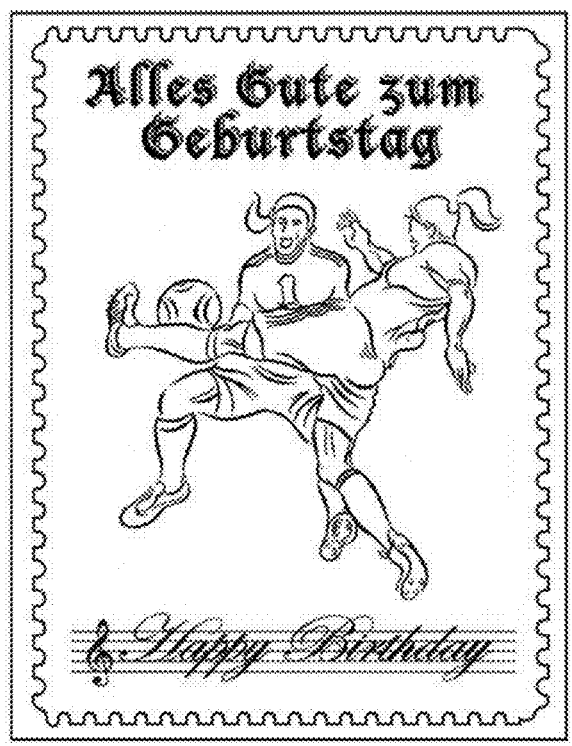
Figure 11D:
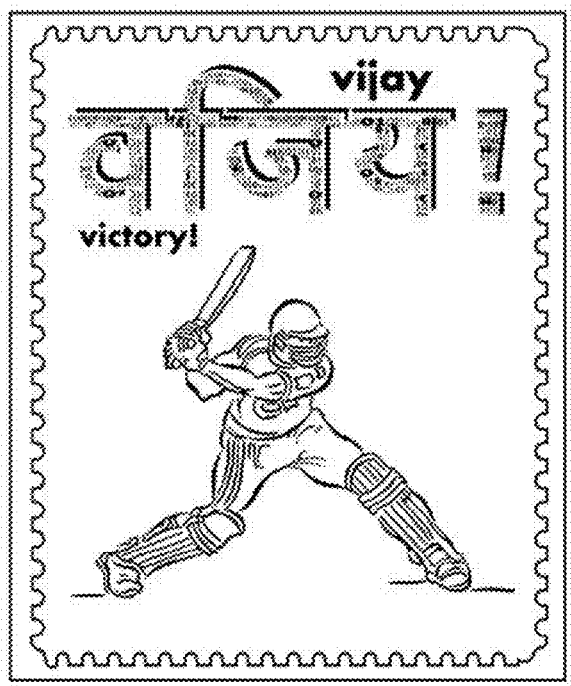
Figure 11D:
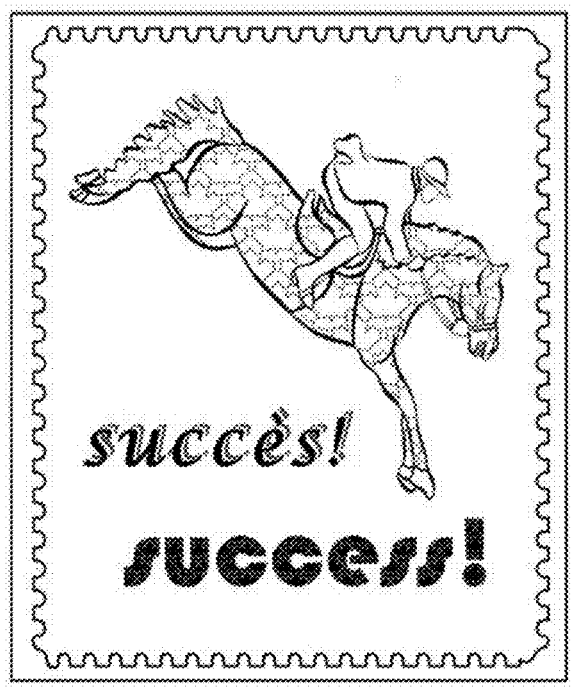

Additional examples of association of icons (such as sports images) and word prints associated to form messages that convey a positive, festive or congratulatory message are provided in FIGS. 11B-E. In some embodiments, an image of an individual playing a sport such as soccer may be associated with a word or words that show an inspirational message, such as "victory!" displayed in several languages as in Fib. 11B. FIG. 11C illustrates an examples of various sports related icons associated with the word "success", and examples of "blink" animation. Anyone of the icons may be selected for a particular message and associated with the word image to form a composite icon as previously described. FIG. 11D provides additional examples of prefabricated icons that include both an image and a word icon(s), where the word icon(s) are coated or wrapped in patterns like flowers (invitation) or a binary display (cricket) or leaves (equestrian), or take the form of a musical arrangement (soccer) and where more than one language and alphabet are used. FIG. 11E illustrates an example of subject line management in an embodiment that includes an email platform, where the word icon of the prefabricated icon, that is also the title of the message, is posted into the subject line of the email platform in a format that is compatible with the format of the email platform.

The association and presentation of these various icons are designed to present a positive, festive or congratulatory message and generate similarly positive feelings in the recipient of those messages.

Figure 12A:
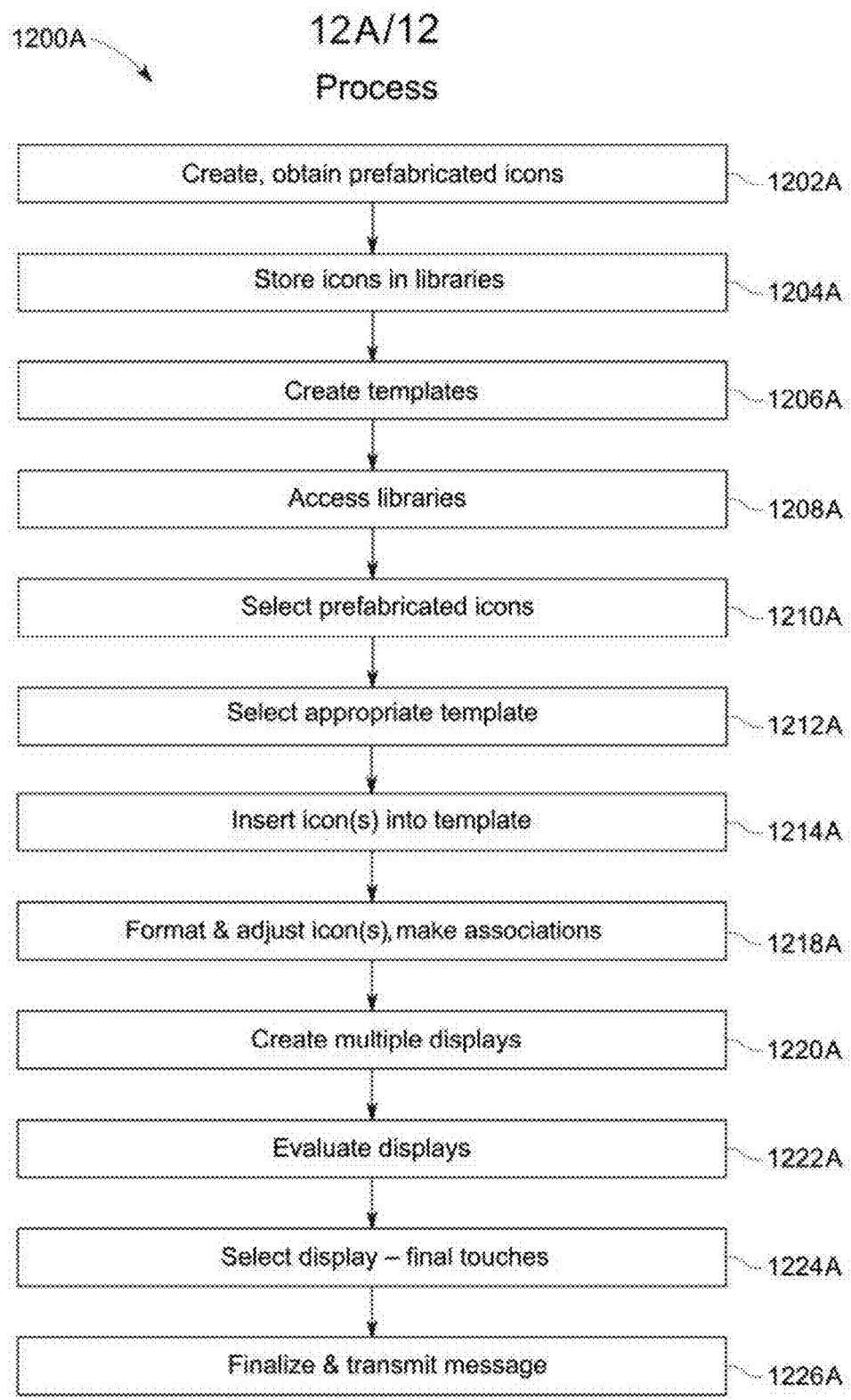
FIGS. 12A and 12B illustrate a process for creating a pre-composed message using prefabricated icons according to certain embodiments.

FIG. 12A provides an example, without limitation, of the process of constructing a message using prefabricated icons. FIG. 12A lists the steps usually taken by a user in the process of constructing a message according to an embodiment. The process starts with generating, creating, making, fabricating, sourcing or obtaining icons 1202A. Once the icons are available, the icons are stored in libraries 1204. Icons in the library are then presented to a member computing device for placement into one or more templates 1206A, which are made available for various types of messages. To create a message, the user accesses the library 1208A and selects 1210A one or more prefabricated icons according to the intended content of the message and then selects the template 1212A. The effective construction of the message comprises the insertion 1214A of the selected icon(s) into the message field of the message followed by formatting and adjusting 1218A manually or automatically the icon(s) in a plurality of associations and arrangements aimed at creating a plurality of displays of the message 1218A. After evaluating the displays 1222A the user selects 1224A the preferred display, performs final touches if necessary and finalizes 1226A the message for transmittal.

In some embodiments, the prefabricated icons of the method, system and process of this disclosure may have a plurality of images, images with words or images with alpha-numeric symbols. In other embodiments, the criteria for storing the icons in a library may be based on one or more of countries, alphabetical order, languages, sports, events, titles of the prefabricated icons ("congratulations", "victory", Happy Birthday"), age, year of release, editions and themes. In some embodiments the prefabricated image icons used in messages are animated prefabricated icons. In some embodiments the templates may only use prefabricated icons from selected libraries. In some embodiments the plurality of displays includes automated or animated displays. In these and other embodiments, the message has an artistic fashion to improve the celebratory, positive or festive message. In some embodiments the celebratory, positive or festive display of the message are improved through the use of support prefabricated icons. In some embodiments the plurality of associations and arrangements include word icons expressed in more than one language and one alphabet as depicted in FIGS. 11B, 11D and 11E.

Prefabricated Icons Vs. Pre-Composed Messages
Prefabricated Icons:
Generally, prefabricated icons include only icons: image icons and word icons. While, typically, prefabricated image icons contain only one image, or a multi-use photo vetted by the administrator, prefabricated word icons may contain one or more words (e.g. "congratulations", "great game", "happy birthday" etc.) that form a compact meaningful expression, like "happy mother's day". Irrespective of how many words make one prefabricated word icon, there is always one single unit, one single label, or card, that hosts each prefabricated word icon.

Pre-Composed Messages:
As a general rule, only messages may be pre-composed. Different than prefabricated icons, when pre-composed, messages are not assigned an alphanumeric code. Instead, they are assigned a title. Where the prefabricated icon is a word icon ("happy birthday") the title of the word icon is its message "happy birthday". Where the prefabricated icon is a mixed icon that contains both a greeting ("happy mother's day") and an image (flowers), the title of the particular icon is the message ("happy mother's day"). Where the prefabricated icon is a single image icon (flowers, only), the image icon is assigned a default title, which can be a generic title ("cheers") or the name of the library, gallery that hosts the particular image only icon, or other assigned title.

The individual distinction between a plurality of word icons titled "happy birthday" may be made by the unique alphanumeric code assigned to each prefabricated icon upon "fabrication" and/or by a name of each font of each word icon. Different fonts may be differentiated by comprising different binary codes for identification, by a descriptor of what each font illustrates (e.g. flowers, a sports scene, etc.), etc. Different than prefabricated icons, which are fabricated once for repetitive, multiple use, pre-composed messages are, regularly updated and may be always fresh as they are composed on the message constructing template only when they are needed. As a general rule, fresh messages are not stored in libraries but could be saved in a user's personal history.

It is in such a widespread case where the message that is ordinarily freshly composed on the message-constructing template when needed, reveals itself as a message pre-composed at the time of fabrication. Different than the original rule that only prefabricated icons are stored in libraries, such pre-composed messages become themselves messages pre-stored in libraries and galleries as both: prefabricated icons and pre-composed messages.

Codified Messaging System
Three distinct features may imprint a codified character to a messaging system.

With respect to the first feature, all messages are pre-composed, being made of only prefabricated icons pre-stored in libraries. The messaging system of the present disclosure does not operate with the common live user input from a keyboard. Prefabricated icons may be used to pre-compose words and/or expressions that have been "codified". "Codified" means that words and/or expressions have the same meaning in many (if not all) languages and/or cultures (e.g. "Happy Birthday", "Good Morning", "Happy New Year", "Congratulations", "Victory", "Thank You", etc.). An expression may become "codified" through consistent continuous and/or universal use over several years (e.g. hundreds of years) of the expression across the world.

With respect to the second feature, each prefabricated image icon(s) and word icon(s) is assigned a unique alphanumeric code and, separately, a title. Aside from the unique alphanumeric code, where the prefabricated icon contains a word icon (greetings), the word icon becomes the title of the prefabricated icon; where a particular prefabricated icon comprises only an image icon (flowers) a default title (like "victory" or "cheers", or the name of the library that hosts the particular image icon) is assigned automatically to the particular flowers icon.

In one embodiment, for each prefabricated icon the unique alphanumeric code and assigned title as well as the name of the hosting library are recorded by the messaging system and made available to the Administrator.

In some embodiments, where the same prefabricated icon(s) is expressed in more than one language and one alphabet, the working title of the prefabricated icon could be expressed in either the principal language and the principal alphabet of the message, or in either of the other language(s) and alphabet(s) of the particular message.

With respect to the third feature, the verb "to codify" may be defined as "to reduce to a code", to make a digest of, to arrange in a systematic collection. Synonyms include (but are not limited to): systemize, organize, arrange, order, structure, catalog, list, sort, index, classify, categorize, group. These may all be characteristics of the messaging system of at least some embodiments described herein based on prefabricated icons, for the following example reasons (non-limiting):

operates predominantly with codified popular greetings like: "happy birthday", "Happy New Year", "happy anniversary", "happy Valentine", "happy mother's day", "happy father's day", "have a great day" and a plurality of other codified expressions;

operates with codified, brief sports and other popular cheering expressions like: "congratulations", "cheering for you", "victory", "let's celebrate", "let's party", "you are the best" and a plurality of other codified cheering and congratulatory expressions;

the prefabricated icons of this disclosure are organized, systemized and stored in libraries and galleries based on criteria that includes: alphabetical order, titles, codes, languages or countries, sports and events, gender, age, editions, year of release, archive, types of icons: image icons, word icons, standard icons, customizable icons, fonts, support icons, animated icons, types of files, and a plurality of other criteria;

the prefabricated icons of this disclosure are available in a plurality of multi-color fonts, coatings, contours and other festive features, including displays of codified gold medals, national flags and titles of national anthems;

the prefabricated icons of this disclosure are reduced to a predominantly label format, for word icons ("brevis-Line" and "brevisMail"), and to a predominantly stamp format for image icons ("Stampiade").

BrevisLine and BrevisMail

BrevisLine, for any communication platform other than an email platform, and BrevisMail, for email platforms, may be the foundation of the present codified messaging system, method and process based on pre-composed messages as they embody the codified, prefabricated form of pre-composed word messages.

The content of BrevisLine and BrevisMail may be made of codified popular greetings, cheers and other short, concise expressions that have a widespread, in some cases universally understood, meaning.

BrevisLine and BrevisMail may operate with a relatively limited number of coded expressions, from a few tens to a few hundreds, available in all languages of the world, and in all alphabets and, sometimes, in more than one language and one alphabet for the same message.

Given their predominantly positive content and frequent use in festive, celebratory occasions, commonly these codified popular expressions are displayed in a plurality of colors, decorations and other festive, sometimes artistic, formats.

BrevisLine and BrevisMail may be presented in standard, pairing or matching and individually stylized options, all predominantly in a label format (or formats):

the standard format presents the greeting made of one or more pre-composed words, displayed in plain or decorated, coated or contoured fonts and accompanied by a small sign or image (code, signature, edition), all prefabricated in a compact, one piece, form. The standard format does not offer the option of adding to, or combining the word(s) of the message, with any feature, except for formatting;

the pairing or matching format adds to the standard format the option of combining or pairing, matching the greeting (words) with a plurality of display choices: frames, coatings, decorations, formats, all selected from the library or gallery of prefabricated support icons;

the individually stylized version requires connection to a dedicated, limited-use keyboard provided by the messaging system as well as access to a gallery of font ABCs. After selecting the preferred font ABC, the user can use the dedicated keyboard to replace the standard letters of the greeting with their new, preferred letters, without changing the word(s) of the greeting. Alternatively, the words can be changed with other words from the vocabulary of pre-printed, prefabricated word icons of the messaging system.

Some characteristics of the BrevisLine and BrevisMail type of messages are, for example, that the messages are prefabricated, pre-composed, complete, ready-to-go and/or re-usable.

Stampiade

Stampiade may be a collection of more complex messages, designed for all types of communication platforms, including email platforms, each message being made of two elements: (i) the message itself, i.e. the prefabricated word(s) element, which include(s) all the features of BrevisLine or BrevisMail described above, and (ii) a prefabricated image element. Presented predominantly in a stamp format, the accompanying image represents the "stage" or "carrier" that enlivens and empowers the message by projecting it in a plurality of competing decorated displays and by instilling new attributes to the message.

Among the new attributes of the message are: specificity, diversification, complexity and vibrancy and, overall, a significantly increased scope of the coverage. Inspired by the versatility of sports and other themes, the unlimited display of images offered by illustrated "stamps" may increase up to one thousand times the versatility and potency of the messaging system. Other important features of the Stampiade-type of messages are (a) that they are more inclusive, depicting both male and female athletes, and (b) more creative, as they allow for live user input in terms of individualizing and stylizing of the message.

Taking simple examples from the world of sports, the same prefabricated image of soccer could act as a multiplier if associated with three hundred different messages, each expressed in three hundred fonts and two hundred different languages. Conversely, the same prefabricated message "congratulations", expressed in two hundred languages, each in hundreds of different fonts could be associated with other hundreds of images representing female and male sports and sport events, or different events. With respect to specificity and versatility, it may be inappropriate to send a message depicting a weightlifting male athlete to a female gymnast. Also, while it would be sensible to associate the image of a bouquet of flowers along with the message "happy mother's day", sending instead the image of any male athlete may prove uninspired.

Thus, a function of the image accompanying the message in Stampiade is the potential for associations or combinations with words in composing customized and personalized messages. A remarkable feature of this attribute is that, while the underlying image and word are both prefabricated and pre-composed, their combination or association, which takes place each time within the message constructing templates, brings freshness to the resulting display of the message, that now appears as a new message.

Use of Email Platforms

In one embodiment comprising an electronic communication platform, including an email platform, upon inserting the selected prefabricated icon(s) into the content field of the message constructing template, the user is presented with the option to continue to select and insert more prefabricated icons, and/or the option to finalize the message, which option, if chosen, signals to the system that no more prefabricated icons are to be inserted into the content field of the message constructing template.

Upon choosing the option of finalizing the message, the messaging system may be programmed to insert an un-editable blank page after the very last prefabricated icon inserted into the content field of the message-constructing template.

The automatic insertion by the system of a blank un-editable page after the last prefabricated icon inserted into the content field of the message-constructing template may be programmed to cause the message field of the communication platform, including an email platform, to only display the selected prefabricated icons, followed by a sizeable un-editable field until the message, including an email message, containing the particular prefabricated icon(s) is sent or discarded.

In other embodiments, the same result may be obtained through other steps or procedures.

In yet another embodiment, upon finalizing the message in the message constructing template, and posting the prefabricated icons into the message field of the communication platform (which may, for example be an email platform), the system is programmed to override any pre-existing content in the message field of the communication platform rendering the message field un-editable until the message, including the email message, containing the particular prefabricated icon(s) is sent or discarded.

In some embodiments comprising a communication platform, including an email platform, inserting the selected prefabricated icon into the message field of the message constructing template, causes the prefabricated icon(s) title(s) to be posted automatically into the title or subject line of the header field of the message constructing template in a format that is compatible with that of the communication platform. Double-clicking on the prefabricated icon(s) inserted into the message field of the message-constructing template restores the previous settings.

In some embodiments comprising a communication platform such as an email platform, upon finalizing the message, the subject line of the header field of the message in the message-constructing template is automatically carried over into the title or subject line of the communication platform.

In some embodiments, upon finalizing the message, the title or subject line of the header field of the message in the message-constructing template is automatically carried over into the title or subject line of the communication platform, including an email platform followed by a protecting blank space.

Upon the title or subject line of the header field of the message-constructing template being automatically posted into the title or subject line of the communication platform, including an email platform, the title or subject line of the said communication platform may becomes temporarily un-editable until the message, including an email message, containing the particular prefabricated icon(s) in the message field of the communication platform is effectively sent or discarded (e.g. a user cannot edit the title or subject line until the message is dealt with (e.g. either sent or discarded). An example of subject line management is provided in FIG. 11E.

In some embodiments, posting the title(s) of the prefabricated icons(s) included in the message field of the message constructing template, into the title or subject line of the communication platform, including an email platform, causes the messaging system to override any pre-existing content in the title or subject line of the said communication platform rendering the title or subject line of the communication platform un-editable until the message containing the particular prefabricated icons in the message field of the said platform is sent or discarded.

Figure 12B:
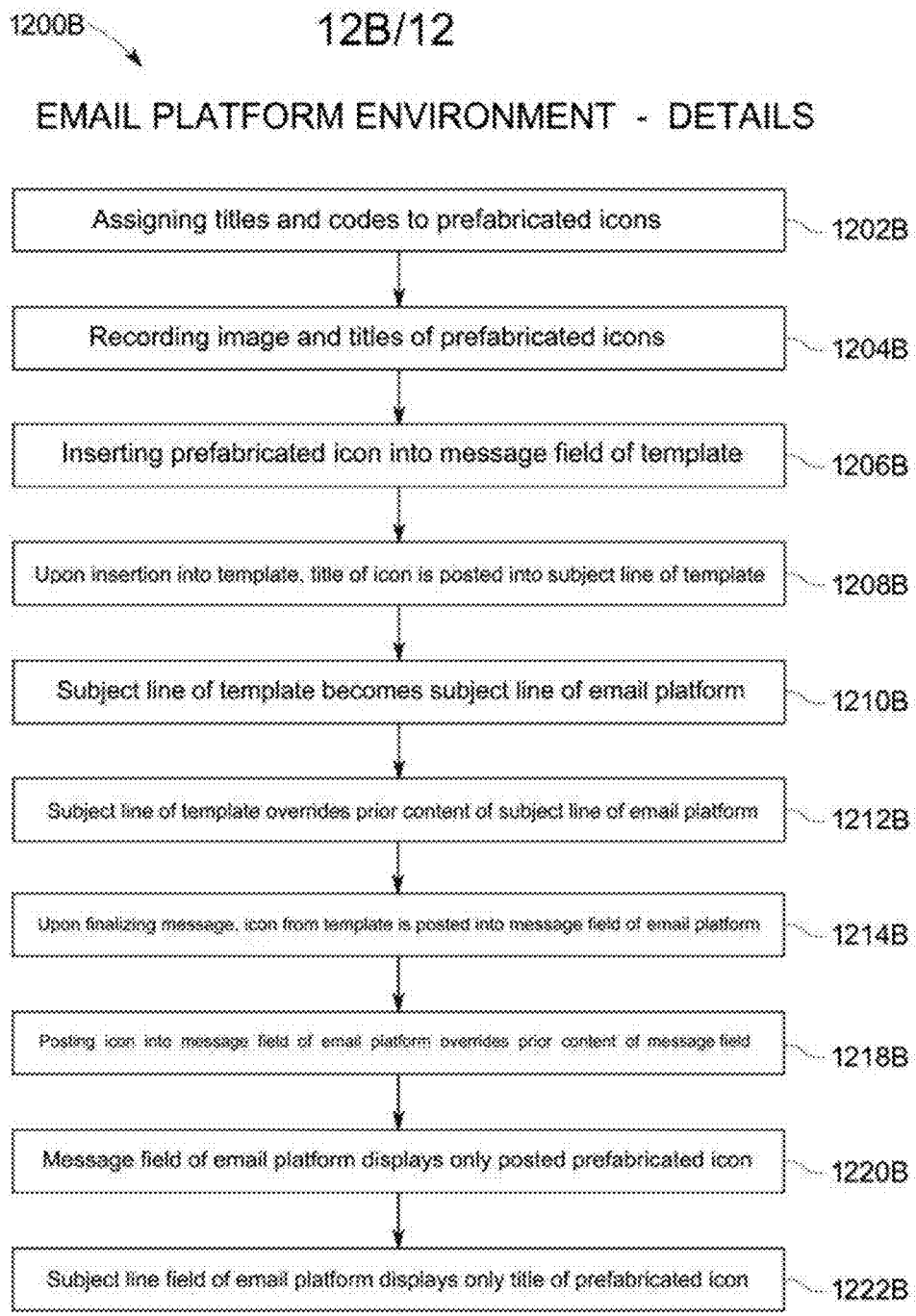

FIG. 12B provides an example method 1200B, without limitation, of details of the process of constructing a message using prefabricated icons in the specific environment of an email platform. In block 1202B, titles and codes are assigned to the prefabricated image and word icons, which titles assist in the management of certain sensitive areas in an email setting. In block 1204B an image of each prefabricated icon is captured, along with a corresponding title of the image and other information that may be useful (e.g. file types, alphanumeric codes, etc.) and recorded in the system. In block 1206 preferred prefabricated icons are selected and inserted into the message field of a message constructing template (e.g. to construct a message). The non-editable fields of the message field, and of the header field of the message constructing template may be programmed to ensure that upon inserting a particular prefabricated icon into the message field of the template, the title of that particular icon is automatically posted into the subject line of the header of the template. In block 1208 a title of the particular prefabricated icon is posted into the subject line. Further, upon finalizing the message, the content of the subject line posted into the header of the template may be carried over and posted into the subject line of the email platform, in a format that is compatible with that of the email platform. As shown by block 12106, the subject line of the template may become the subject line of the email platform. Upon being inserted into the subject line of the email platform, the content of the subject line of the template may override any prior content of the email platform's subject line, ensuring that no text other that the title of the prefabricated icon lodged into the message field of the email platform is inserted into its subject line (see e.g. block 1212B). In addition to the management of the subject line, upon finalizing the message in the message constructing template, the prefabricated icons inserted by the user into the template's message field may be automatically carried over and posted into the message field of the email platform in block 12148. In block 12188 any prior content in the message field is automatically overridden by the content posted into the message field in block 1214B. Upon finalizing the message, in block 12208, the message field of the email platform displays only the prefabricated icons selected by a user. In block 1222B the subject line of the email platform may display only the title of the icon posted into the message field of the email platform.

In some embodiments, the delivery of message(s) containing prefabricated icon(s) in an email platform environment is implemented through a dedicated email platform built into the messaging system of the present disclosure, independent and separate from any other email platforms that the user may have access to.

In some embodiments, the message containing prefabricated icons is built directly from the communication platform (e.g. an email platform) with the prefabricated icon(s) being inserted into the message field of the email platform similar to an attachment, while the text portion of the message is handled independently in both the subject line field and the message field of the said communication platform.

Examples of Specialized Email Platforms Using Prefabricated Icons:

CheerEmail is an abbreviated email platform that uses a limited cheering vocabulary expressed in a diversified and colorful way of presentation (decorated fonts). It operates with short popular expressions frequently used by closely connected sport fans. Among these: "congratulations", "cheering for you", "victory", "let's celebrate", "let's party", "you are the best" etc. Frequently, some of these expressions are also used outside of the world of sports. CheerEmail could operate in all languages of the world.

Brevis Mail is a scaled version that employs both the cheering expressions used by CheerEmail as well as some of the most popular greetings: "Happy Birthday", "Happy New Year", "Happy Anniversary", "Happy Valentine", "Happy Mother's"/"Father's Day" etc. Brevis Mail could employ thousands of short, abbreviated expressions. Similar to CheerEmail, by operating with hundreds of decorated fonts in all languages of the world, Brevis Mail is capable of generating millions of messages. BrevisMail is presented in more detail below.

Stampiade: Stampiade is a versatile communication platform that include an email platform. As an email platform, Stampiade is a further scaled version of Brevis Mail, in that each greeting expressed in hundreds of decorated fonts and languages in Brevis Mail is now encapsulated into a stamp format sport illustration, image. Stampiade brings variety and specificity to the intra-group communications, as it could be selective, addressing specific, preferred sports, and, practically, could generate unlimited variations and associations of images, text, fonts, languages. More detailed information about Stampiade is presented below.

BlanxGreets or SportBlanx, available on any communication platform, represents a variation of the Stampiade. It operates with a collection of stamp or other format blank sport illustrations, to be colored online or after being printed. BlanxGreets could include a pre-printed text (Congratulations, Happy Birthday, etc.) or contain solely the illustration. BlanxGreets could display millions of illustrations in all sports.

FlippyMail is a double-sided message platform presented below.

LastScore represents a variation of "cheerEmail", "brevisMail", "Stampiade" and "SportBlanx" where the word(s) of the prefabricated icon refers to, or is replaced by the result, score of a recent sport competition.

Derivatives: all sport images included in Stampiade and BlanxGreets could be incorporated in diplomas, certificates of excellence, invitations, greeting cards, signature cards, specialized stamps and stickers, posters, memorabilia, or "thank you" cards, etc.

Single sport programs: The most popular sports in the world could have their exclusive platform of intra-group communication, like: soccerSpree, footballSpree, hockeySpree and similar programs. Some single sport programs could be region or country specific (e.g.: hockey).

A reference to the email platforms described above is presented in FIG. 1.

In an illustrative example of this disclosure, a system and process of communicating a message over a network using a secure messaging protocol between a plurality of computing devices in the network, the system including a network computing device provided with an email platform. The network computing device includes a member registration platform, a member services library, a membership register, a message support definition library, and a communication platform configured for connecting a plurality of member computing devices. The member registration platform configured for enabling a plurality of member computing devices to register to be in a communication group with other member computing devices that have registered to be a part of the communication group. The member services library is configured to store one or more of a services application that are available to computing devices of the communication group. The membership register configured to store data on each computing device within the communication group. The message support library configured to store a message permitted for communication over the system. The connection of the plurality of member computing devices enabling real time communication between member computing devices subscribing to the communication group. The network-computing device is configured to receive the message from a member-computing device that has registered to be a part of the communication group. The message received from the member computing device that has registered to be part of the communication group have a header field and a message field. The system is configured to enable the message field to include no content other than one or more of a prefabricated icon(s).

As stated above, in this illustrative embodiment, the communication platform includes an email platform. For example, referring to FIG. 1, the real time peer to peer connect 114 of all members may be variations of email platforms that may be used in this illustrative example include "cheerEmail", "brevisMail", "Stampiade", "SportBlanx", or "LastScore" and "Derivatives", described above, as well as flippyMail, described above.

In this embodiment, the communication protocol is configured to control the content that a user may insert into the email messages. In this way, the system enables users to send messages using an email messaging platform while limiting the text and information that a user may insert into the fields of an email message to prefabricated messages according to this disclosure. In one embodiment, the system provides the user with message templates, such as message template 800 in FIG. 8 but configured with fields for user completion of an email message. Since the disclosed system allows insertion of only prefabricated icons of this disclosure into the message fields of an email message, all email messages that are sent are limited to positive messages under control of the administrator. According to this embodiment, no part of the editable windows of an email message sent using the system is open to potential toxic use.

According to a different embodiment, inserting the selected prefabricated icon into the message field of the template, causes the prefabricated icon(s) title(s) to be posted automatically into the subject line of the header filed of the message, as stated above.

In another aspect, the one or more pre-fabricated icons include: a plurality of images, images with word(s), and images with alpha-numeric symbols.

In another aspect, the network computing device is configured to download an application to the computing device that registers to become a member of the communication group, the services application being configured to establish a communication link between the member computing device and the communication platform configured for connecting the member computing device to subscribing the member computing devices.

In another aspect, the services application is configured to enable the member computing device to access the message support definition library.

In yet another aspect, the message support definition library includes a template configured for use by the member computing device in constructing the message field of a message for transmission over the network.

In another aspect, the template is configured to enable a member computing device to include a plurality of icons in the message field of the message.

In another aspect, the template is configured to enable the posting in the header field of the message the titles of the prefabricated icons included in the message field of the message.

In still another aspect, the template is configured to enable the member computing device to associate particular image icons with a plurality of word icons, and particular word icons with a plurality of image icons.

In another aspect, the system further includes an administrator editor interface configured for editing and updating the message support definition library.

In another aspect, the administrator editor further includes a message support definition generator, the message support definition generator configured to enable the administrator to generate prefabricated icons for inclusion in the message support definition library.

Another illustrative example is of a computer-implemented method for communicating a message over a network using a secure messaging protocol between a two computing devices in the network. One or more of a prefabricated icon are stored in a message support library of an electronic message system, each prefabricated icon providing at least one of a celebratory, positive or festive message. A member computing device is presented at least one prefabricated icon configured for placement into the message for communication over the electronic messaging system. At the member computing device is presented one or more prefabricated messages for insertion into a message field of the message, the message field being associated with a header field to complete an electronic message. At a network computing device of the electronic message system is received the message selected at and transmitted by the member computing device. A transmitted message is broadcast to the member computing devices subscribing to membership in a communication group service associated with the member computing device sending the message. The message field includes no content other than the one or more prefabricated icons. The electronic message system comprises an email platform.

In one embodiment, the prefabricated icons consist of a plurality of images, images with words or images with alpha-numeric symbols; in some embodiments the criteria for their storing in libraries may be based on languages, sports and events, gender, alphabetical order, titles of the prefabricated icons, age, year of release, types of prefabricated icons, editions and themes. In some embodiments the prefabricated image icons used in messages are animated image icons or animated word icons. In some embodiments the templates may only use prefabricated icons from designated libraries. In some embodiments the plurality of displays includes automated or animated displays. In other embodiments, the artistic fashion of the message is improved by use of support prefabricated icons that enhance the celebratory, positive or festive character of the message. In some embodiments the plurality of associations and arrangements of prefabricated image icons and prefabricated word icons include word icons expressed in more than one language and one alphabet. In one embodiment each prefabricated image icon(s) and word icon(s) is assigned a title and an alphanumeric code. Where the prefabricated icon is a word icon, the word icon becomes the title of the prefabricated icon. Where a prefabricated icon is an image icon, a default title is automatically assigned to the particular image icon, which could be the name of its hosting library or other assigned title. In another embodiment the assigned title of the prefabricated icon, and other identifying information of the prefabricated icon(s) are recorded by the messaging system and made available to the Administrator. In some embodiments, where the same prefabricated icons is expressed in more than one language and one alphabet, the working title of the prefabricated icon could be expressed in either the principal language and the principal alphabet of the message, or in either of the other language(s) and alphabet(s) of the particular message.

In some embodiments, the prefabricated icons also include stylized characters comprising stylized alphanumeric symbols. The stylized characters may comprise groupings of alphanumeric symbols decorated in a plurality of festive, celebratory colour schemes, fonts, coatings, illustrations and/or the like that could be made available to users for the purpose of composing their short messages made of prefabricated icons, where the text of the message is expressed in a user's preferred fonts (i.e. prefabricated icons comprising the stylized characters are used to compose the text of the message). The stylized characters may, for example, be hosted in specialized, dedicated libraries of prefabricated icons, or sections thereof.

Double-Sided Message Platform: FlippyLine and FlippyMail

Another message communication platform based on prefabricated icons, that includes an email platform, is a double-sided message platform of the type "flippyMail" that operates, by flipping, or clicking, or otherwise, with both sides of the platform (card). "FlippyLine" is the same as "flippyMail" except that it comprises a communication platform other than an email platform. On the face side, the communication platform displays either only image(s) i.e. prefabricated image icons, or it displays images and words, i.e. prefabricated icons that contain both image(s) and greetings. On the "secret" or back-side, the platform displays the "secret message" which can be one or more prefabricated word icons, or other types of greetings and positive text. FlippyMail and/or FlipplyLine may require a password or other type of secure access procedure in order to flip the message platform or to otherwise gain access to the "secret" text on the backside of the platform.

One characteristic of the flippyMail and/or FlippyLine double-sided platform is that it requires the incorporation of at least one prefabricated icons selected from the libraries on each side in order for it to function. Thus, the messaging system is programmed to identify the presence on each side of the message of at least one of a prefabricated icon(s) selected from libraries, which presence signals to the system that the condition for finalizing the message is met.

In one embodiment, the flippyMail and/or FlipplyLine type of computer messaging that operates with both sides of an electronic greeting card, as described above, is capable of operating on any standard electronic communication platform, including on an email platform (e.g. flippyMail operates on email).

In certain embodiment(s), the flippyMail and/or FlippyLine platform requires specific system capabilities, like:

the use of the tools "flip" or "hide" or other capabilities of switching from one face or side of the message platform (card), to the other side, as well as a "window(s)" capability of displaying simultaneously at least two windows, in conjunction with other features, like customization and personalization of the message, and the system capability of locking-in, and unlocking, the preferred greeting or font from the gallery of greetings (described below), in order to allow the user to personalize the text of the message by typing-in, into the active field of the text box, the desired greeting text displayed in the preferred font (e.g. a preferred set of stylized characters).

FlippyMail and/or FlippyLine may use a special message constructing template that exhibits at least two large windows, one for each side of the message platform and, where required, a dedicated keyboard.

The double sided email platform "flippyMail" described above, or similar platforms and programs that operate with both sides of a message platform (e.g. double sided FlippyLine for communication platforms other than email), combined with the language menu and other features described in the present disclosure, is provided with the following main features, tools, steps or procedures:

The message constructing template exhibits a window capability, where one window displays the face side of the "flippyCard" and allows for access to, and the scrolling of the gallery of standard prefabricated image icons (tennis player) or, alternatively, of the gallery of customizable prefabricated icons (flowers), process finalized in either case with the display in that window of the selected prefabricated icon. The second window, which represents the flip or back side of the "flippy card", exhibits a "blank card" of a size and shape similar to that of the face side, which "blank card" is provided with an active field reserved for customized or personalized text to be inserted by the user.

The Face Side of the Double Sided Platform:
(a) in the standard, fully prefabricated version, the user starts from the preferred language, then browses the gallery of standard, prefabricated image icons and selects the prefabricated image icon that already contains therein the preferred prefabricated word icon, i.e. the icon that displays the preferred greeting text (which greeting text is already preprinted in a variety of decorated fonts, from which the user selects the illustration with the preferred text written in the preferred font). Alternatively, in the standard version, face A displays only a prefabricated image icon;
(b) in the stylized version, the user operates with two smaller windows, one for stylized prefabricated image icons (which contain an image as well as a blank active field reserved for the greeting) and the other window for the vocabulary of prefabricated word icons containing preprinted greetings. As both, the image icon(s) and the text icon(s) are displayed simultaneously on separate windows of the screen, the user selects the preferred image and a matching preprinted greeting.
(c) In the individually stylized option, similar to the stylized option the user operates with two windows, one for the image icon(s) (which, again, contain an image and, separately, a blank active field reserved for the greeting), and another window for the gallery of graphic fonts (e.g. stylized characters as described above).
(d) Once the preferred image, respectively font, are selected and locked-in into their respective windows, the user types-in, into the blank greeting field, the desired message, by using the locked-in preferred gallery of fonts and a dedicated keyboard provided by the messaging system.

The Back Side of the Double Sided Platform:
In both, the standard option and the stylized option, the reverse or back-side window displays a blank card provided with an active field reserved for the "hidden" text to be filled-in by the user, as follows: the user browses the gallery of prefabricated word icons and selects the preferred word icon(s) which is, then, inserted into the active field of the back face reserved for messages.

In the individually stylized option, the reverse or back side may display the same active field reserved for the "secret" message(s), to be filled-in by the user, as follows: the user browses the gallery of graphic fonts (e.g. stylized characters), selects the preferred font, which font is locked-in, after which the user types in, live, the desired "secret" message into the active field of the back or "secret" side of the double sided platform.

In one embodiment, the back-side window is connected to a gallery of fonts capable of producing texts to be typed-in by the user, in the preferred font, which texts are placed in the active field of the blank card on the back-side of the platform.

The "blank card" is connected to a dedicated keyboard, displayed in another window of the screen, which dedicated keyboard allows for access to, and the scrolling of, the gallery of fonts, and the locking-in of the selected fonts.

After selecting the preferred prefabricated icon from the desired gallery of icons, the user flips the card by clicking on it or, alternatively, by using the "hiding" feature, or other flipping or reverting capabilities.

Once the platform is flipped on the secret side, the user types-in the desired text in the active field of the text box, by using either the dedicated keyboard displaying the selected font already locked-in.

Further, the user flips back the card to its face side that displays the image icon(s) and, using the communication capabilities of their device, broadcasts or emails the customized flippyCard to the intended recipient or list of recipients, or posts it on the social media etc, after securing the access to the flip side of the card, or to the text thereon, according to their choices and the security features of the card;

On the recipient's side, depending on the security features of the flippyCard, the recipient may need a password or other form of unlocking capability in order to be able to flip the card or, otherwise, to gain access to the text written on the back side of the card.

Figure 11F:
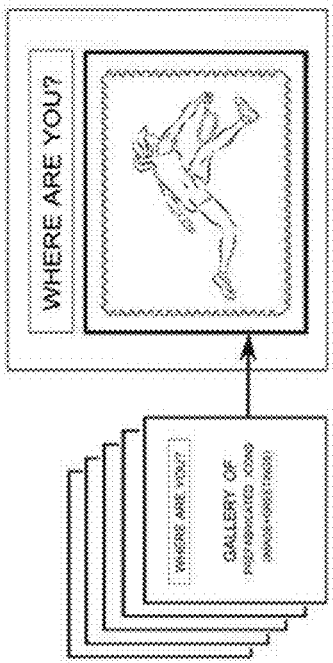
Figure 11F:
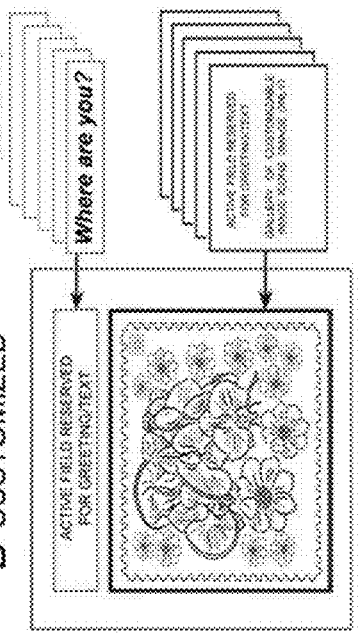
Figure 11F:
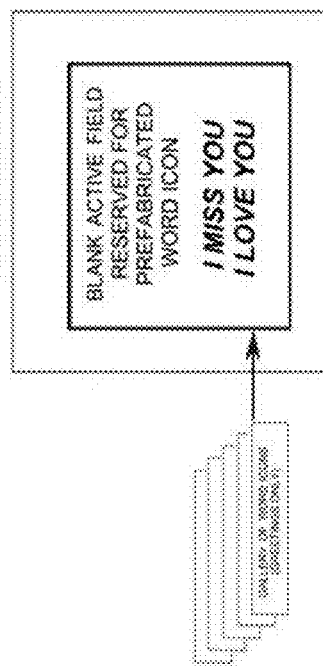
Figure 11F:
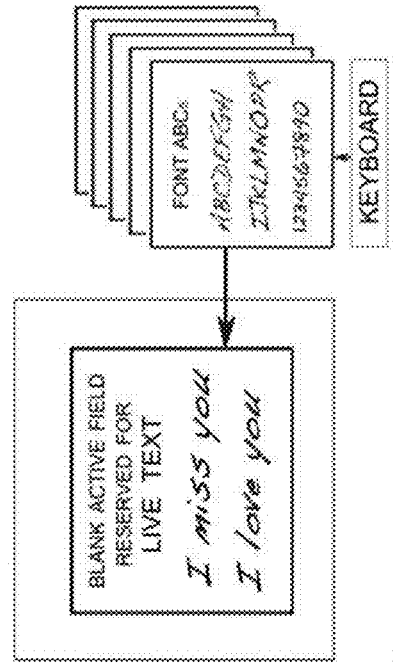

One illustrative example of a double sided communication platform of the type "flippyMail" is presented in FIG. 11F.

In FIG. 11F—the standard option A—the face side of the platform displays a standard prefabricated icon, selected from the standard gallery, which icon contains both an image (of a female tennis player) and a word icon ("Where are you?").

In the customized option B, the face side displays a prefabricated image icon specially designed for customizing capabilities, in the sense that it displays both an image (a flowers arrangement) and also an active field reserved for the greeting(s). To customize the icon, the user scrolls the gallery of prefabricated word icons and selects the preferred icon in terms of content ("Where are you") and font ABC, i.e. the word icon that matches the image of a flowers arrangement.

In FIG. 11F, the back-side of the communication platform displays two options: option C, which accommodates both the standard and the customized options of the face side and, separately, option D which presents personalization capabilities.

In option C, the back side of the communication platform fills-in the blank active field reserved for the "secret message" with two prefabricated word icons: "I miss you" and "I love you", both selected from the gallery of prefabricated word icons.

Finally, in the personalized option D of the hidden side of the platform, the user may scroll the gallery of fonts (e.g. stylized characters) and selects a "personal" font that fits the occasion and, after locking-in the preferred hand-written font, uses the dedicated keyboard to type-in, live, into the blank active field reserved for the "secret text" the personalized expressions "I miss you" and "I love you", both printed in the preferred font.

The flippyCard may be provided with a variety of security features (password, voice or image recognition etc) that limits the access to the back or flip side of the card to the intended recipient(s) or, alternatively, may be provided with encryption capabilities of the customized text written on the flip or back side of the card;

General Examples of Prefabricated Icons: Example I

In an embodiment, there may be a messaging system dedicated to sports fans. The messaging system may accept users from anywhere in the world, and coordinate them based on their interests, or particular requests (e.g. fans of young John Doe1234 baseball club). Users in the group may exchange electronic messages showing support to young John Doe 1234 by sending prefabricated icons, such as those illustrated herein. The prefabricated icons represent a limited "vocabulary" of cheers, expressions or encouraging words. Some non-limiting examples may be icons that represent "congratulations," "cheering for you", "Victory", and "Good job!" These prefabricated icons represent a cheering function and may be used to encourage an athlete on.

In this example, the restrictive nature of the communication using only positively messaged, prefabricated icons according to this disclosure, lends itself to a communication platform that may not be used for bullying. An individual who seek to send negative messages would be frustrated because due to the content of the available library made available for messaging, only positive messages designed by or for the administrator may be communicated.

Example II

In another embodiment, there may be a messaging system dedicated to particular celebratory days, such as birthdays, father's/mother's day, Christmas, Ramadan, Hanukkah, International Children's Day, etc. These messages would use a different set of prefabricated icons for users to message one another to express good wishes for the particular holiday or event. A user would select one or more prefabricated icon to send to another user to represent the good wishes or good intent desired, without using any texting capability.

Example III—Content of the Message(s)

In another embodiment representing a messaging system dedicated to sport fans, or to particular celebratory days, the library of prefabricated icons may include prefabricated icons that consist of cheers or other positive word icons, and one or more black and white or colored images, where images may relate to specific sports and events, or groups of (summer) sports and (winter) events, or may represent a generic celebratory or otherwise positive pattern or arrangement (flowers, stars, flags, musical notes, symbols, etc.).

In another embodiment where the prefabricated icon consists of cheers and images, the word icons are a specific word, like "victory" or "congratulations" which is appropriate in messages relating to a plurality of victory scenarios (in hundreds of summer and winter sport disciplines and events for women and men). In this embodiment the word "victory" or "congratulations" may be associated with a plurality of images to cover victory scenarios in all sport disciplines and events for women and men.

In another embodiment where the prefabricated icon consists of cheers and images, it may be the image that is unique or special, like the image of a gold medal or of a national flag, where the unique or special image is appropriate in messages relating to a plurality of victory scenarios. In this embodiment the unique or special image could be associated with a plurality of appropriate cheers and other celebratory words to cover victory scenarios in all sport disciplines and events for women and men.

In yet another embodiment where the prefabricated icon consists of cheers or other words and images, one particular image (like flowers, stars, national flag) may not be separate from the word element but, rather, imprinted on, or wrapped around the word(s) icon, with the particular image covering a portion of, or the entire word(s) of the message, as depicted in Fig. FIG. 11B, FIG. 11D and FIG. 11E. In still another embodiment where the prefabricated icon comprises image with word icons, it is the word that may not be separate from the image but, rather, incorporated or imprinted onto the image, like "invitation" carved into the image either alone, as in FIG. 11D, or accompanied by info re: event, place, time.

In another embodiment representing a messaging system dedicated to sport fans and to celebratory days is where the library of prefabricated icons may include prefabricated icons that consist solely of one or more images, where the image or images may relate to specific sports and events, or groups of sports and events, or may represent a generic celebratory or otherwise positive pattern or arrangement (flowers, stars, flags, musical notes, symbols, etc. and combinations thereof).

Example IV—Libraries and Galleries

Libraries have a vital function as messages can be composed exclusively from prefabricated icons made available to users in dedicated electronic libraries. Messages comprising prefabricated icons cannot be composed live from a computer keyboard or include input composed live from a computer keyboard if the live input is not one or more prefabricated icons selected from a dedicated electronic library specifically configured for prefabricated icons.

Libraries, some of which being organized as specialized galleries with virtual "exposing rooms and corridors", may supply message material for thousands of messages that cover many expressions (i.e. cheers and celebratory), in tens of languages, appropriate for tens of festive occasions, hundreds of male and female sports and sport events, and a variety of styles and other personal preferences.

There may be one or more libraries, or galleries of prefabricated icons. In some embodiments there may be one general library that hosts all of the prefabricated icons and their composing elements: images, word icons, images and words, and combinations thereof. In another embodiment there is a plurality of libraries specialized for images, for word icons, for images with word icons, or for customizable image icons, and for combinations thereof, or for support prefabricated icons.

In another embodiment, there may be libraries or galleries specialized on icon profiles, like libraries for each sport or event or for groups of sports and events (summer, winter, etc.). In yet another embodiment, there may be separate libraries for female sports and for male sports, or libraries specialized on languages, or organized on types of prefabricated icons according to their alphanumeric codes, or according to their titles, or on themes, editions, defined colors or shapes of images, types of archives, or on a plurality of other criteria.

In another embodiment, there is a special type of libraries based on the function to be performed by the hosted prefabricated icons. As an example, there is a standard type of mixed prefabricated icons that comprise both an image icon and a word icon, both image and word incorporated into the same icon (e.g. the image and word are already incorporated together). Separately, there may be galleries of prefabricated icons designed specially for the purpose of enabling associations of particular image icons with a plurality of word icons. Such a special purpose prefabricated icon is an image icon to be used in message customization and personalization. Different than the standard type of mixed prefabricated icon described above, the "customization" type of image prefabricated icon comprises only an image and, instead of a message, it contains only a blank active field reserved for the text of a message. This blank field may be filled-in by either a separate prefabricated word icon, selected from a gallery of word icons in the case of customization of the message, or by text that may be typed in (e.g. letter by letter) provided by use of one or more graphic fonts (e.g. stylized characters) in the case of a personalized message.

The sport-based galleries (e.g. libraries) of special-purpose prefabricated icons may play a key role in the effectiveness of the messaging system of the present disclosure. Where the sport-based galleries comprise both specially designed prefabricated image icons and matching prefabricated word icons, presented in a plurality of displays and graphic fonts, the sport-based galleries offer, practically, unlimited choices of associations. This unlimited choice of associations refers to both, associations of particular prefabricated image icons with a plurality of prefabricated word icons, and associations between a particular word icon with a plurality of prefabricated image icons.

In some embodiments there is the option of selecting a message containing a single prefabricated word icon which word icon may display a prefabricated image icon, including a sport image, imprinted directly on the word icon (or within each character of the word icon).

Example V—Composing a Message

Messages may be composed from prefabricated icons, or elements thereof, made available in one or more libraries or galleries. In one embodiment, a standard word icon message like "congratulations" or "happy birthday" could be simply selected as such from the general library, or from the library of prefabricated word icons. In another embodiment, a Stampiade type of message comprising an image icon and a word icon could either be selected from a general library that hosts the very selection of standard image and word icons, or be assembled by selecting an image from the gallery of prefabricated images and, separately, a word icon from the library of prefabricated greetings. In yet another embodiment, a complex message could be assembled by selecting a plurality of prefabricated components from a plurality of libraries and galleries, including support prefabricated icons: e.g. FIGS. 10A and 10B.

Of a particular importance is the association of prefabricated word icons and prefabricated image icons for the purpose of pairing or matching prefabricated icons to assemble mixed or composite messages, or for the purpose of individually stylizing a message.

Of a particular importance is the composition of associations of prefabricated word icons and prefabricated image icons for the purpose of customizing or personalizing a message.

Example VI—Templates

A characteristic of the present integrated messaging system is the significant use of templates to compose messages.

The complexities of a computer-implemented method, system and process for communication through messages containing prefabricated word icons, or prefabricated word and image icons, made available in electronic libraries, require a system of message composition platforms or templates. Such message composition, or message construction templates make it possible to select, assemble and finalize for transmission the composed message, without any modification being brought to the stored prefabricated icons and without any user generated text being included into the message, if the text to be included is not made of prefabricated word icons or of prefabricated alphanumeric symbols.

Where the user selects a message that comprises image and word icons, one option is for the user to select a standard message-constructing template provided with one message field. Such a standard template may be appropriate where the user intends to use a standard image and word icon, where both word and image are pre-printed within the same icon. The only preliminary procedure is to select from the variety of libraries and galleries, organized on a plurality of criteria, the icon with the desired image and the desired message, expressed in the desired font.

Where the user selects a message comprising image and word icons that the user intends to, pair or individually stylize, an appropriate message construction template is a special type of template provided with two active fields, or two windows, one for image icons and the other for word icons. This special template may make it possible for the user to insert into one of its windows the preferred word icon selected from a plurality of cheers, greetings and other short expressions made available in the libraries of word icons and presented in a variety of fonts and languages. The next step may be to select and insert into the other window of the template the image icon selected from a plurality of prefabricated image icons reflecting hundreds of sports and sport events for both female and male athletes. The association of a particular word icon with a plurality of image icons, and the association of a particular image icon with a plurality of word icons, both facilitated by this type of template designed for pairing and individualized stylizing of messages, makes it possible to produce a large variety of associations, each to be made available, in a plurality of choices, for each of the hundreds of sports and sport events for women and men in approximately two hundred languages.

In some embodiments the member computing device has access to one or more libraries. The one or more libraries may comprise one or both of prefabricated icons that comprise prefabricated images and prefabricated text (e.g. a prefabricated text icon consisting of the text "Victory" and a prefabricated image illustrating the scoring of a victory goal). Advantageously but optionally, corresponding prefabricated images and prefabricated text may be made available in the same library. This may be particularly useful in the case of pairing and individualized stylizing, where the prefabricated image icons are of a special type, a type that cannot be used alone in a message. These prefabricated icons may be special in the sense that, while they do display an image, instead of text they may only display a blank active field reserved for text. This blank active field may be filled-in live by the user, for example, in one complete word (e.g. by using a prefabricated icon that consists of that word) and/or letter-by-letter (e.g. by using the prefabricated stylized alphanumeric symbols to type-in the particular word). In some embodiments each library may be specific to one or more characteristics descriptive of a sport (e.g. type of sport, etc.).

In another embodiment, the member computing device has access to more than two libraries of prefabricated images and word icons and to a message composition template provided with more than two windows or selection areas, for composition of complex messages made of a plurality of prefabricated icons stored in their respective libraries.

The system, method and process of the present disclosure rewards users who chose its, somewhat restrictive, messaging system by offering a wide display of prefabricated icons-based messaging that other messaging systems do not offer. Firstly, it is the presence of sports-related image icons popular among all demographics, which are not available from a computer's keyboard. Then it is the association or arrangement of image icons with word icons that is equally available only from libraries. Happy Mother's Day wrapped in a flowery pattern or associated with a separate bouquet of flowers has no equivalent in a keyboard-based messaging system. Further, it is the presence of icons made of decorated cheers and greetings available in a plurality of displays that enliven the messages. Finally, it is the possibility, offered by the present messaging system, with no equivalent in other social media, of expressing simultaneously the same message in more than one language and one alphabet.

Formatting Templates

Formatting templates perform an important balancing function as they align and harmonize the rigors of an otherwise restrictive filtering system with the freedom of an individual user's creativity. While, technically, they are only an interface between the libraries content and an individual user's intended messages, functionally they are also a catalyst that instills communication life into the still icons stored in libraries.

In an embodiment of the present disclosure, one function of a formatting template is to allow a member to compose a message by temporarily associating a particular prefabricated word icon with a plurality of image icons and a particular image icon with a plurality of word icons. This freedom of association allows for a widening and improvement of the celebratory and festive character of the message. For example, it is essential that the prefabricated word icons "congratulations" and "victory", expressed in English, are not only associated with a plurality of images that cover victory scenarios in hundreds of sport disciplines and other events for women and men. Each image in this plurality needs to also be associated with the word icons "congratulations" and "victory" expressed in each of the two hundred languages of the world and, in some cases, in different alphabets.

There is a subtle but important implied anti-discriminatory function in making available these associations. It is these "associations" that makes it possible for each and every type of prefabricated icons to be made available equally, without any limitation or discrimination to every country and in every language in the world, to all women and men sport disciplines and events alike, and to all ages.

Another example of festive improvements includes displaying simultaneously, in a congratulatory message, the prefabricated icons of a gold medal, national flag and the country's national anthem, i.e. the three rewards reserved to victors in official international competitions, as illustrated in FIG. 10. At local level, the festive character can be improved by formatting a "Happy New Year" message to display flashing lights, running colors, blinking and shooting stars, or the association of the word icon "Happy Birthday" with a celebratory image icon(s) displaying colorful ribbons, stars and balloons.

In another embodiment of the present disclosure, the function of a formatting template is to allow a member align and re-align, adjust, re-size, reposition, invert, revert, re-orient, flip, rotate a prefabricated icon selected for a message in order to fit another prefabricated icon selected for the same message or to enhance its image. For example, a formatting template can assist a user to fit a short, prefabricated word icon—"victory" or a longer word icon— "Happy Mother's Day" along the same prefabricated image of flowers, all being selected from the library of prefabricated icons. Another user may format differently the same arrangement.

In yet another embodiment, the function of a formatting template is to allow a member to temporarily change the particular display of one or more of the composing elements of a message, or of the entire message, with other composing elements of the same nature, without changing the content of the prefabricated icon. This function refers primarily to changes of colors and color arrangements, patterns, light and light arrangements, textures, coatings, blending, use of color filters or letter contours, font variations and other displays, i.e. a plurality of display options that do not alter the content of the respective prefabricated icon, nor the positive meaning of the message.

For example, a member can use a formatting template to temporarily change the word icon's colors in order to fit the associated image icon's dominant colors. An entire icon can be changed from one color to another color. In another example, an adjustment filter could be used to switch an entire image to its negative and back to the positive image without otherwise changing the content or the shape of the image. In yet another example, the colors could be arranged in a plurality of flashing, pulsing, blinking or running colors, or other displays and arrangements of still and fluid lights and colors that create the impression of an enlivened, animated message. In addition, the administrator may provide special templates where prefabricated icons stored in libraries may be subject to other customizing features offered by specialized software.

Only prefabricated patterns, textures, coatings, contours, color and light arrangements and other support icons originating from libraries can be used by a member to format messages through formatting templates or to finalize the display of a message. A formatting tool cannot introduce any new text, image, pattern or feature that does not originate from either the libraries of prefabricated icons or their specialized sections of patterns, textures, contours, coatings, artistic elements, etc. Thus, a formatting template can be used to produce temporarily a plurality of displays of the same image icon or word icon without permanently modifying the particular icon and without changing the content and the meaning of the message.

According to another embodiment of the present disclosure, even prefabricated icons made entirely of alphanumeric symbols, like the cheers "congratulations" or "victory" can be replaced or formatted. Replaced, if the library of prefabricated icons contains a plurality of these very same word icons expressed in different languages, fonts, formats, shapes, artistic elements or styles, color arrangements, contours, patterns, coatings or any other distinguishing features. For example, the word "congratulations" expressed in bold blue letters can be replaced with "congratulations" expressed in italic red letters. Formatted, if the underlying word icon is available in plain colors and the patterns section of the library contains all these choices, For example, the word "victory" wrapped in an image of speed skating or a pattern of flowers could be replaced with the same word "victory" custom-coated in an image of baseball or a pattern of stars.

Even within a prefabricated icon, its composing letters can be replaced with the very same letters decorated differently. For example, starting with plain letter icons stored in libraries, the word icon "victory" could be decorated entirely with the same coating depicting red and white stars projected on a blue sky, or have each composing letter decorated individually in five different coatings. Alternatively, the single coating of white and red stars could cover the same word icon "victory" composed of five differently shaped letter icons selected from the libraries.

Main Functions of the Present Messaging System

As a messaging system based on use of prefabricated icons, the messaging system of the present disclosure performs four principal functions: 1) generating positive prefabricated image icons; 2) filtering out potentially harmful content in messaging, 3) aligning closely the display of the message to the festive meaning of the message in order to match the festive character of the event it addresses and, 4) connecting members in a positive environment.

The generation function supports the implementation of the other principal functions being consistent with the protective function, festive and connecting functions.

Generation of Prefabricated Icon

An important function of the messaging system described herein is that of generating prefabricated image icons, prefabricated word icons and prefabricated support icons to be used for constructing a message(s) in an electronic messaging system, where each prefabricated icon provides celebratory, positive or festive messages.

Examples of the generation function are provided in the description of the communication platforms, including email platforms, based on prefabricated icons, of the type cheerEmail, brevisLine and brevisMail, stampiade, blanxGreets or sportBlanx, flippyMail, Flippyline, lastScore, derivatives and single sport programs. A reference to the generation function is presented in FIG. 1. Graphic examples of the generation function are presented in FIGS. 10B and 11A though 11E.

In some embodiments the prefabricated icons to be used in pre-composed messages may be made of one or more prefabricated components which may be fabricated separately from each other and assembled. Each of the prefabricated icons of the present disclosure may be made of at least two prefabricated components: (i) a prefabricated black & white, color or multicolor graphic image (e.g. sport routine, flowers, stars, flags, musical notes, medals, multicolor decorations, laurel, maple and other leaves, etc.) that may be prepared separately and that may be superimposed on a separately pre-composed plain text or on a component thereof (e.g. individual letter or group of letters), for a prefabricated word icon; and (ii) a prefabricated black & white, color or multicolor image (e.g. sport routines, stars, medals, flags, flowers, decorations, etc.) that may be superimposed on another plain, color or multicolor background image that may be prepared separately, for a prefabricated image icon.

Effectiveness of the Messaging System Based on Prefabricated Icons

The overall effectiveness of the present messaging system based on use of prefabricated icons is commensurate with the effectiveness of each of these functions and, ultimately, commensurate with its use. A little used messaging system is ineffective against cyber bullying. To be truly effective, the system needs to be widely used and, in order to be so used, it is important that its messages be made as festive as the occasion or event they address. To ensure its effectiveness as an anti-bullying messaging system, it needs to be attractive not only to parents, teachers and guardians but also to children, to the users themselves.

The macro customization of messages is done by design, by applying the filtering power of prefabricated icons. Within this protective design, the micro-customization is done by users, with the assistance of the administrator and that of specialized tools. As an example, the administrator may add new prefabricated icons that offer a larger variety of expression in response to individual user's needs. This, in turn, may reduce the need of further customization by other users, to the extent that their preferences have already been answered.

At the same time, the administrator may store in libraries more formatting templates and other assisting tools that enhance indirectly the messaging system's filtering power, by helping members make a better use of the continuously replenished and enriched libraries of prefabricated icons. The central role of the administrator is to maintain the required balance between the rigors of the basic protection against cyber bullying and the need to provide both room and tools for each user to be creative, which in turn, may amplify the use by members of the filtering system.

The exclusive use of prefabricated icons may impact a user's creativity in composing their messages. The messaging system's answer to the creativity issue projects at three levels: a basic level, a creative level and a professional level. All these levels rely on specialized sections of prefabricated icons as well as on a system of templates.

Basic level: at the basic level, upon using templates to compose their messages, users have the liberty to arrange at will the inventory of prefabricated cheers stored in libraries in any type of association or arrangement allowed by the particular template. For example, word icons can be associated in a plurality of ways with image icons across hundreds of sports and events for women and men, and across over two hundred languages. In addition, at the basic level, users have access to galleries of patterns, coatings, contours and other supporting tools stored in specialized sections of the prefabricated icons library, or in specialized support libraries. At the basic level users have also the option of replacing plain letters of word icons with pre-decorated letters of the same word icon, also stored in libraries.

Elevated level: at the elevated level of creativity refers to each user having access to a toolbox of specialized icons made available by the administrator, as well as to a system of specialized display templates. These creativity tools allow members to format the plurality of arrangements generated at basic level, such as to enliven and make more festive their messages. One way of achieving this is by creating a plurality of displays of the same particular prefabricated icon or particular arrangement of icons, without changing the content or the meaning of the message. The creation of customized or personalized displays of a message does not deny the basic protection offered against undesired, potentially offensive content because only prefabricated icons stored in libraries can be subject to the formatting process.

Professional level: at the professional level, the administrator can provide access to specialized customization and personalization software that allows for higher levels of color, light and display adjustments through editing, enhancing and formatting of the prefabricated icons stored in libraries or the use of specialized software tools.

Animated Prefabricated Icons

At all levels the Administrator may also offer specialized libraries containing animated prefabricated icons that include animated image icons and animated word icons, wherein all animated icons are made available to users for the purpose of being inserted into the message field of the message of a messaging system based on prefabricated icons.

In an embodiment, the specialized library of animated image prefabricated icons provided by the Administrator to be included into the message field of the message may include the most popular types of image animation.

Reverse or "Blink" Animation

In some embodiments the prefabricated image icons depict a type of "reverse" animation or "blink" animation. Different than standard animation where successive static frames are moved fast enough to create the impression of animation, in a "blink" animation the reverse process takes place: an actual fluid motion is decomposed into some of its key static successive frames ("blinks"), to create a series of interrelated images similar to a kinogram.

An illustrative example of blink animation is presented in FIG. 11A, which depicts the same male gymnast moving frame-by-frame in four different positions. Three more examples of blink animation are presented in FIG. 11C where, in Blink1, the same female figure skater is shown moving, frame-by-frame into four different poses, or positions. In Blink 2, the same male discus thrower moves left to right in a pirouette motion, and in Blink3 the same female gymnast performing on uneven bars flies through five different frames/positions before reconnecting with the upper bar. In FIG. 11E a speed skater's alternative slides on each leg are decomposed into several successive static frames.

In some embodiments a "blink animation" comprises a plurality of prefabricated icons designed to replicate sport motions. The plurality of prefabricated icons may present: (a) a series of alternative frames of a sport motion displayed in their natural succession; in combination with (b) each such frame being depicted in a plurality of multicolor contours spaced apart from the reference frame and from one another and positioned such that the combination of the series of successive frames and the plurality of spaced contours when assembled together simulates a real sport motion ("blink animation").

In another embodiment the specialized libraries of prefabricated icons may include a library specialized in animated text icons. Animated text icons made available by the system to be inserted in the message field of the message may comprise a plurality of types of words in motion Standard, Paired and Individually Stylized Messages—brevisMail Another feature derived from the exclusive use of prefabricated icons, that does not have equivalent in other social media, is the possibility of expressing the same icon simultaneously in more than one language and one alphabet. For example, the cheer "congratulations" expressed in English may contain within it the French version "felicitations" and, potentially, other language versions as well. Multilingual examples are presented in FIG. 11B, FIG. 11D and FIG. 11E.

Standard, Customized and Personalized Messages—BrevisLine, brevisMail

In one embodiment, a codified messaging method, system and process based on pre-composed messages made of prefabricated icons uses communication platforms that include, without limitation:

(a) communication platforms consisting of cheerEmail, brevisLine, brevisMail, Stampiade, sportBlinx or blanxGreets, lastScore, flippyMail, [D] derivatives and single-sport programs for some of the most popular sports worldwide, like "SoccerSpree", "Football Spree", "Hockey Spree", or similar programs for a variety of sports;

(b) a "vocabulary" of prefabricated pre-printed word icons consisting of codified greetings and other short expressions, presented predominantly in a label format and in a plurality of displays, and expressed in all languages of the world, where each prefabricated, pre-printed word, expression, greeting, cheer, font ABC is registered with the system for exclusive use;

(c) libraries or galleries of prefabricated, pre-printed image icons, presented predominantly in a stamp format of the general type "Stampiade", or dedicated stamp formats like: "Andromeda Line/Mail" symbolizing outer space exploring; "Atlantida Line/Mail" for deep ocean research; "Everest Line/Mail" for terrestrial conquests, North Pole and Antarctic Mail, for daring expeditions, and so on;

(d) videos and animations provided by the administrator;

(e) a windows environment, with one or multiple active windows, through which the user can access one or more programs and tools that allow for examination, evaluation and choices of prefabricated icons in the process of selecting the content, pairing and stylizing their communication;

(f) the capability of locking-in and unlocking the preferred font ABC from the gallery of font ABC's, templates and other tools that allow the user to individualize and stylize the messages;

(g) appropriate communication tools required to send, post, email or broadcast the message.

In one embodiment, the codified messaging system based on pre-printed, prefabricated icons, of the type CheerLine, CheerEmail, BrevisLine, BrevisMail and similar platforms and programs, also include, without limitation:

(a) a drop-down or other form of menu, that lists the languages in which the communication platform, including an email platform or other program is available, which list could be individualized to include only selected, frequently used languages or to display as default one preferred language. Additionally, or alternatively, the codified system may be provided with a search capability that accepts key words, like the title or code of the sought prefabricated word icon;

(b) a "vocabulary", "library" or "gallery" of reusable standard prefabricated, pre-composed greetings and other brief texts, organized as a drop-down or other form of menu, where each standard greetings or text is displayed separately in already preprinted, prefabricated fonts, and which vocabulary, library or gallery could be displayed according to criteria including the alphabetical order of the title of the greetings, languages, sports and events, gender, age, editions and other appropriate criteria;

(c) a support library or gallery of reusable decorated "casings" or "frames", including monocolor frames, used in conjunction with the vocabulary of prefabricated greetings, that allow for "pairing" or "matching" of the greetings by way of association of a particular pre-printed greeting with a plurality of "frames" and the association of a particular "frame" with a plurality of pre-printed greetings;

(d) a separate blank or decorated "greeting card" of a size larger than that of a standard prefabricated greetings described in (b) above, which blank or decorated "greeting card" is provided with an active text field of a size identical to the size of a standard prefabricated greeting, and which "greeting card" could be accessed by a user and locked-in onto one of the windows of the screen for the purpose of typing-in the desired greeting. This "greeting card" provided with an active field for greetings can be used as a "frame" or "casing" for the prefabricated, pre-printed word icons selected from libraries, and inserted into the "greeting card's" active field.

(e) a separate, stand alone, gallery of fontABCs organized as a drop-down or other form of menu, comprising the fonts, including decorated fonts, available for the individualized stylizing option, where each font ABC includes, for every language, a standard set of letters of the alphabet and the basic punctuation signs;

(f) support communication tools required to complete the message, including message constructing templates provided with windows, locking-in and unlocking capabilities, flipping, hiding, formatting a.s.o.

The codified method and system of pre-composed messages based on prefabricated, pre-printed word cons, that use communication platforms, including email platforms, of the type cheerLine and cheerEmail, brevisLine and brevisMail, described above, comprise without limitation, the following process, steps and procedures:

(a) in the standard, fully prefabricated version of the pre-composed message, the user starts from the preferred language, or uses the dedicated "search" service of the program, browses the vocabulary of word icons and selects the icon with the preferred greeting, which preferred greeting is already preprinted in a variety of decorated fonts, from which the user selects the icon displaying the preferred font, which preferred greeting pre-printed in the preferred font is then locked-in into the template's window, after which the communication capabilities of user's computer device are used to send, post, email, or otherwise broadcast the selected standard pre-composed greeting in the preferred font, to the intended recipient or list of recipients;

(b) in the "pairing" or "matching" version, the user also starts from the preferred language, uses the search service or otherwise browses the vocabulary of standard greetings and selects the preferred greeting pre-printed in the preferred font, which preferred greeting is then locked-in into one of the two windows of the message constructing template. Further, the user browses the gallery of prefabricated "frames" or "casings", which are a type of blank or decorated "greeting card(s)", which card is provided with an active field of the size of a standard prefabricated greeting. After selecting the type of "greeting card" appropriate for the selected greeting, the user locks-in the "greeting card" [in] into the other window of the template. Finally, the user inserts the selected preferred greeting into the active field of the selected "greeting card" and proceeds to formatting the arrangement such that, upon finalizing it, the larger "greeting card" appears as a "frame" that surrounds the selected prefabricated greeting icon. Further, the communication capabilities of the user's device, or dedicated capabilities, are used to send, email, post or broadcast the selected customized greeting to the intended recipient or list of recipients;

(c) in the individualized stylizing version, the user also starts from the preferred language, but may bypass the vocabulary of word icons and (i) may open a blank prefabricated "label" provided with an editable field reserved for text, and (ii) may browse the gallery of prefabricated fontABCs (e.g. stylized characters). After selecting and locking-in the preferred fontABC, the user may open the blank editable "label" lodged into the window and may type in, manually, from the dedicated keyboard, onto the text box of the label, the desired stylized greeting in the preferred fontABC, after which the communication capabilities of their device may be used to send, post, email or otherwise transmit the selected greeting, in the selected font, to the intended recipient or list of recipients. The messaging system of the present disclosure may be programmed such that, in any of the fontABCs (e.g. stylized characters) available, only vetted words and expressions already included in the vocabulary of pre-composed prefabricated greetings could be stylized. In an unrestricted environment, font ABCs can be used to compose any message that fits the size of the active field, whether or not already included in the vocabulary vetted by the administrator.

(d) Alternatively, the text messages may be stylized without the use of a dedicated or any other type of a keyboard. Upon being stored placed in libraries and galleries, all prefabricated word icons, including their plain font version, and each ABC font (plain or stylized character) may be registered, letter by letter and sign by sign, by the codified messaging system. The individualized stylizing process may start with the selection of the desired word icon in its plain font version, and its insertion into one of the windows of the two-windows message-constructing template. Using the other window of the template, the user may scroll the gallery of prefabricated fontABCs, selects and locks-in into the window the preferred decorated fontABC. In the next step, the user may return to the first window and using the cursor of their device may highlight the plain font version of the prefabricated word icon, after which the user may click on the selected font ABC lodged in the second window. The messaging system of the present disclosure may be programmed to change, upon clicking or other procedure, the plain font into the selected decorated font ABC, similar to the change of fonts in any standard computer system.

Figure 11G:
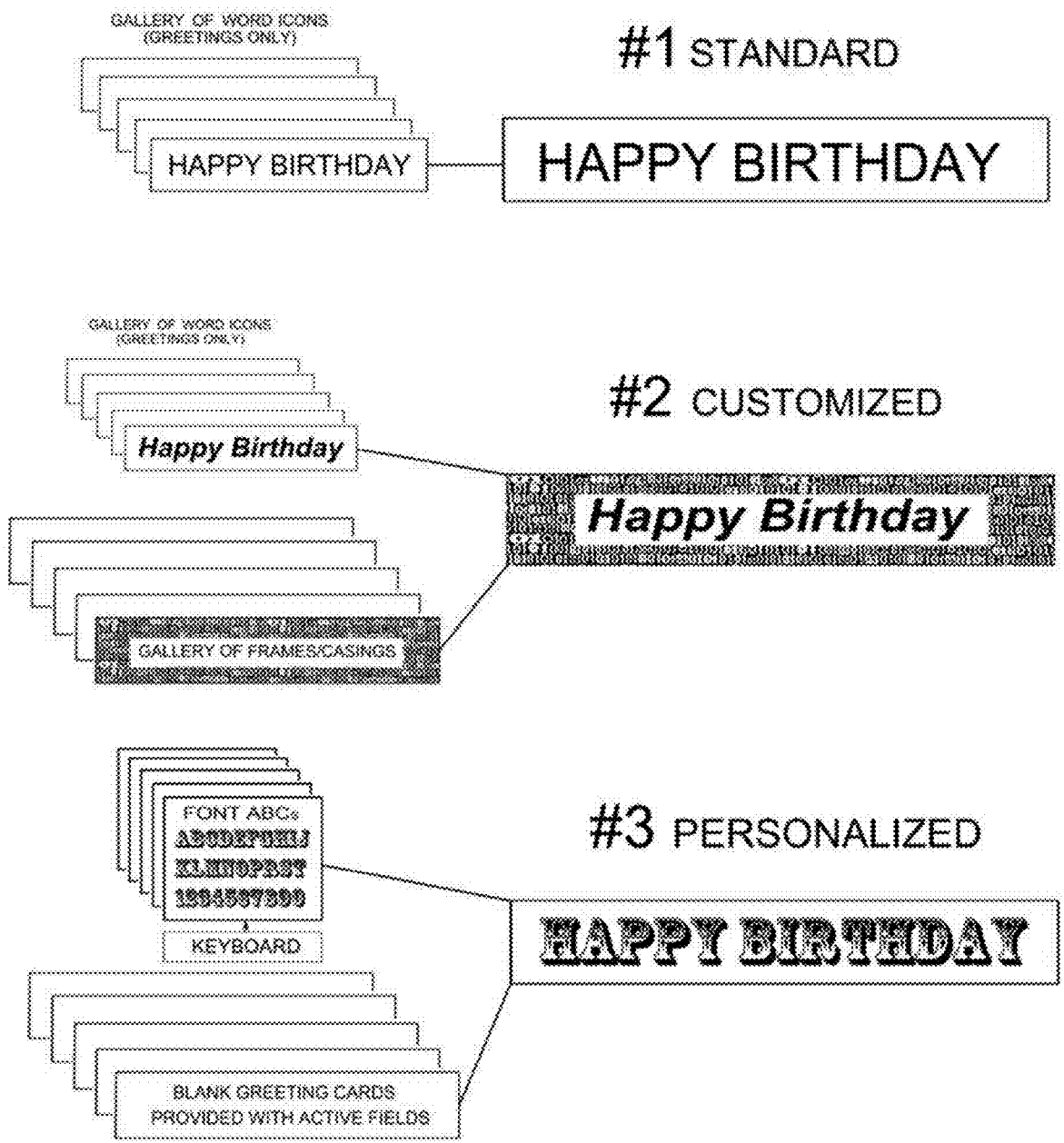

An illustratory example of the options available in the communication platforms of the type brevisLine and brevisMail is presented in FIG. 11G.

Standard Option:

In the standard option, presented on the top half of FIG. 11G, the user scrolls the gallery of standard, pre-printed prefabricated icons, selects the preferred standard prefabricated icon "Happy Birthday", preprinted in user's preferred fond, displayed in CAPITAL LETTERS after which she uses the communication capabilities of her device to send, post or broadcast the message to the intended recipients(s);

Customized or Composite: In the composite version, the user operates with two galleries of prefabricated icons: one, the gallery of word icons displayed in a plurality of fonts, shapes, contours and presenting a variety of artistic features, from which she selects the greeting "Happy Birthday" printed in a bold italic font. The other gallery scrolled by the user is the gallery of "frames" or "casings", or "greeting cards" from which the user selects a decorated "casing" that displays a binary arrangement. After locking-in these two selections in their respective windows, the user inserts the greeting "Happy Birthday" into the field displaying the binary arrangement such that, after the required formatting, the binary arrangement is displayed as a decorated frame that surrounds the greeting. Finally, the user sends, posts or broadcasts the prefabricated BrevisMail message by using the communication capabilities of her electronic device.

Personalized or Stylized: In the stylized version the user also operates with two galleries, of which one of blank greeting cards provided with an active field reserved for text. The second gallery scrolled by the user is a gallery of font ABCs that provide a plurality of choices of plain and decorated fonts, of various colors, sizes, types, contours and other artistic features. The gallery of font ABCs is connected to the keyboard of the user's device or to a dedicated keyboard. After selecting the preferred font ABC, the user types onto the active field of the blank greeting card the greeting "Happy Birthday" by using the selected font ABC locked onto her keyboard.

Standard, Composite or Paired, and Individually Stylized options in Stampiade and BlanxGreets Similar to CheerLine/cheerEmail, brevisLine and brevisMail referred to above, the "Stampiade" and "BlanxGreets" communication platforms, including email platforms, as well as the flippyMail double sided platform (which may also operate outside of an email platform), are provided with specific communication tools which, without limitation, include:

(a) for the standard, fully prefabricated option: a gallery of prefabricated stamp or card format illustrations, organized as a menu grouped according to a plurality of criteria, including summer and winter sports and events, where each prefabricated image, in each sport or event, already contains a standard greeting or other short text, preprinted within the illustration in a variety of fonts, including decorated fonts;

(b) for the composite or paired, and individually stylized options: a separate gallery of stamp or card format illustrations, also organized as a menu grouped by a plurality of criteria, including sports and events where, instead of a pre-printed greeting each prefabricated image icon, in each group, contains a blank text box containing an active field reserved for live input, for the purpose of being filled-in with either an individualized full-word greeting selected from the gallery of pre-printed word icons, or with an individually stylized greeting typed-in live by the user, by using the locked-in preferred font ABCs.

(c) the galleries of stamp or card format illustrations described above, containing only black and white prefabricated illustrations to be colored by the user online or after being printed in hard copies;

(d) for the composite or paired version, the vocabulary of prefabricated word icons described above, comprising greetings and other short texts pre-printed in a variety of fonts, including decorated fonts;

(e) for the individually stylized version, a separate gallery of font ABC's, comprising the types of prefabricated fonts available for the decoration choices included in the individually stylized option;

(f) in the composite or pairing option the screen exhibits a two-window capability, where one window allows for access to, and the scrolling of, the gallery of pairing illustrations and the display of the selected illustration, while the other window allows for access to, and scrolling of, the gallery of prefabricated word icons making available pre-printed greeting texts;

(g) the support communication tools required to complete the message(s);

(h) the steps and procedures described in (a) to (f) above, wherein the illustrations and greeting texts are presented in or included into an animated or video format.

Communication platforms of the type "Stampiade", "BlanxGreets" and flippy/Mail, also include, without limitation, the following process[,] steps and procedures:

(a) in the standard, fully prefabricated version, the user starts from the preferred language or alternatively, uses the dedicated "search" option to access the desired location, browses the gallery of standard, prefabricated image icons and selects the prefabricated image that also contains therein the preferred prefabricated word icon, i.e. the icon that displays the preferred greeting text (which greeting text is already preprinted in a variety of decorated fonts, from which the user selects the illustration with the text pre-printed in the preferred font), after which the communication capabilities of user's device are used to transmit or broadcast the selected standard prefabricated standard greeting expressed in the preferred font, to the intended recipient or list of recipients;

(b) in the composite or paired version, where the user operates with two windows, one for pairing prefabricated image icons, the other for the vocabulary of prefabricated word icons containing preprinted greetings, both image icon(s) and text icon(s) being displayed simultaneously on the two separate windows of the screen, the user selects the preferred image and a matching preprinted greeting, after which the communication capabilities of their device are used to transmit the selected composite or paired greeting in the preferred font, to the intended recipient or list of recipients, or to post it on social media, etc.;

(c) in the individually stylized version, the user also operates with two galleries, one of pairing prefabricated image icons, the other of font ABC's, both displayed simultaneously in their respective windows of the two-window template, after which the user selects the preferred image icon and a matching font ABC, following which the user types-in the desired greeting into the blank text box of the selected image icon, and finalizes the individualized stylizing operation by using the communication capabilities of their device to send, email, post or otherwise transmit the selected greeting, in the selected font ABC, to the intended recipient or list of recipients, or to post it on social media, etc.

Similar to the individualized stylizing of the prefabricated word icons of the type brevisLine and brevisMail, the messaging system of the present disclosure may be programmed such that, in any of the font ABCs available to users, only vetted words and expressions already included in the vocabulary of pre-composed prefabricated greetings could be individually stylized. In an unrestricted environment, fonts (e.g. stylized characters) may be used to compose any message that fits the size of the active field, whether or not already included in the vocabulary vetted by the system.

Alternatively, the plain font version of the prefabricated word icon may be changed into an, individually stylized font version provided by the gallery of prefabricated font ABCs, similar to the procedure described above in respect to individualized stylizing of the brevisLine and brevisMail type of messages.

(d) the same steps and procedures applied to the black and white illustrations;

(e) the same steps and procedures applied to animated and video communication tools.

Figure 11H:
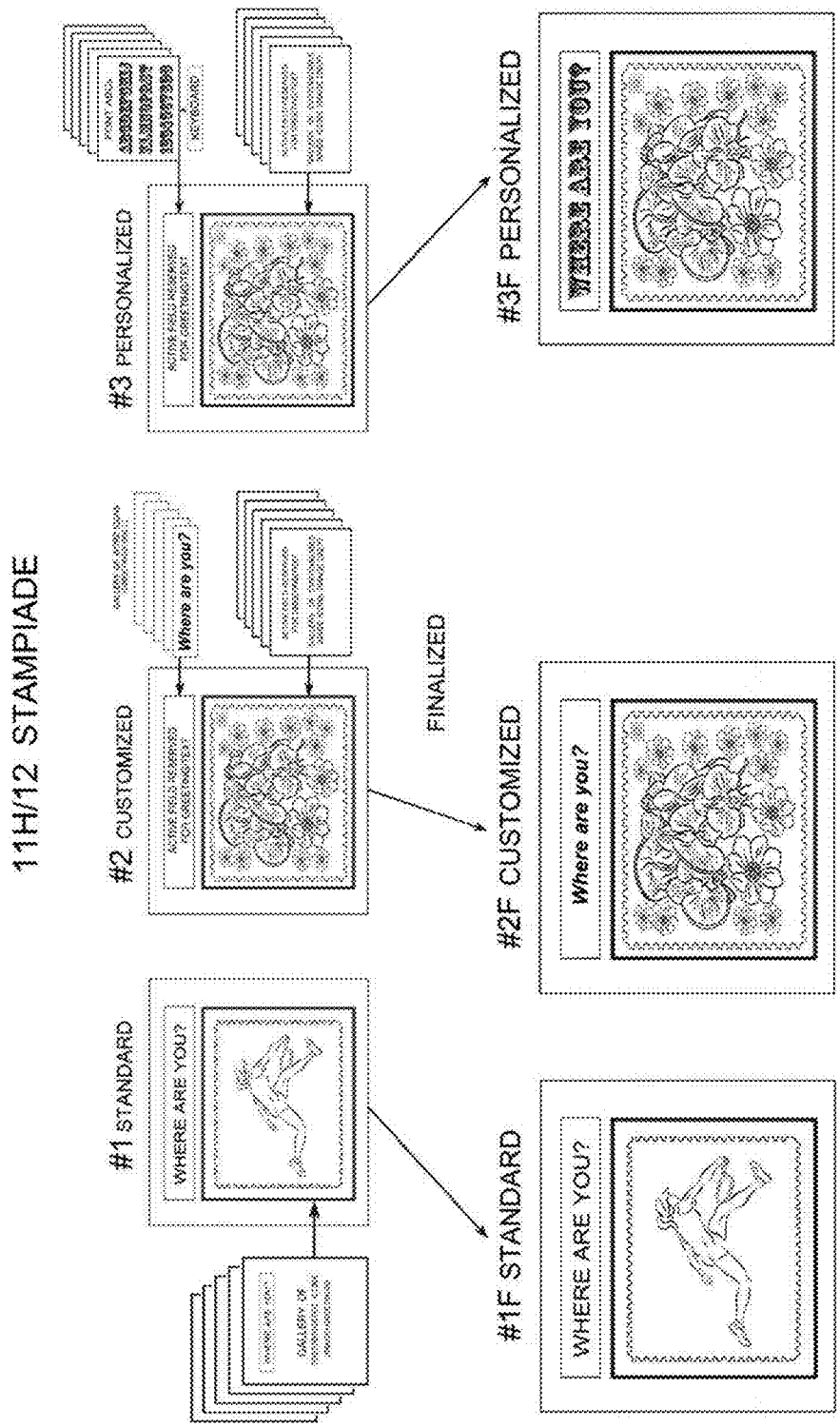

An illustrative example of the Stampiade, without limitation, is presented in FIG. 11H. FIG. 11H presents three options: #1—standardized; #2—customized or composite/paired, and #3—personalized or individually stylized, each option being displayed in two stages: on top, the stage of sourcing of prefabricated icons and of composing the Stampiade type of message and, below, the finalized stage corresponding to each of these three options. The finalized images are presented as: #1F—standard, finalized; #2F—customized/paired, finalized, and #3F—personalized/individually stylized, finalized.

1—Standard, presents the image of a standard prefabricated icon that displays both an image (a female tennis player) and a word icon ("where are you?"), selected from the library of standard prefabricated icons. Different from "pairing" prefabricated icons, all standard prefabricated icons already display within the same format both an image and a matching text pre-printed in a variety of fonts. It is from this standard variety that the user selects the image with the preferred text displayed in the preferred font, all prefabricated and pre-printed;

2—Customized/Composite/Paired, presents the image of a composite prefabricated icon composed of two separate icons "matched" together: a prefabricated image icon (displaying a flowers arrangement) selected from the library of "pairing" image icons, and the prefabricated word icon "Where are you?" Different than the "standard" prefabricated icon that contains both an image and an already pre-printed greeting, the "pairing" prefabricated icons display an image but, instead of also displaying a greeting, they only displays a blank active field reserved for a greeting, typically a "matching" prefabricated word icon, to be selected by the user from the separate library of prefabricated word icons, and inserted into the active field reserved for greetings. It is this type of pairing prefabricated icon(s) comprising an image and an active field reserved for a message that is allows for endless associations of images and greetings, including a plurality of greetings for the same particular image, and a plurality of images for the same particular greeting, for all female and male summer and winter sports and events, in all languages, and in a plurality of fonts.

3—Personalized/Individually Stylized, presents the same association of a prefabricated image icon (the flowers arrangement) and a matching text, which text is not pre-printed and imported from a gallery but, rather, typed-in live by the user. To this end, the user scrolls the gallery of font ABCs, selects and locks-in the preferred fontABC and, using the keyboard of their device or a dedicated keyboard connected to the gallery of font ABCs, fills-in the active field reserved for greetings with the text "Where are you?" printed this time in the user's preferred font ABC.

The "lastScore" platform described above, combined with the steps and procedures described in the preceding paragraphs, wherein instead of, or in addition to, cheers or greetings entered into the text box of the prefabricated image or photo, the entered text refers to the result, or the score of an important recent competition.

In another embodiment, a messaging system based on prefabricated icons includes the option of further customizing the selected prefabricated icon(s) by performing additional technical procedures that include, without limitation: adjusting images' features, including brightness, contrast and color characteristics.

Billion Club

A social application of the messaging system based on prefabricated icons discussed herein is a global, borderless sport affinity grouping called "Billion Club" that accepts users of the present messaging system based on both restricted and unrestricted use of prefabricated icons.

Traditionally, the consideration of sport fans is made by reference to the spectators filling in the large stadiums and other famous sports venues during certain competitions, or watching the preferred sport shows on TV, computers or other devices. This traditional way of referring to sport fans is, generally, associated with professional or otherwise celebrity sport competitions. While this traditional way is popular, it is not the only way of considering or identifying sport fans and, from a certain perspective, it may not be the best way. From a connectivity and communication view point, for instance, a better way is by looking at all competitions, including those at school and local levels, or otherwise not glamorous enough to be broadcasted on national TV stations.

It is believed that there are approximately one hundred and fifty million children and youth in the world engaged regularly, sometimes weekly, in various sport competitions organized at local level (Higher numbers are reported by certain sources). If a realistic multiple of seven (Social media could significantly elevate this multiple) is used to estimate the "inner circle" of each of these avid young athletes (parents, siblings, close relatives, best friends) the resulting number exceeds one billion.

Within each inner circle, most of these people are directly and intimately connected periodically by sport victories and failures of their loved ones, as well as by personal events like birthdays, anniversaries, exams, new jobs and promotions, family events, the New Year and other events and celebrations. There are other tens of millions of enthusiastic sports fans in the World who—although may not have an athlete in the family—also have inner circles of family members and best friends.

The Billion Club can be described as a "fans chain" based multi-dimensional affinity club, or a type of "fans' relay" which integrates the popular affinity for sports with the strongest personal affinities to generate a gigantic group of frequently interacting sport enthusiasts. This mega club could be viewed as a worldwide-open umbrella in that it comprises members who are already organized in other local, regional or national sport teams. The Billion Club could also be seen as a gigantic virtual stadium that hosts a myriad of interlocking sport-connected personal affinity groups throughout the world. Other social dimensions could be affinities for a specific school, workplace, or neighborhood environment. Present at all levels, the identity dimension becomes stronger and stronger as the representation continues to ascend to city, region, state and national levels.

It is believed that a sport-based global network enjoys a strong natural vitality: the universality of sport, on one hand, and the highest intensity of personal affinities, on another, have the potential of rejuvenating and refreshing the interest in Billion Club with each new relevant sport competition and each new relevant personal event. Cheering, a universal characteristic of sport competitions, contributes intensity and fervor to this vitality. While most of the cheering happens in the sports arena during the actual competitions, the cheering spirit and manifestation often extend to the communication between athletes and their most fervent supporters both before and after the competitions.

A sports-based program like Billion Club injects excitement into an underlying activity. Sports exhibit valuable attributes, particularly attractive to children and youth. Sports speak about competing, victory and success, about superior skills and strength or overcoming difficulties, or about enthusiasm and confidence. Competitive sports promise public affirmation and recognition. In fact, all demographics are attracted to sport.

Potential members of the Billion Club are the hundreds of millions of young athletes and other sport enthusiasts throughout the world, as well as their families and close friends. The social glue that connects the Billion Club at base level is the frequent online interaction between the members of each independent inner group (intra-group communication). Thus, the overall foundation of the Billion Club structure consists of: (1) at micro level, the internal communication between the closely connected members of each inner circle, multiplied by the enormous number of such circles, and (2) at macro level, the myriad of lines of communication between the Club, as a central point, or a group of national and regional points, and each and all of its members throughout the world.

The global structure of the Billion Club is designed to connect (a) athletes and sport fans throughout the world, with (b) members of their inner circles of family and friends, (c) these family members and friends among themselves, as well as (d) these members with their own inner circles of family and friends, a.s.o., as well as with more distant fans (through the Billion Club Exchanges, described below)—a "fans chain". Billion Club represents a method, system and process for creating and maintaining a global network of athletes and sport fans, based on the enrollment of (a) athletes engaged in competitions at local and other levels, throughout the world, along with the (b) members of these athletes' inner circles of family and friends ("proximal fans"), with whom the athletes interact online frequently, and also with (c) the athletes and sport fans included in these members' own inner circles of family and friends (also proximal fans), a.s.o.

Global Character—ID Card

The global character of the present messaging system based on prefabricated icons, is reflected in Billion Club's ID card. Aside from summary personal data and a sport illustration, Billion Club's ID features insignias of all countries of the world arranged in the shape of the terrestrial globe, superimposed on the musical symbol G-clef. An enlarged insignia of the host country is displayed prominently. Within this symbolic global sports orchestra, each national insignia reflects, graphically, the three attributes associated with victory in official international sports competitions: gold medal, national flag and national anthem. A sample depiction of a Billion Club ID card is presented in FIG. 10B.

Figure 10B:
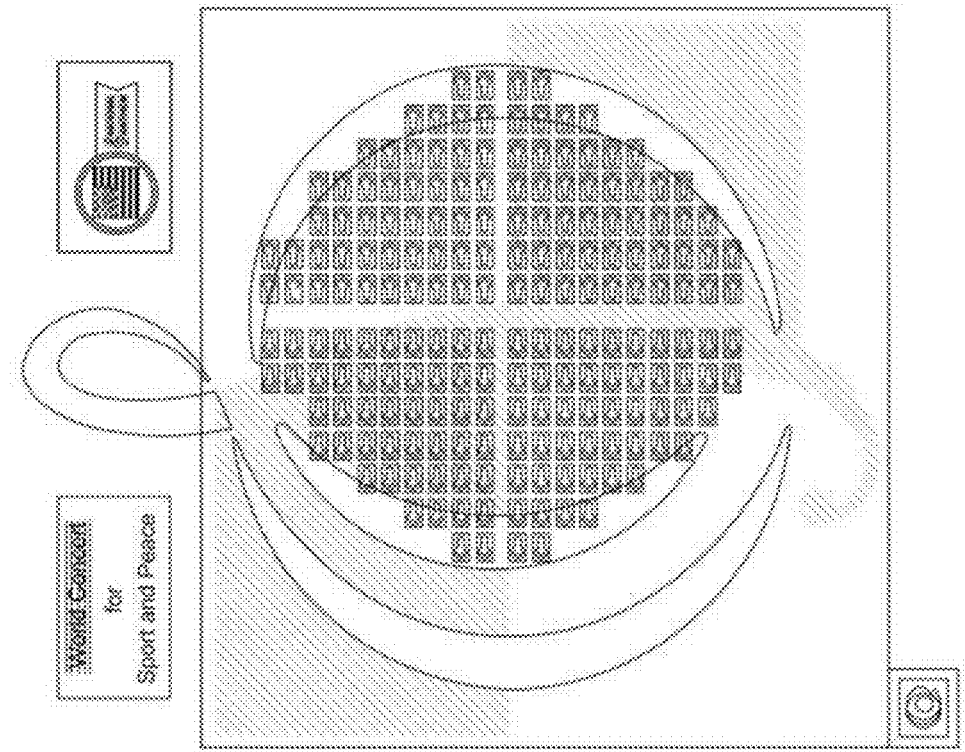
Figure 10B:
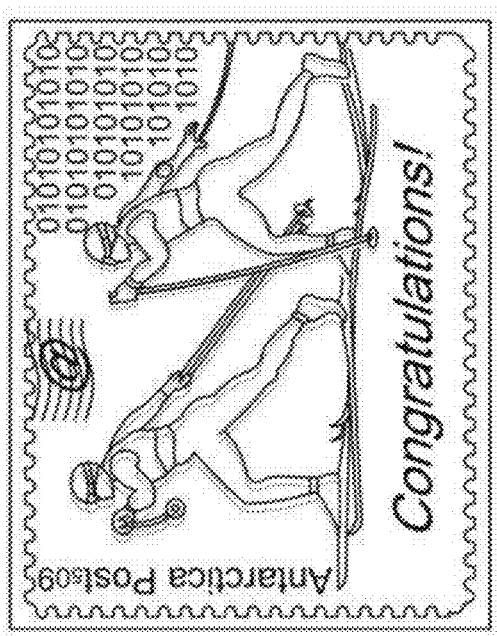
Figure 10B:

In FIG. 10B, Billion Club's ID card, displays two pages. At the top of the first (left) page there is a visible presentation of the name "billionClub" followed immediately underneath by the numeral 1 000 000 001 that symbolizes the billionClub roster of members in excess of one billion. Immediately below, the ID card displays a stamp format prefabricated image icon chosen by a particular member, in the present case showing a female cross-country skier sliding on her skis, and—below the image—the greeting "congratulations". Also shown is a "patch" of binary codes, symbolizing computer enabled communication, as well as the name of the relevant post office, "Antarctica Post, in the present case, accompanied by the post office's seal. Right underneath the image group described above, printed in large visible alphanumeric symbols are the first name of the particular Billion Club member, Mia Camila, the location of the member, Esperanza Base, Antarctica, and the issuing year of her ID card, 2019. The second (right) page of Billion Club's ID card displays the graphic presentation of Billion Club World Concert for Sport and Peace comprising insignias of all countries of the world arranged in the shape of the terrestrial globe, superimposed on the musical symbol G-clef with an enlarged insignia of the host country being displayed prominently, as described above.

While, in this particular embodiment, the second page depicting the World Concert for Sport and Peace is a standard page, being displayed in the ID cards of all Billion Club members, the prefabricated image icon displayed on the first page is selected individually by each and every member, according to their preferences and, presumably, according to their preferred sport and event (cross country skiing, in the present example).

Anchored in Millennials' daily life, the messaging system of the present disclosure operates with the modern symbol @, font names like: code, server, mega, terra, social media, asteroid, magnetic, galaxy, and language like: UFO, market, Andromeda, star flowers, binary arrangements, social media.

Exchanges of Prefabricated Icons Memorabilia—Billion Club Exchanges

A global vehicle for imprinting a positive, enthusiastic character to the present messaging system based on prefabricated icons is a system of Exchanges of prefabricated icons' memorabilia, named Billion Club Exchanges, or BC Exchanges, detailed below.

The BC Exchanges allow members to "jump" the natural, successive spreading order of interlocking inner circles' connections, directly to distant geographies of special interests to members.

The specialized Billion Club Exchanges system is provided with features, tools, steps and procedures that include, but are not limited to, some or all of the following:

(a) famous people: certain of Billion Club's memorabilia, like personalized cards, invitations, certificates, diplomas, signature cards and photos etc signed, stamped, or owned by sport idols and other celebrities, feature that make them attractive and desirable to sport fans interested in collecting celebrity memorabilia;

(b) famous places: e.g. ID cards of members from special or rare places: Antarctica, Polar Circle, Equator, Everest or Amazon areas, Easter Island and other mystery islands, historical sites, famous cities of the world, archeological sites or isolated, inaccessible places, etc;

(c) famous stamps, cards, with peculiar intrinsic features: rare stamps (Andromeda and Atlantida stamps, or the long missing stamp in an otherwise complete collection), rare or special editions, ID cards provided with early issuing dates or with rare numbers, or combinations of numbers (multiple cards with the same digits in a row), cards exhibiting the same digit combination from various countries, or from all countries of a specific zone, area, continent; stamps reflecting the same sport event in different colors, or a multitude of stamps all printed in the same color, etc;

(d) at all levels, the Exchanges are organized and function according to basic rules set centrally by Billion Club and/or its national representation, or both while, within these standard rules, Exchanges may add their own specific rules, which—as well as other features—may distinguish them from other exchanges: e.g. Everest BC Exchange, Manhattan BC Exchange, Niagara BC Exchange, Antarctica BC Exchange, Paris BC Exchange, Rio BC Exchange, Polar Circle BC Exchanges, Moon BC Exchanges, Deep Ocean BC Exchanges, etc.

(e) members interested to exchange BC memorabilia advertize online both the items they are prepared to offer, which are then posted on the designated Exchange Board, and specifics about the items they are interested to acquire, if the targeted items are not already displayed, or otherwise made available, by the Exchanges;

(f) the actual items to be exchanged are hard copies of BC memorabilia (stamps, cards, invitations, photos, diplomas, certificates, signatures etc), owned by members, that may already be personalized by applying their signature, seal or other markings, after which these personalized memorabilia are certified for trade on the Exchanges by Billion Club's central, regional or national "BC Exchange Banks" by being marked with a special seal or other mark of the particular "BC Exchange Bank";

(g) also included in the BC memorabilia that may be traded on BC Exchanges are specially issued "exchangeable" or "tradable" member ID's, representing authenticated copies of member ID cards, issued centrally by Billion Club and marked distinctly for the sole purpose of being traded on BC Exchanges;

(h) although simple and informal trades of personally owned uncertified BC memorabilia may take place at various levels, starting with the class, school, workplace and other levels, only hard copies of personal BC memorabilia certified by a BC Exchange Bank may be traded on official BC Exchanges, with no money changing hands between traders;

(i) money payments made by members in respect of BC Exchanges are solely for purchasing certain tools of trade and associated services, among which, but not being limited to, "exchangeable" member ID authenticated copies, or for certifying for trade of members' own memorabilia by an authorized "BC Exchange Bank", and also for the purchase of the special BC round trip prepaid special envelopes and the related personalized return labels;

(j) Billion Club Exchanges function, essentially, at two levels: (i) an informal, base level, where parties exchange directly, online or otherwise, information and images of the item(s) of interest, for review and approval by the other party, followed by the informal exchange of uncertified personally owned memorabilia, and (ii) formal or official exchange, in which case hard copies of the memorabilia agreed upon to be traded are first mailed, by each party, in special BC round-trip prepaid envelopes, or otherwise, to the agreed upon BC Exchange for inspection and certification, followed by the actual exchange of items and their criss-cross return, by the Exchange, to their new owners;

(k) upon receiving (all of) the items agreed upon by both parties to be exchanged, the BC Exchange inspects the items for authenticity, approval by the parties, and compliance with the particular Exchange's rules, following which the approved items are certified by applying the BC Exchange's seal or other marking, after which the items are mailed back, criss-cross, to the new owners in their own prepaid return envelopes provided now with new (return) labels;

(l) the prepaid round-trip envelopes are protective envelopes of various sizes, designed specially for one or multiple round trip mailing(s), as follows: in the first trip, the envelope (a) contains the item owned by party A to be delivered to the designated Exchange for the benefit of party B; in the second trip, after the certification and exchange of items, at Exchange level, the same envelope (a) provided now with new, return labels (made available by party A in the first trip), is returned by the Exchange back to party A, containing this time the new, exchanged item(s) obtained from party B, and vice-versa;

(m) In the case of official or formal exchanges, the actual items to be traded, delivered by each party to the designated Exchange, are accompanied by a standard (or other form of) statement or declaration by each party, identified in the declaration, to the effect that (i) they certify the authenticity of the particular item(s) they offer, and (ii) they approve of their particular item(s), specifically identified in the declaration, of being exchanged for the other particular item(s) also specifically identified in their declaration, and (iii) that that they authorize the Exchange to execute the trade according to the trading rules of the particular BC Exchange;

(n) the declaration referred to above may include graphic identification (scans/photos) of the items subject to trade.

Figure 10C:
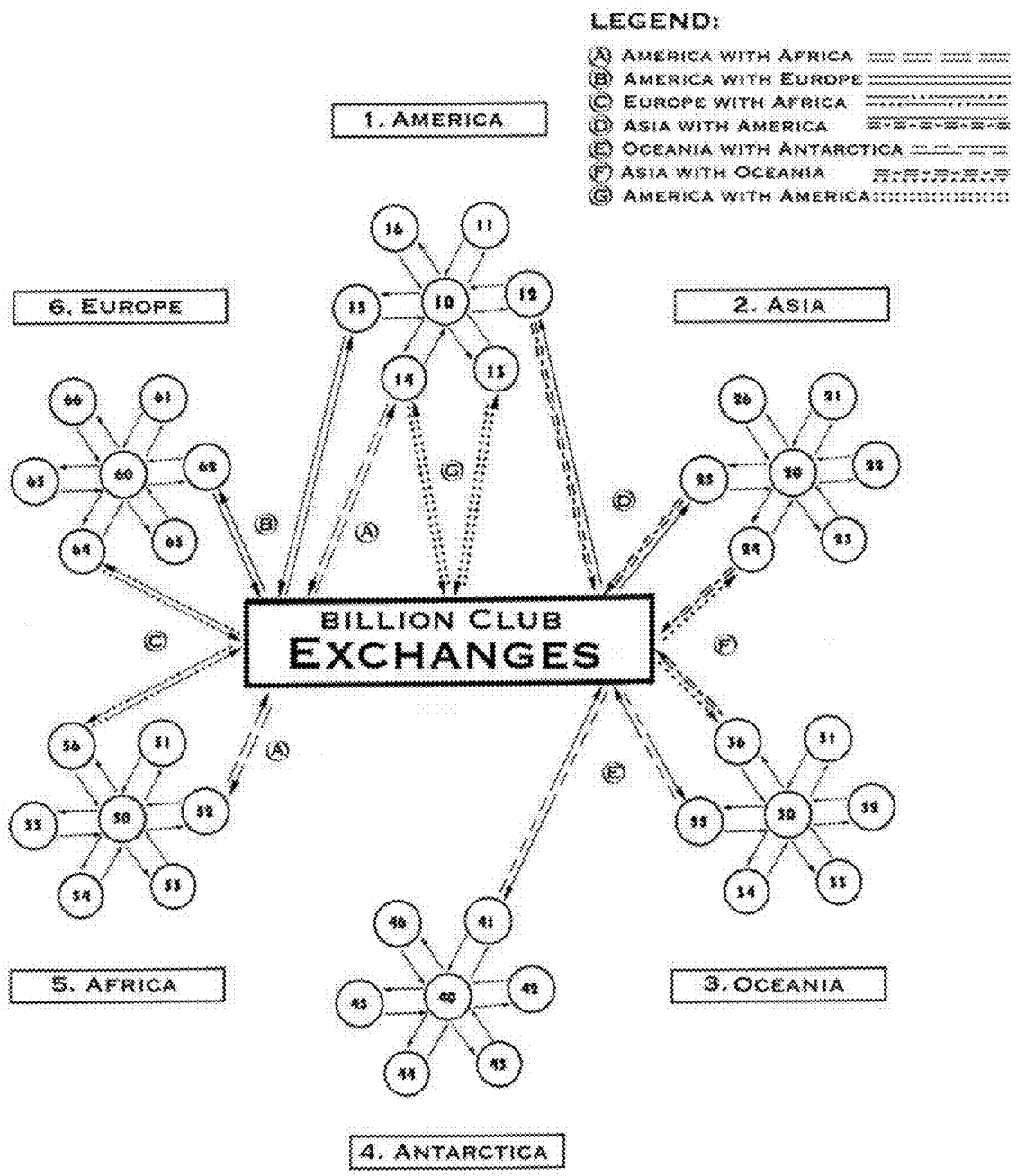

The schematic of a preferred embodiment of a BC Exchange of prefabricated icons memorabilia is presented in FIG. 10C, as follows:

In transaction A, member 14 from the American continent 1 exchanges memorabilia with a member 52 from Africa 5. The American member 14 mails her item to the Exchange for the benefit of member 52 from Africa 5 and, by return mail, receives the item mailed to the Exchange, for her benefit, by member 52 from Africa 5. Simultaneously, the Exchange mails to member 52 from Africa 5 the item provided to the Exchange, for her benefit, by member 14 from America 1. The same mechanics apply to the other exchanges illustrated in FIG. 10B, namely:

In transaction B, member 15 from America 1 exchanges memorabilia with member 62 from Europe; in transaction C member 64 from Europe 6 exchanges memorabilia with member 56 from Africa 5; in transaction D, member 25 from Asia 2, exchanges memorabilia with member 12 from America; in transaction E, member 35 from Oceania exchanges memorabilia with member 41 from Antarctica 4; in transaction F member 24 from Asia exchanges memorabilia with member 36 from Oceania, and in transaction G, member 13 from America 1 exchanges memorabilia with member 14, also from America 1.

The last exchange between members of the same "inner circle" is handled through the Exchange in order to take advantage of the benefits associated with a formal transaction effected through an official Exchange. Alternatively, the two members of the same "inner circle" could have exchanged informally their memorabilia directly between themselves, without passing their items through the Exchange.

Relay Type of Communication System—Universal Connectors

Generally, a relay system is a system where an action, or process propagates in steps or stages, with each stage being performed by a different player or group of players. In sports, a characteristic of a relay is the presence of a "connecting" object, commonly a baton, which is transmitted from one player or group of players to the next to ensure the uninterrupted continuity and integrity of the courseand/or process.

In the communication system of the present disclosure, the intertwined communications within the "inner circles" described above and, further, communications within the surrounding interlocking "circles" behave like ripples or circular waves, being continuously replaced and extended, in their endless connections, and re-connections advancing in all directions. The equivalent to the baton(s) may be the prefabricated icons, or pre-composed messages which play the role of "connectors". Connectors of one player with other players to form strings of connected players, then streams, a movement, potentially a large group of interconnected players integrated globally (e.g. about a billion players).

A relay type of communication system with prefabricated icons is a messaging system that may employ an integrated approach to the use of prefabricated images and prefabricated greetings to connect among themselves members of of worldwide groups that continuously change and re-start connections.

An example (non-limiting) characteristic of the messaging system of this disclosure is the fact that the prefabricated components of the message are re-usable, representing in fact "multi-use connectors" in a plurality of worldwide "chains" of connections. It is imperative for the same prefabricated connector to be available to be used and re-used over and over by a large multitude of users. For example, the same prefabricated greeting "happy birthday" associated with an artistically stylized prefabricated image of soccer or of gymnastics or of flowers may be used millions of times around the world, with the only change being the language in which the greeting "happy birthday" is expressed, or the specific artistic style of the image, or of the greeting, or both, are presented.

This reality highlights this communication system's character of an uninterrupted relay, where several hundreds of "universal connectors" are able to connect, simultaneously and successively, through endless repetition and re-direction, hundreds of millions of people, with some of these connectors "changing hands" and recharging their connectivity potential a million times. This is in contrast to, as an example, the use of personal photos, which, like most family related expressions, tend to stay close to home and to be relevant mostly within a particular "inner circle". In fact, this sharp contrast remains a characteristic of the present messaging system, based on universal, ready-to-use, and re-use connectors of global reach.

In the example integrated messaging system of the present disclosure, the universality of "connectors" meets the universality of sports and events, and the universality of anniversaries and other periodic celebrations, further empowered by the universality of close connectivity among family members and friends. The system exhibits the intensity typical for close connections between family members and best friends, and also the endurance and long reach of "connectors" repeatedly re-used, with the same intensity as a new connection.

If it were to compare fifty thousand spectators attending one single football game with fifty thousand members of inner circles, dispersed over hundreds of local competitions, the latter may be significantly more connected—within their intimate inner circles—than the former.

The borderless "relay" nature of some example embodiments of the present system offers endless opportunities for exceptional messages by members to be exposed onto a worldwide labyrinth of galleries expected to be scrutinized by hundreds of millions of viewers. On an integrated basis, Billion Club has the potential to become a virtual gallery of prefabricated "connectors" available to be selected and used by a billion viewers.

Figure 12C:
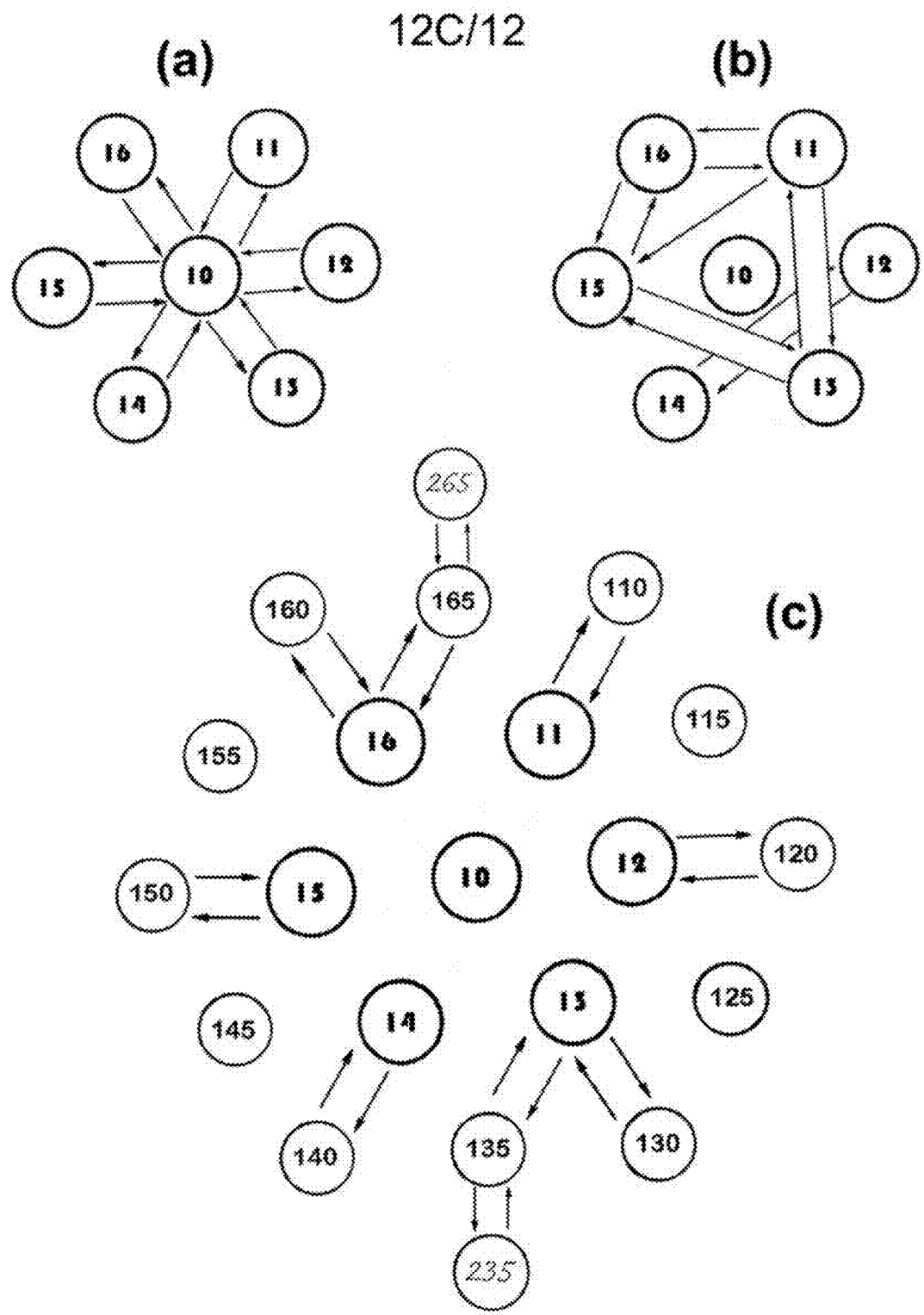
FIG. 12C illustrates an example expansion of the messaging system based on pre-composed messages.
Figure 13:
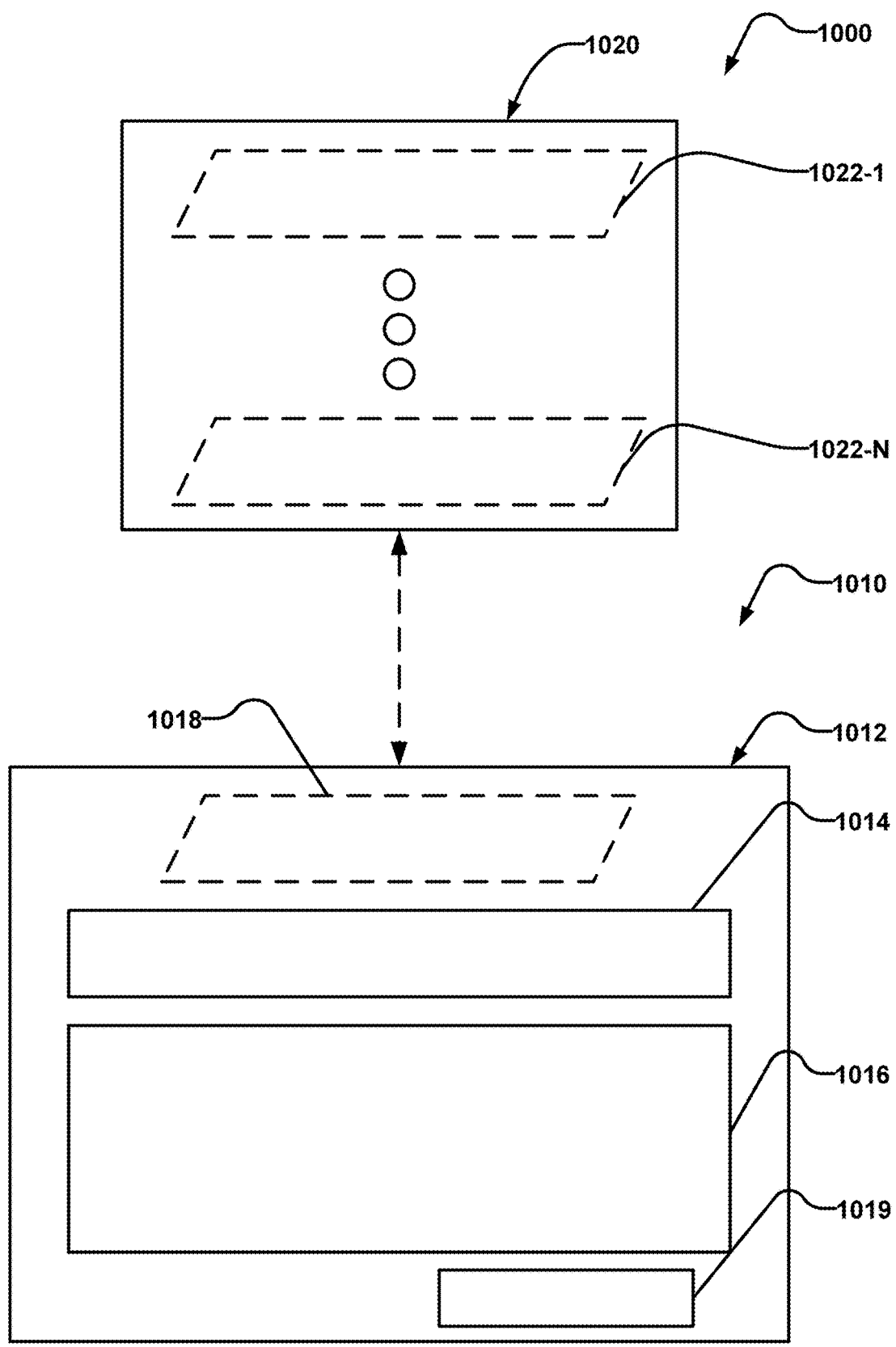
FIG. 13 is a schematic illustration of a messaging system according to an example embodiment.

The incipient expansive phases of an example embodiment of a Billion club intertwined system are presented in FIG. 12C.

In FIG. 12C(a), the athlete 10 interacts online with each member of their inner circle of family and close friends 11, 12, 13, 14, 15 and 16.

In FIG. 12C(b), the family members and close friends 11, 12, 13, 14, 15 and 16, included in the inner circle of an athlete 10, interact online among themselves in addition to their interaction with the athlete 10, depicted in FIG. 12C(a).

In FIG. 12C(c), each member 11, 12, 13, 14, 15 and 16 of the inner circle of an athlete 10, expands further their interaction to include online communication with members of their own inner circle of family and close friends 110, 115, 120, 125, 130, 135, 140, 145, 150, 155, 160 and 165, and further to the next wave of 235 and 265, and so on ("fans' chain" or "fans' relay"). This interlocking groups' expansion is in addition to their intra-group online communications depicted in FIG. 12C(a) and FIG. 12C(b)

Integrated Messaging System with Prefabricated Icons

An example messaging system of the present disclosure may exhibit several characteristics of integration, which may include:

Integration of the universal affinities for sports with the strongest personal affinities;

integration with positive, festive, celebratory events and occasions;

Integration with all languages of the world;

Integration with all standard communication platforms, including email platforms;

Integration with specific communication platforms, including BrevisLine, BrevisMail, Stampiade, Flippy-Mail;

Integration with electronic libraries and galleries of prefabricated icons;

Integration with message constructing templates, formatting and support templates;

Integration of image prefabricated icons with word-prefabricated icons;

Integration of "associations" of particular prefabricated image icons with a plurality of prefabricated word icons and, further, of particular prefabricated word icons with a plurality of prefabricated image icons;

Integration of Standard, Customized and Personalized expressions of messages;

Integration of more than one language and alphabet in the same message;

Integration of messaging with a small size format: stamps, labels;

Integration, through Billion Club, with Exchanges of prefabricated icons memorabilia.

Association with Sports: Designated Sports

The messaging system of the present disclosure may comprise several features (not necessarily mandatory). Firstly, the messaging system may be limited to the use of pre-composed words and short expressions made of prefabricated icons, icons which themselves may also be made of prefabricated components. As a general rule, the live input by the user may be mostly limited to customization and personalization of the same prefabricated components of the message.

The present messaging system may operate with selective, codified, pre-composed texts that may be "ready-to-go".

In some embodiments the database (described elsewhere herein) comprises a gender associated with each of the individuals. The gender may facilitate selection of a gender appropriate prefabricated icon (e.g. image of a female gymnast for a female gymnast). In some embodiments the messaging system comprises separate gender-specific libraries (e.g. separate libraries for male and female soccer, separate libraries for male and female hockey, etc.).

In some embodiments the alphanumeric code described elsewhere herein that is associated with each prefabricated image icon (but not necessarily with word icons), which already may include a two-letter code for each sport, could incorporate an additional code to represent gender of an athlete depicted in the images, like "W", for images with women athletes. In some embodiments this coding is already applied to some prefabricated image icons, like women soccer and women hockey. In cases where the messaging is between two users of different genders, the short list of "permanent" sports may include the gender preference of each of the two users and, similarly, the list of "occasional sports" may include, separately, sport images with athletes of both/all genders, for easy selection.

Using sport-based storage criteria for graphic text icons (e.g. "congratulations") may be useful because it is the association of prefabricated word icons with prefabricated image icons, that may already be stored in sport-based libraries, that may make it possible to customize and personalize messages. In one embodiment, the stored graphic text icons can be accessed from each of the sport-based libraries which host the special-type of image icons designed to be "matched" with the graphic word icons.

Different than the "standard" prefabricated image icons which may contain therein both an image and a pre-printed text, the special-type of prefabricated image icons designed specifically for customization and personalization purposes contain an image but, instead of a preprinted text, they may only contain an active field reserved for text, which text may be inserted live by the user, either in one piece, in the case of "customization", or letter-by-letter, in the case of personalization.

In some embodiments, for the purpose of personalization, the "graphic icon containing text" may also include graphic elements of a text, i.e. individual pre-decorated graphic letters ("fonts") to be used by a user of the messaging system to type-in, live, the desired text in the active filed of the special-purpose prefabricated image icon.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, smart phones, PDAs, and other devices suitable for the purposes described herein. Those skilled in the relevant art will appreciate that aspects of the system can be practised with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics (e.g. smart internet connected televisions, and the like), network PCs, mini-computers, mainframe computers, and the like.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A messaging process for constructing and communicating messages comprising pre-composed codified messages made of one or more reusable prefabricated icons and other content, for communication over a network using a secure messaging protocol, the messaging process comprising:
    a member computing device, the member computing device comprising a processor, a communication module with a user interface and a display;
    generating or obtaining pre-composed codified messages made of one or more reusable prefabricated image icons, prefabricated word icons, prefabricated composite icons and prefabricated support icons, to be used for constructing and communicating one or more messages, in an electronic messaging system;

making available to a member computing device, the one or more reusable prefabricated icons in one or more libraries configured for prefabricated icons presenting to a member computing device one or more reusable prefabricated icons selected from libraries and configured for placement into a message field of the message;

accessing at the member computing device one or a plurality of single sided or double sided message constructing templates to be used for constructing one or more codified electronic messages comprising one or more reusable prefabricated icons, where the templates contain a header field configured for device and user information for the intended recipients for transmittal of the one or more messages to the intended recipients and a one or more message fields for the prefabricated icons assembled in a plurality of configurable arrangements;

selecting at the member computing device of one or more reusable prefabricated icons for insertion into the message field(s) of the message and selecting an appropriate template for constructing the particular codified message;

inserting the selected reusable prefabricated icon(s) and/or other content into the message field(s) of the particular message;

making manual and/or automatic formatting and adjustments to the message in the message field of the message to create or assemble one or a plurality of versions of the codified message;

selecting the preferred version of the codified message in the message field of the message;

finalizing and sending the preferred version of the particular codified message comprising reusable prefabricated icons to the intended recipient(s)

wherein the one or more reusable prefabricated icons to be included in messages comprise one or more:
  prefabricated image(s) including sport and celebratory images;
  precomposed text comprising one or more precomposed and other words and/or alphanumeric symbols, the precomposed words and/or alphanumeric symbols presented in one or more languages, alphabets and stylized versions; and
  one or more combinations of one or more prefabricated images and support icons with prefabricated or live stylized text wherein the messaging process may use a dedicated or other keyboard enabled for creating live text messages based solely on stylized reusable alphanumeric symbols selected from libraries;

wherein the administrator of the messaging system is enabled to generate reusable prefabricated icons configured for inclusion in online messages and to update the libraries configured for reusable prefabricated icons.

2. The messaging process of claim 1 wherein a message constructing template provided with two or more message fields is configured to enable a member computing device to construct one or more mixed or composite codified messages by associating a particular reusable prefabricated image icon placed in one of the message fields of the template with one or a plurality of reusable prefabricated word icon(s) placed in the other message field(s) of the template, and by associating a particular reusable prefabricated word icons with a plurality of reusable prefabricated image icons.

3. The messaging process of claim 1, wherein a double-sided message communication platform consists of one side that comprises one or more reusable prefabricated image icon(s), and/or other prefabricated icon(s), or other image(s), and of another side that comprises one or more reusable prefabricated word icon(s) or other prefabricated icon(s), or other greetings or positive text message.

4. The messaging process of claim 3, wherein the double-sided platform or message constructing template is provided with one or more message fields or windows on each side;
  wherein the face side, or window, comprises one or more images or image and words and/or alphanumeric symbols selected from libraries, and the back side or window comprises one or more greetings or positive text, which text may be typed-in live, letter-by-letter, from a dedicated or other keyboard by using stylized reusable alphanumeric symbols selected from libraries, or may comprise ready-to-use prefabricated word icons selected from libraries;
  wherein the system is configured for the use on each side of the double-sided platform or template of at least one reusable prefabricated icon selected from libraries; and
  wherein the double sided platform/template may be configured with a password or other procedure to flip the message from one side to the other and/or to otherwise allow access to the message content displayed on the back side of the platform/template or may be configured with encryption or other access and secure-use features.

5. The messaging process of claim 3, wherein the double-sided platform or message constructing template is provided with one or more message fields or windows on each side;
  wherein, each of the left side and right side of the platform/template comprises one or more reusable prefabricated image icons, word icons, and alphanumeric symbols selected from libraries, or other prefabricated content, including photos, and further comprises one or more data and text(s), each of the data and text(s) typed-in live from a dedicated or other keyboard by using plain and/or stylized reusable alphanumeric symbols selected from libraries;
  wherein the message field of the double sided platform/template may be filled manually by the user or automatically by the system, or both, and the filling-in process may employ a user interface that allows the user to visualize the composed codified message before being sent,
  wherein the system is configured for the use on each side of the double-sided platform or template of at least one stylized reusable prefabricated icon selected from libraries.

6. The messaging process of claim 1 wherein the one or more of the reusable prefabricated icons included in the message field of the codified message is one of an animated image icon, or animated word icon, or an animated image icon with animated word icon(s), wherein animation includes blink animation.

7. The messaging process of claim 1 wherein use of reusable support prefabricated icons, among which flower arrangements, flags, medals, stars, insignias, and of adjustments and final touches, configured for inclusion in online messages, stylize the codified message in an artistic fashion to improve the celebratory, festive presentation of the message.

8. The messaging process of claim 1, wherein a composite codified message configured for online communication may be assembled from a particular reusable prefabricated image icon provided with an active field reserved for text, which text may represent a ready-to-use reusable prefabricated greeting icon selected from a library, or the greeting text may be typed-in live, letter-by-letter by the user form a dedicated or other keyboard by using solely stylized reusable alphanumeric symbols selected from libraries.

9. The messaging process of claim 1, wherein a composite codified message configured for online communication may be assembled from a particular stylized reusable prefabricated word icon comprising an active field reserved for one or more image(s) which image(s) may represent a ready-to-use reusable prefabricated image icon selected from a library, or other image(s), including photos.

10. The messaging process of claim 1, wherein the message field of one or more message assembling templates is provided with one or more active fields configured for assembling online codified messages based on reusable prefabricated icons and other content, which message fields are configured in a plurality of formats and layouts to enable the user to:
  insert into the message field(s) of the template reusable prefabricated icon(s) selected from libraries, or stylized text composed live by the user from a dedicated or other keyboard, which keyboard is configured to operate with reusable stylized prefabricated alphanumeric symbols selected from libraries;
  create message configurations according to template configurations created by the system or according to arrangements created by the user, or both;
  enable the user to visualize and compare the versions of the associations and arrangements between prefabricated icons in the message field of the message, and to select the preferred version;
  wherein, according to the system configuration:
    each field may contain a prefabricated icon selected from libraries, and/or other content;
    template fields may be populated manually by the user or automatically by the system, or both;
    each message is configured to contain at least one reusable prefabricated icon selected from libraries.

11. The messaging process of claim 10, wherein:
  templates may be provided with a single input field or window configured for a codified message comprising a single unit image, word, or composite icon;
  templates provided with two input fields, may be configured to enable users to match, compare and evaluate associations of prefabricated icons in the message field; and
  templates provided with a plurality of input fields may be configured to enable users to assemble complex messages including double-sided mixed or composite messages, in a plurality of configurable arrangements and of message versions.

12. The messaging process of claim 1, wherein a particular codified message may be stylized by converting the plain font, or portion(s) thereof configured for conversion, into one or more stylized font(s) selected from the library of stylized reusable alphanumeric symbols, which stylized font(s) is/are configured to replace the plain font portions of the particular codified message that have been highlighted or otherwise identified for conversion by the user.

13. The messaging process of claim 1, wherein the reusable prefabricated icons involved in the generation step of the messaging process may be made of a plurality of prefabricated components, which component(s) may be fabricated separately from each other and subsequently assembled;
  wherein, each of the separately prefabricated components may be made of one or more prefabricated components of their own, which may also be fabricated separately and subsequently assembled.

14. The messaging process of claim 13, wherein the reusable prefabricated icons involved in the generation step of the messaging process may be made of two or more prefabricated components, of which one prefabricated component or the face component of the prefabricated icon is superimposed over the other prefabricated component or the background component of the prefabricated icon, which background component may be fabricated separately; and
  wherein each of the separately prefabricated face component(s) and background component(s) of the prefabricated icon(s) may be made of two or more prefabricated components of their own, which components may be fabricated separately and superimposed one over the other.

15. The messaging process of claim 13, wherein a particular prefabricated composite icon comprises at least one of each:
  prefabricated word icon component, including pre-composed, preprinted cheers, greetings and/or other short expressions, and prefabricated alphanumeric symbols presented in one or more languages and alphabets;
  a prefabricated image icon component, including sport and celebratory images;
  a prefabricated mixed or composite icon component, including Ike word and image components within the prefabricated mixed or composite icon component, and
  a prefabricated icon component comprising artistically stylized and celebratory elements.

16. The messaging process of claim 1 wherein, upon being placed in libraries, each of the artistically stylized reusable prefabricated word icons and each of the reusable prefabricated alphanumeric symbols, including their plain font versions and stylized versions in any language, alphabet or signage system, may be registered individually with the messaging system, and;
  wherein the individual registration with the system is also performed in respect to each of the reusable prefabricated image icons, prefabricated mixed or composite icons and prefabricated support icons.

17. The messaging process of claim 1, wherein the stylized prefabricated word icons, stylized prefabricated composite icons including text, and stylized prefabricated alphanumeric symbols involved in the messaging process are reusable on an as-is basis in all languages, alphabets and signage systems.

18. The messaging process of claim 1, wherein a particular composite message comprises at least one of each:
  a prefabricated image icon including snort and celebratory images;
  a prefabricated word icon, including pre-composed preprinted cheers, greetings and other short expressions, and Prefabricated alphanumeric symbols presented in one or more languages and alphabets or stylized text typed-in live by the user from a dedicated keyboard by using artistically stylized prefabricated alphanumeric symbols selected from dedicated libraries;
  a prefabricated mixed or composite icon, including the prefabricated image icon and the prefabricated word icon within the prefabricated mixed or composite icon;
  a prefabricated support icon comprising artistically stylized and celebratory elements.

19. The messaging process of claim 1, wherein the content of messages comprises:
- for single icon messages:
    - a single prefabricated icon wherein the icon is a single text icon, or a single image icon, or a single composite icon comprising the word and image within the single composite icon; or
- for composite messages:

one or more associations of one or more single prefabricated icons, prefabricated icon components and live stylized text.

20. The messaging process of claim 1, wherein the process includes an email communication platform in which one or more prefabricated icons configured to be included in one or more electronic messages are transmitted by the email platform as an email attachment to the intended recipients of the message.

\* \* \* \* \*